(12) United States Patent
Schneiderman

(10) Patent No.: US 8,064,688 B2
(45) Date of Patent: *Nov. 22, 2011

(54) OBJECT RECOGNIZER AND DETECTOR FOR TWO-DIMENSIONAL IMAGES USING BAYESIAN NETWORK BASED CLASSIFIER

(75) Inventor: Henry Schneiderman, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 585 days.

This patent is subject to a terminal disclaimer.

(21) Appl. No.: 12/259,371

(22) Filed: Oct. 28, 2008

(65) Prior Publication Data

US 2009/0067730 A1 Mar. 12, 2009

Related U.S. Application Data

(62) Division of application No. 10/971,868, filed on Oct. 22, 2004, now Pat. No. 7,848,566.

(51) Int. Cl.
 *G06K 9/62* (2006.01)
(52) U.S. Cl. ............... 382/159; 382/224; 382/225
(58) Field of Classification Search .......... 382/159, 382/160, 165, 169, 170, 181, 224, 225, 226, 382/227, 228; 700/47, 50; 706/15, 19, 20, 706/22, 41

See application file for complete search history.

(56) References Cited

U.S. PATENT DOCUMENTS

| | | | |
|---|---|---|---|
| 6,829,384 B2 | 12/2004 | Schneiderman et al. | |
| 7,194,114 B2 | 3/2007 | Schneiderman | |
| 2003/0194132 A1* | 10/2003 | Kiyuna | 382/190 |
| 2004/0066966 A1 | 4/2004 | Schneiderman | |

OTHER PUBLICATIONS

G. Strang and T. Nguyen, "Wavelets and Filter Banks", 1997, Wellesley-Cambridge Press, pp. 1-35, pp. 103-142, pp. 216-218.
R.E. Neapolitan, "Learning Bayesian Networks", 2004, Pearson Prentice Hall, Cover page and pp. 433-502.
B.D. Ripley, "Pattern Recognition and Neural Networks", 1996, Cambridge University Press, Cover page and pp. 1-89.

(Continued)

*Primary Examiner* — Brian Le
(74) *Attorney, Agent, or Firm* — Jones Day

(57) ABSTRACT

A system and method for determining a classifier to discriminate between two classes—object or non-object. The classifier may be used by an object detection program to detect presence of a 3D object in a 2D image (e.g., a photograph or an X-ray image). The overall classifier is constructed of a sequence of classifiers (or "sub-classifiers"), where each such classifier is based on a ratio of two graphical probability models (e.g., Bayesian networks). A discrete-valued variable representation at each node in a Bayesian network by a two-stage process of tree-structured vector quantization is discussed. The overall classifier may be part of an object detector program that is trained to automatically detect many different types of 3D objects (e.g., human faces, airplanes, cars, etc.). Computationally efficient statistical methods to evaluate overall classifiers are disclosed. The Bayesian network-based classifier may also be used to determine if two observations (e.g., two images) belong to the same category. For example, in case of face recognition, the classifier may determine whether two photographs are of the same person. A method to provide lighting correction or adjustment to compensate for differences in various lighting conditions of input images is disclosed as well. As per the rules governing abstracts, the content of this abstract should not be used to construe the claims in this application.

53 Claims, 27 Drawing Sheets

OTHER PUBLICATIONS

V.N. Vapnik, "The Nature of Statistical Learning Theory", 1995, Springer, Cover page, pp. viii-xv, pp. 1-64.

D.H. Foley and J.W. Sammon. Jr., "An Optimal Set of Discriminant Vectors", Jan.-Jun. 1975, IEEE Transactions on Computers, pp. 281-289, vol. C-24, No. 3.

A. Gersho and R.M. Gray, "Vector Quantization and Signal Compression", 1992, Springer, Cover page and pp. 410-423.

R. Duda, P. Hart, D. Stork, "Pattern Classification", Second Edition, 2001, John Wiley & Sons, Cover page and pp. 1-83.

R.E. Schapire and Y. Singer, "Improved Boosting Algorithms Using Confidence-rated Predictions", Dec. 1999, Machine Learning, pp. 1-40.

Schneiderman, Henry, "Learning a Restricted Bayesian Network for Object Detection," Computer Society Conference on Computer Vision and Patern Recognition, pp. 1-8, Jun. 27-Jul. 2, 2004.

Pham, Thang V. et al., "Face Detection by Aggregated Bayesian Network Classifiers," Pattern Recognition Letters 24, pp. 451-461, 2002.

Schneiderman, Henry, "Feature-Centric Evaluation for Efficient Cascaded Object Detection," Proceedings of the 2004 IEEE Computer Society Conference on Computer Vision and Pattern Recognition, pp. 1-8, Jun. 27, 2004.

Sung, Kah-Kay et al., "Example-based Learning for View-based Human Face Detection," Image Understanding Workshop, pp. 843-850, Nov. 13, 2004.

Schneiderman, Henry, "Learning Statistical Structure for Object Detection," Computer Analysis of Images and Patterns, pp. 434-441, Aug. 2003.

* cited by examiner

FIG. 5
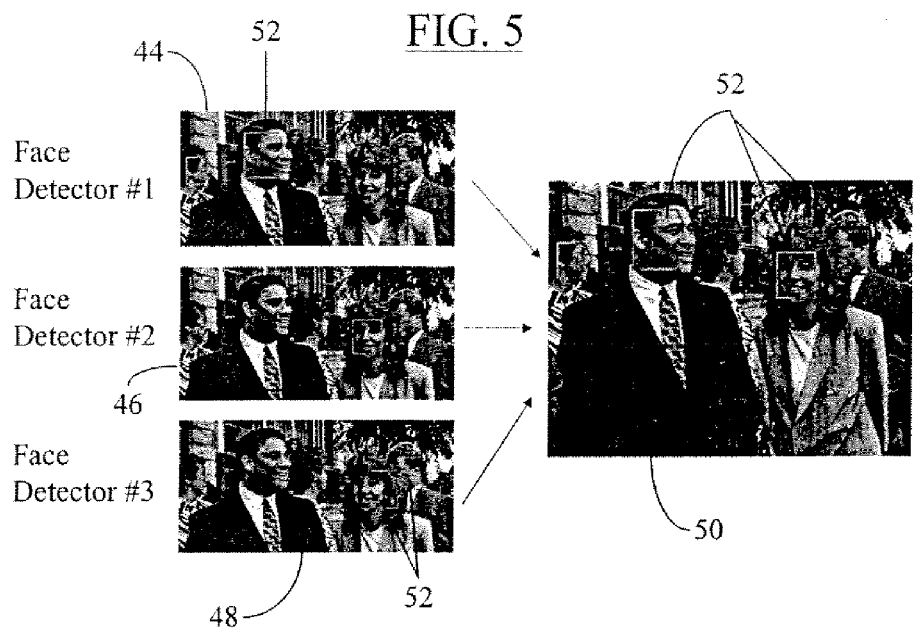
FIG. 7
2 classifiers trained for faces.
8 classifiers trained for cars.
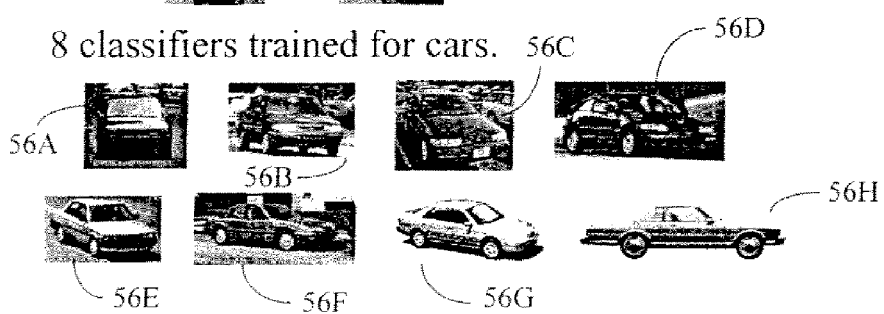

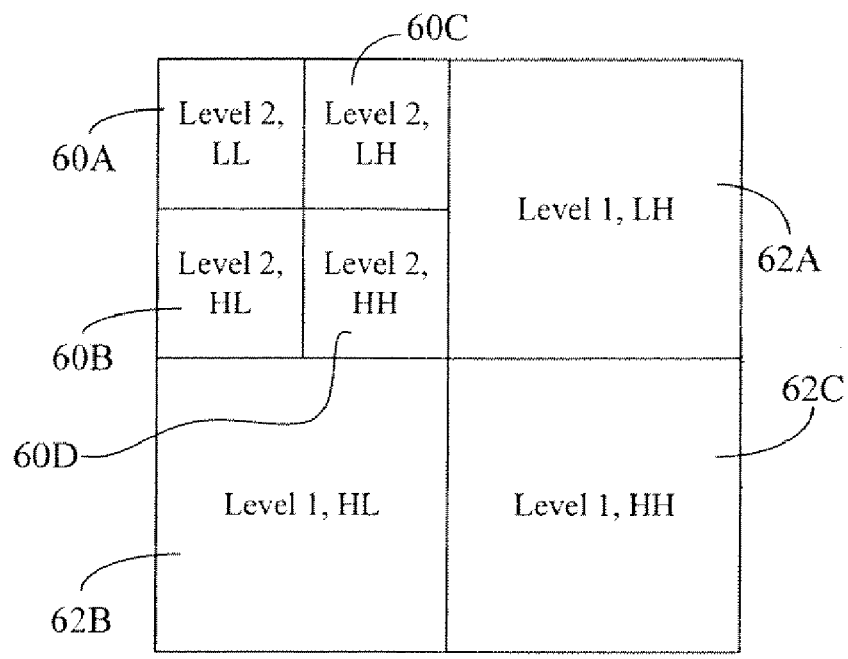
FIG. 10
FIG. 11
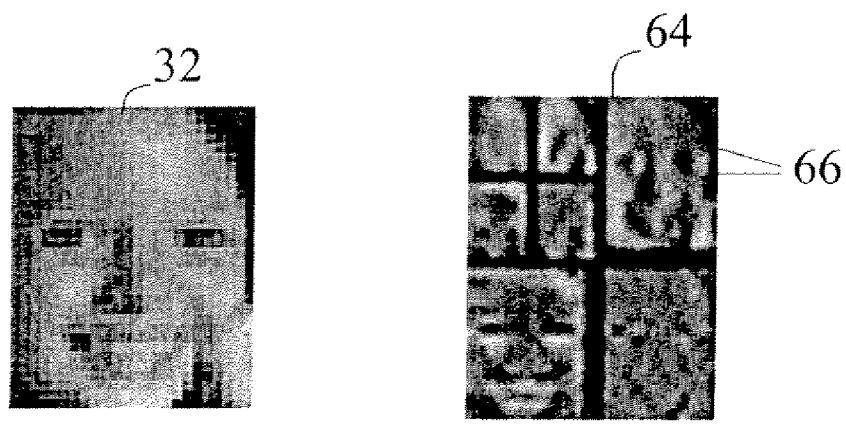

Process for generating a wavelet transform of 2 levels (also known as critically sampled wavelet transform)

Process for generating a partially overcomplete wavelet transform of 2 levels (overcomplete expansion of level 2 only)

Process for generating a fully overcomplete wavelet transform of 2 levels

System for building Bayesian Network based classifer

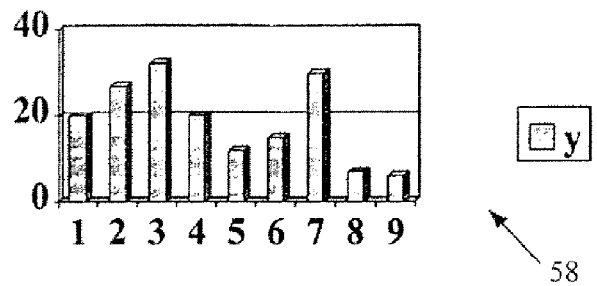
FIG. 24
FIG. 25
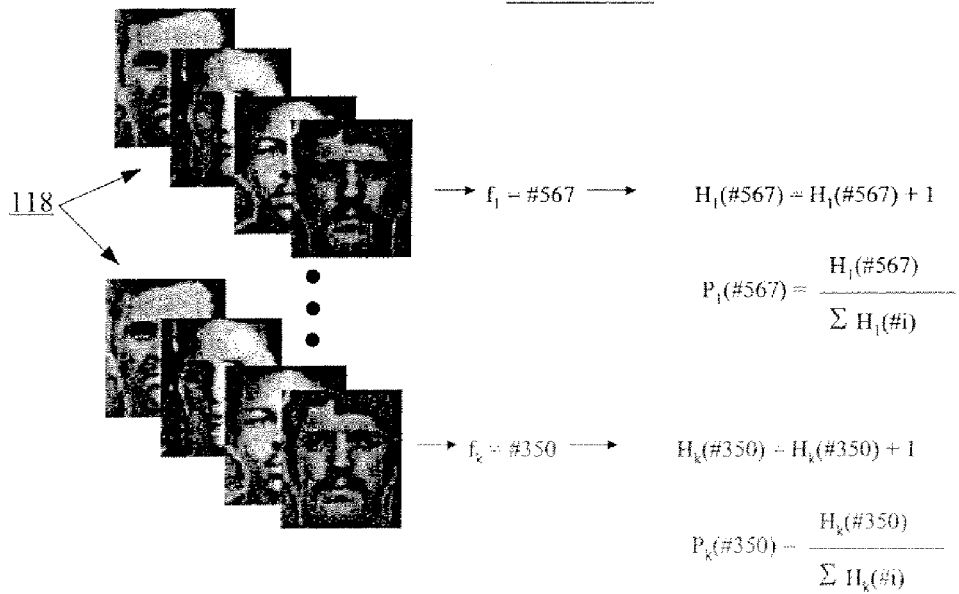

FIG. 31 Face Detection
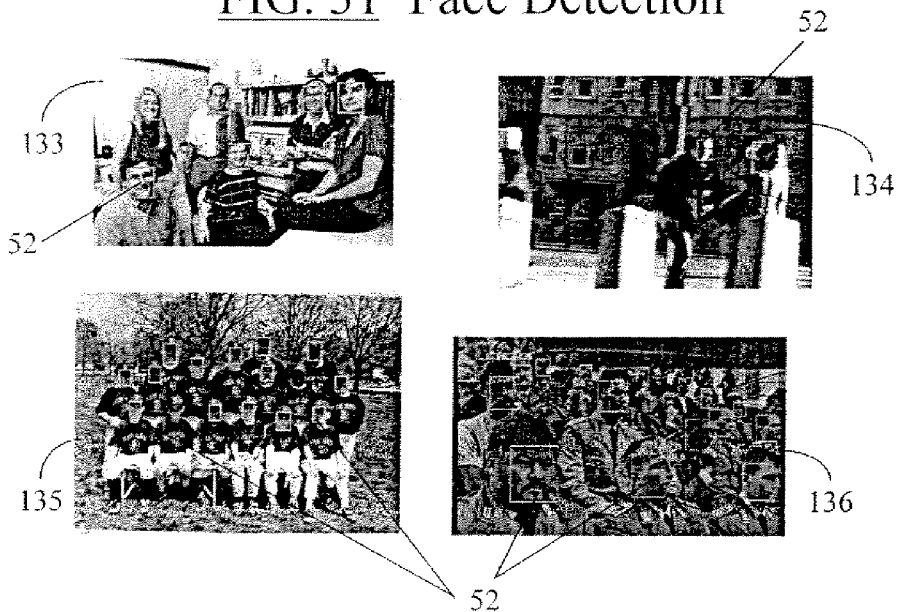
FIG. 32 Teapot Detection
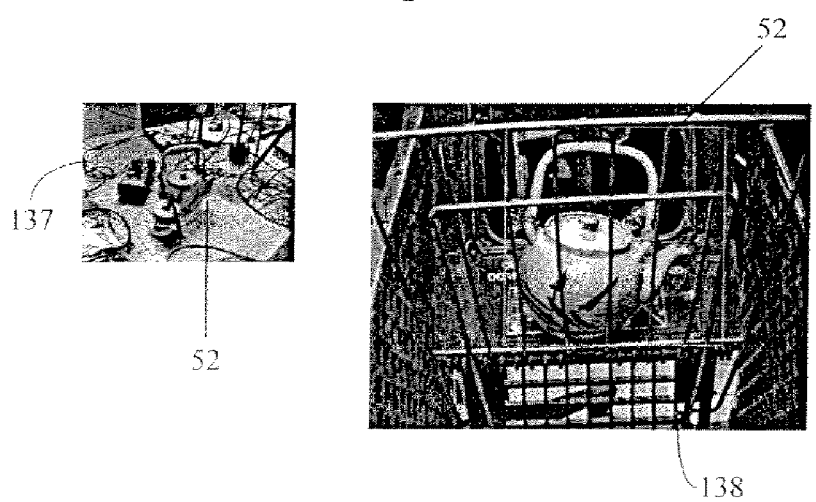

FIG. 33 Stop Sign Detection
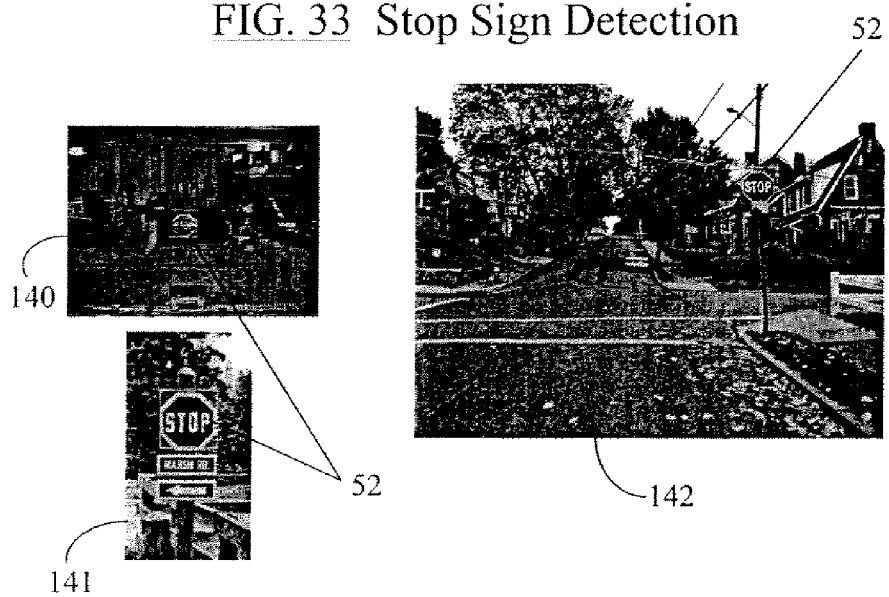
FIG. 34
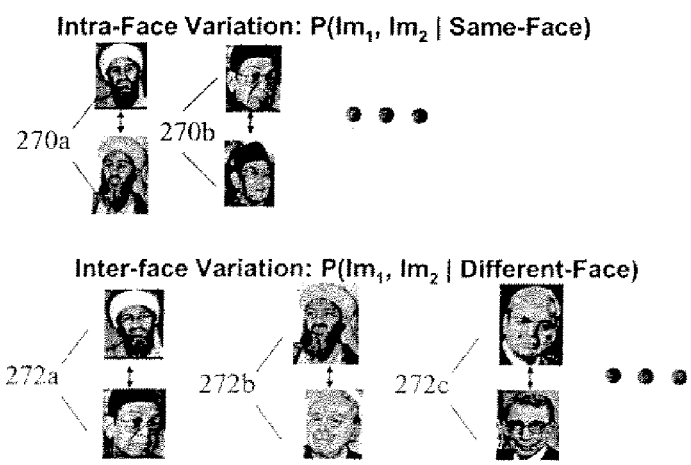
Decision: $P(Im_1, Im_2 \mid \text{Same-Face}) / P(Im_1, Im_2 \mid \text{Different-Face}) > \lambda$

OBJECT RECOGNIZER AND DETECTOR FOR TWO-DIMENSIONAL IMAGES USING BAYESIAN NETWORK BASED CLASSIFIER

REFERENCE TO RELATED APPLICATIONS

The present application is a divisional application of U.S. application Ser. No. 10/971,868 filed Oct. 22, 2004 now U.S. Pat. No. 7,848,566 and entitled "Object Recognizer and Detector For Two-Dimensional images Using Bayesian Network Based Classifier," the entirety of which is hereby incorporated by reference for all purposes. The disclosure in the present application is related to the earlier filed U.S. patent application Ser. No. 09/795,208, filed on Feb. 28, 2001 and titled "Object Finder for Photographic Images," now U.S. Pat. No. 6,829,384, and U.S. patent application Ser. No. 10/266,139, filed on Oct. 7, 2002 and titled "Object Finder for Two-Dimensional Images, and System for Determining a Set of Sub-Classifiers Composing an Object Finder," now U.S. Pat. No. 7,194,114, the disclosures of both of which are incorporated herein by reference in their entireties.

STATEMENT REGARDING FEDERALLY SPONSORED RESEARCH

The present disclosure has been developed using the grants MDA904-00-C-2109 and MDA904-03-C-1709 by the United States Department of Defense. The United States government may have certain rights in this disclosure.

BACKGROUND

1. Field of the Disclosure

The present disclosure generally relates to image processing and image recognition, and more particularly, to a system and method for recognizing and detecting 3D (three-dimensional) objects in 2D (two-dimensional) images using Bayesian network based classifiers.

2. Brief Description of Related Art

Object detection is the technique of using computers to automatically locate objects in images, where an object can be any type of a three dimensional physical entity such as a human face, an automobile, an airplane, etc. Object detection involves locating any object that belongs to a category such as the class of human faces, automobiles, etc. For example, a face detector would attempt to find all human faces in a photograph.

A challenge in object detection, is coping with all the variations in appearance that can exist within a class of objects. FIG. 1A illustrates a picture slide 10 showing some variations in appearance for human faces. For example, the class of human faces may contain human feces for males and females, young and old, bespectacled with plain eyeglasses or with sunglasses, etc. Similarly, for example, another class of objects—cars (not shown)—may contain cars that vary in shape, size, coloring, and in small details such as the headlights, grill, and tires. In case of humans, a person's race, age, gender, ethnicity, etc., may play a dominant role in defining the person's facial features. Also, the visual expression of a face may be different from human to human. One face may appear jovial whereas the other one may appear sad and gloomy. Visual appearance also depends on the surrounding environment and lighting conditions as illustrated by the picture slide 12 in FIG. 1B. Light sources will vary in their intensity, color, and location with respect to the object. Nearby objects may cast shadows on the object or reflect additional light on the object. Furthermore, the appearance of the object also depends on its pose, that is, its position and orientation with respect to the camera. In particular, a side view of a human face will look much, different than a frontal view. FIG. 1C shows a picture slide 14 illustrating geometric variation among human faces. Various human facial, geometry variations are outlined by rectangular boxes superimposed on the human, faces in the slide 14 in FIG. 1C.

Therefore, a computer-based object detector must accommodate all these variations and still distinguish the object from any other pattern that may occur in the visual world. For example, a human face detector must be able to find faces regardless of facial expression, variations in the geometrical relationship between the camera and the person, or variation in lighting and shadowing. Most methods for object detection use statistical modeling to represent this variability. Statistics is a natural way to describe a quantity that is not fixed or deterministic, such as a human face. The statistical approach is also versatile. The same statistical modeling techniques can potentially be used to build object detectors for different objects without re-programming.

Techniques for object detection in two-dimensional images differ primarily in the statistical model they use. One known method represents object appearance by several prototypes consisting of a mean and a covariance about the mean. Another known technique consists of a quadratic classifier. Such a classifier is mathematically equivalent to the representation of each class by its mean and covariance. These and other known techniques emphasize statistical relationships over the full extent of the object. As a consequence, they compromise the ability to represent small areas in a rich and detailed way. Other known techniques address this limitation by decomposing the model in terms of smaller regions. These methods can represent appearance in terms of a series of inner products with portions of the image. Finally, another known technique decomposes appearance further into a sum of independent models for each pixel.

The known techniques discussed above are limited, however, in that they represent the geometry of the object as a fixed rigid structure. This limits their ability to accommodate differences in the relative distances between various features of a human face such as the eyes, nose, and mouth. Not only can these distances vary from person to person, but also their projections into the image can vary with the viewing angle of the face. For this reason, these methods tend to fail for faces that are not in a fully frontal posture. This limitation is addressed by some known techniques, which allow for small amounts of variation among small groups of handpicked features such as the eyes, nose, and mouth. However, because they use a small set of handpicked features, these techniques have limited power. Another known technique allows for geometric flexibility with a more powerful representation by using richer features (each takes on a large set of values) sampled at regular positions across the full extent of the object. Each feature measurement is treated as statistically independent of all others. The disadvantage of this approach is that any relationship not explicitly represented by one of the features is not represented in the statistical model. Therefore, performance depends critically on the quality of the feature choices.

Additionally, all of the above techniques are structured such that the entire statistical model must be evaluated against the input image to determine if the object is present. This can be time consuming and inefficient. In particular, since the object can appear at any position and any size within the image, a detection decision must be made for every combination of possible object position and size within an image. It is therefore desirable to detect a 3D object in a 2D image over a wide range of variation in object location, orientation, and appearance.

It is also known that object detection may be implemented by forming a statistically based classifier to discriminate the object from other visual scenery. Such a scheme, however, requires choosing the form of the statistical representation and estimating the statistics from labeled training data. As a result, the overall accuracy of the detection program can be dependent on the skill and intuition of the human programmer. It is therefore desirable to design as much of the classifier as possible using automatic methods that infer a design based on actual labeled data in a manner that is not dependant on human intuition.

Furthermore, even with very high speed computers, known object detection techniques can require an exorbitant amount of time to operate. It is therefore also desirable to perform the object detection in a computationally advantageous manner so as to conserve time and computing resources.

It is also desirable to not only expeditiously and efficiently perform accurate object detection, but also to be able to perform object recognition to ascertain whether two input images belong to the same class of object or to different classes of objects, where often the notion of class is more specific such as images of one person.

SUMMARY

In one embodiment, the present disclosure is directed to a system and a method for detecting an object in a 2D (two-dimensional) image. The method of detection may include, for each of a plurality of view-based detectors, computing a transform of a digitized version of the 2D image containing a representation of an object, wherein the transform is a representation of the spatial frequency content of the image as a function of position in the image. Computing the transform generates a plurality of transform coefficients, wherein each transform coefficient represents corresponding visual information from the 2D image that is localized in space, frequency, and orientation. The method may also include applying the plurality of view-based detectors to the plurality of transform coefficients, wherein each view-based detector is configured to detect a specific orientation of the object in the 2D image based on visual information received from corresponding transform coefficients. Each of the plurality of view-based detectors includes a plurality of stages ordered sequentially where each stage is a classifier. The cascaded stages may be arranged in ascending order of computational complexity. The classifier forming each cascaded stage may be organized as a ratio of two Bayesian networks over relevant features, where each feature is computed from the transform coefficients. The cascaded stages may also be arranged in order of coarse to fine resolution of the image sites at which they evaluate the detector. The method includes combining results of the application of the plurality view-based detectors, and determining a pose (i.e., position and orientation) of the object from the combination of results of the application of the plurality view-based detectors.

In one general respect, the present disclosure is directed to a system for determining a classifier to discriminate between two classes. In one embodiment, the system is used by an object detection program, where the classifier detects the presence of a 3D (three dimensional) object in a 2D (two-dimensional) image. According to this embodiment, the classifier includes a cascade of sub-classifiers where each sub-classifier is based on a ratio of Bayesian networks. Construction of each sub-classifier involves a candidate coefficient-subset creation module, a feature creation module for use in representation of unconditional distributions, a probability estimation module, an evaluation module, a coefficient-subset selection module, a Bayesian network connectivity creation module, a feature creation module for use in representation of conditional distributions, a conditional probability estimation module, a detection threshold determination module, and a non-object example selection module.

The transform coefficients are the result of a wavelet transform operation performed on a two-dimensional (2D) digitized image where the 2D image may be subject to lighting correction and normalization. Computing the transform generates a plurality of transform coefficients, wherein each transform coefficient represents corresponding visual information from the 2D image that is localized in space, frequency, and orientation. The candidate coefficient-subset creation module may create a plurality of candidate subsets of coefficients. The feature creation module for unconditional distributions may assign a function mapping the values of each subset to a discrete valued variable. The probability estimation module will estimate probability distributions over each feature and coefficient for each class. The evaluation module evaluates the probability of each of a set of images on each probability distribution. The coefficient subset selection module will select a set of the candidate subsets. The Bayesian network connectivity creation module creates a Bayesian network graph used by the Bayesian networks for each of the two classes (object and non-object). This graph entails the dependencies and independencies resulting from the selected subsets. Another feature selection module may represent the variables at each Bayesian network node by a pair of discrete valued functions. A probability estimation module may estimate the probability distribution for each conditional probability distribution in each Bayesian Network. A non-object example selection module actively selects non-object examples for the next stage from a large database of images.

In one embodiment, the system according to the present disclosure automatically learns the following aspects of the classifier from labeled training data: the Bayesian network graph, the features computed at each node in the Bayesian network, and the conditional probability distributions over each node in the network, thereby eliminating the need for a human to select these parameters, which, as previously described, is highly subject to error.

In another general respect, the present disclosure is directed to a method for designing a discrete-valued variable representation at each node in a Bayesian network by a two-stage process of tree-structure vector quantization where the first stage constructs a tree over the conditioning variables and the second stage continues construction of the tree over the conditioned variables.

In a further general respect, the present disclosure is directed to a method for estimating the conditional probability distribution at each node in a Bayesian network by a process whereby a classifier is formed as the ratio of the classifiers for the two classes (object and non-object) and the probabilities of this classifier are estimated through, an iterative AdaBoost procedure.

In a further embodiment, the present disclosure is directed to a method of finding a Bayesian Network Graph by first finding a restricted Bayesian Network of two layers, where the parents of the second layer nodes are modeled as statistically independent and where the restricted Bayesian Network is chosen using criterion of area underneath ROC curve.

In a further general respect, the present disclosure is directed to a method of classifying two images as either belonging to the same class or to different classes. For example, in case of face recognition, a classifier according to the present disclosure may be employed on the two input images to determine whether the two given images are of the same person or not.

In one embodiment, the present disclosure contemplates a method, which comprises: receiving a digitized version of a two-dimensional (2D) image containing a 2D representation of a three-dimensional (3D) object; obtaining visual information from the digitized version of the 2D image; and classifying the 2D image based on a ratio of a plurality of graphical probability models using the visual information. The present disclosure also contemplates a computer-based system that implements this method, and a computer readable data storage medium that stores the necessary program code to enable a computer to perform this method.

In another embodiment, the present disclosure contemplates a method of providing assistance in detecting the presence of a 3D object in a 2D image containing a 2D representation of the 3D object. The method comprises: receiving a digitized version of the 2D image from a client site and over a communication network; determining a location of the 3D object in the 2D image using a Bayesian network-based classifier, wherein the classifier is configured to analyze the 2D image based on a ratio of a plurality of Bayesian networks; and sending a notification of the location of the 3D object to the client site over the communication network. The present disclosure also contemplates a computer system configured to perform such a method.

In a still further embodiment, the present disclosure contemplates a method of generating a classifier. The method comprises: computing a wavelet transform of each of a plurality of 2D images, wherein each the wavelet transform generates a corresponding plurality of transform coefficients; creating a plurality of candidate subsets of the transform coefficients; selecting a group of candidate subsets from the plurality of candidate subsets; and constructing the classifier based on a ratio of a plurality of Bayesian networks using the group of candidate subsets. The present disclosure also contemplates a computer-based system that implements such a method, and a computer readable data storage medium that stores the necessary program code to enable a computer to perform this method.

BRIEF DESCRIPTION OF THE DRAWINGS

For the present disclosure to be easily understood and readily practiced, the present disclosure will now be described for purposes of illustration and not limitation, in connection with the following figures, wherein:

FIG. 5 is a real-life illustration of the object classification approach outlined in FIG. 6;

FIG. 7 shows an example of different orientations for human faces and cars that the object finder program according to the present disclosure may be configured to model;

FIG. 10 shows a set of subbands produced by a wavelet transform based on a two-level decomposition of an input image using a filter-bank according to one embodiment of the present disclosure;

FIG. 11 depicts an input image and its wavelet transform representation using a symmetric 4/4 filter bank according to one embodiment of the present disclosure;

FIG. 24 shows an exemplary histogram;

FIG. 25 illustrates an example of how histograms are collected off-line using a set of training images according to one embodiment of the present disclosure;

FIG. 31 depicts various images of humans with the object markers placed on the human faces as detected by the object finder program according to one embodiment of the present disclosure;

FIG. 32 shows various images of teapots with the object markers placed on the teapots detected by the object finder program according to one embodiment of the present disclosure;

FIG. 33 illustrates various images of stop signs with the object markers placed on the stop signs detected by the object finder according to one embodiment of the present disclosure; and FIG. 34 depicts a process of face recognition according to one embodiment of the present disclosure.

DETAILED DESCRIPTION

Reference will now be made in detail to certain embodiments of the present disclosure, examples of which are illustrated in the accompanying figures. It is to be understood that the figures and descriptions of the present disclosure included herein illustrate and describe elements that are of particular relevance to the present disclosure, while eliminating, for the sake of clarity, other elements found in typical image processing or image detection systems. It is noted at the outset that the terms "connected", "connecting," "electrically connected," "in communication with," etc., are used interchangeably herein to generally refer to the condition of being electrically connected or being in electrical communication. Furthermore, the term "sub-classifier" is used hereinbelow to refer to a classifier (in a sequence of classifiers that constitute an "overall" classifier) at a particular stage of classification.

Figure 2:
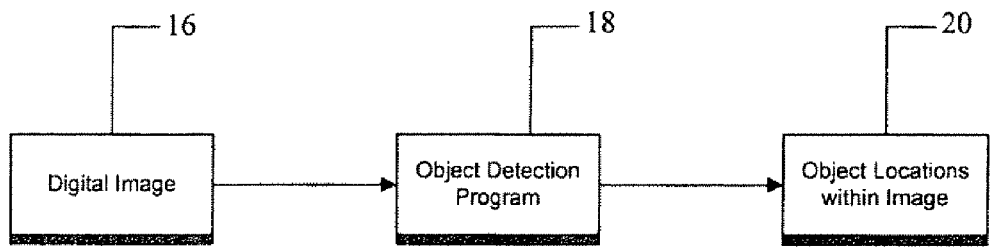
FIG. 2 illustrates a generalized operational flow for an object finder program according to one embodiment of the present disclosure.

FIG. 2 illustrates an embodiment of a generalized operational flow for the object detection program according to an embodiment of the present disclosure. The object detection program (simply, the "object detector" or "object finder") is represented by the block 18. A digital image 16 is a typical input to the object detector 18, which operates on the image 16 and generates a list of object locations and orientations (block 20) for the 3D objects represented in the 2D image 16. It is noted that the terms "image" and "digital image" are used interchangeably hereinbelow. However, both of these terms are used to refer to a 2D image (e.g., a photograph) containing two-dimensional representations of one or more 3D objects (e.g., human, faces, cars, etc.). In one embodiment, as discussed hereinbelow in more detail, the object finder 18 may place object markers 52 (FIG. 5) on each object detected in the input image 16 by the object finder 18. The input image may be an image file digitized in one of many possible formats including, for example, a BMP (bitmap) file format, a PGM (Portable Grayscale bitMap graphics) file format, a JPG (Joint Photographic Experts Group) file format, or any other suitable graphic file format. In a digitized image, each pixel is represented as a set of one or more bytes corresponding to a numerical representation (e.g., a floating point number) of the light intensity measured by a camera at the sensing site. The input image may be gray-scale, i.e., measuring light intensity over one range of wavelength, or color, making multiple measurements of light intensity over separate ranges of wavelength.

Figure 3:
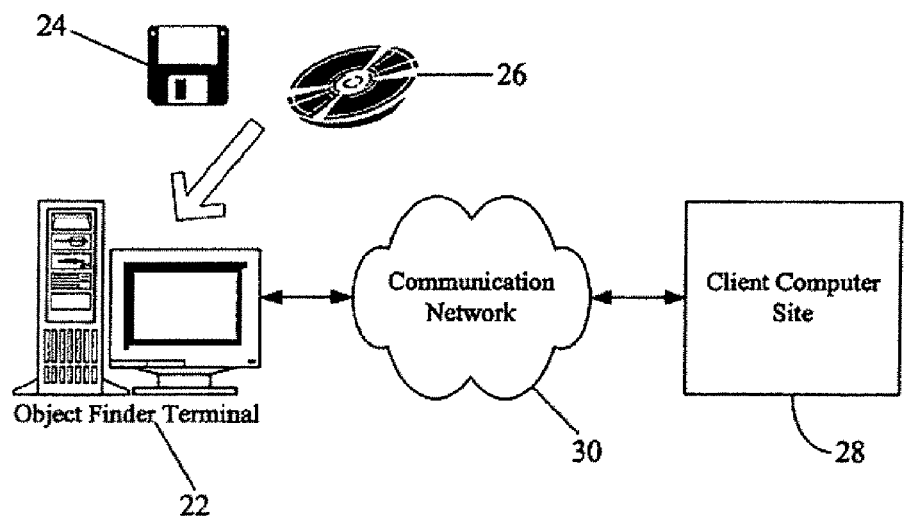
FIG. 3 depicts an exemplary setup to utilize the object finder program according to an embodiment of the present disclosure.

FIG. 3 depicts an exemplary setup to utilize the object detector program 18 according to one embodiment of the present disclosure. An object finder terminal or computer 22 may execute or "run" the object finder program application 18 when instructed by a user. The digitized image 16 may first be displayed on the computer terminal or monitor display screen and, after application of the object finder program 18, a marked-up version of the input image (e.g., picture slide 50 in FIG. 5) may be displayed on the display screen of the object finder terminal 22. The program code for the object finder program application 18 may be stored on a portable data storage medium, e.g., a floppy diskette 24, a compact disc 26, a data cartridge tape (not shown) or any other magnetic, solid state, or optical data storage medium. The object finder terminal 22 may include appropriate disk drives to receive the portable data storage medium and to read the program code stored thereon, thereby facilitating execution of the object tinder software. The object finder software 18, upon execution by a processor of the computer 22, may cause the computer 22 to perform a variety of data processing and display tasks including, for example, analysis and processing of the input image 16, display of a marked-up version of the input image 16 (e.g., slide 50 in FIG. 5) identifying locations and orientations of one or more 3D objects in the input image 16 detected by the object finder 18, transmission of the marked-up version of the input image 16 to a remote computer site 28 (discussed in more detail hereinbelow), transmission of a list of object identities, locations and, orientations for the 3D objects represented in the 2D image to a remote computer site 28 (discussed in more detail hereinbelow) etc.

As illustrated in FIG. 3, in one embodiment, the object finder terminal 22 may be remotely accessible from a client computer site 28 via a communication network 30. In one embodiment, the communication network 30 may be an Ethernet LAN (local area network) connecting all the computers within a facility, e.g., a university research laboratory or a corporate data processing center. In that case, the object finder terminal 22 and the client computer 28 may be physically located at the same site, e.g., a university research laboratory or a photo processing facility. In alternative embodiments, the communication network 30 may include, independently or in combination, any of the present or future wireline or wireless data communication networks, e.g., the Internet, the PSTN (public switched telephone network), a cellular telephone network, a WAN (wide area network), a satellite-based communication link, a MAN (metropolitan area network) etc.

The object finder terminal 22 may be, e.g., a personal computer (PC), a laptop computer, a workstation, a minicomputer, a mainframe, a handheld computer, a small computing device, a graphics workstation, or a computer chip embedded as part of a machine or mechanism (e.g., a computer chip embedded in a digital camera, in a traffic control device, etc.). Similarly, the computer (not shown) at the remote client site 28 may also be capable of viewing and manipulating digital image files and digital lists of object identities, locations and, orientations for the 3D objects represented in the 2D image transmitted by the object finder terminal 22. In one embodiment, as noted hereinbefore, the client computer site 28 may also include the object finder terminal 22, which can function as a server computer and can be accessed by other computers at the client site 28 via a LAN. Each computer—the object finder terminal 22 and the remote computer (not shown) at the client site 28—may include requisite data storage capability in the form of one or more volatile and non-volatile memory modules. The memory modules may include RAM (random access memory), ROM (read only memory) and HDD (hard disk drive) storage. Memory storage is desirable in view of sophisticated image processing and statistical analysis performed by the object finder terminal 22 as part of the object detection process.

Before discussing how the object detection process is performed by the object detector software 18, it is noted that the arrangement depicted in FIG. 3 may be used to provide a commercial, network-based object detection service that may perform customer-requested object detection in real time or near real time. For example, the object finder program 18 at the computer 22 may be configured to detect human faces and then human eyes in photographs or pictures remotely submitted to it over the communication network 30 (e.g., the Internet) by an operator at the client site 28. The client site 28 may be a photo processing facility specializing in removal of "red eyes" from photographs or in color balancing of color photographs. In that case, the object finder terminal 22 may first automatically detect all human faces and then all human eyes in the photographs submitted and send the detection results to the client computer site 28, which can then automatically remove the red spots on the faces pointed, out by the object finder program 18. Thus, the whole process can be automated. As another example, the object finder terminal 22 may be a web server running the object finder software application 18. The client site 28 may be in the business of providing commercial image databases. The client site 28 may automatically search and index images on the World Wide Web as requested by its customers. The computer at the client site 28 may "surf" the web and automatically send a set of images or photographs to the object finder terminal 22 for further processing. The object finder terminal 22, in turn, may process the received images or photographs and automatically generate a description of the content of each received image or photograph. The depth of image content analysis may depend on the capacity of the object finder software 18, i.e., the types of 3D objects (e.g., human faces, cars, trees, etc.) the object finder 18 is capable of detecting. The results of image analysis may then be transmitted back to the sender computer at the client site 28. As a further example, a face detector may be used as a system to track attention and gaze of customers in a retail setting whereby the face detector automatically determines the locations and direction of each person's head and can infer what items the person is looking at. Such behavior can then be automatically logged to construct a record of how often items are viewed by customers and related to records of purchase for the same items.

It is noted that the owner or operator of the object finder terminal 22 may commercially offer a network-based object finding service, as illustrated by the arrangement in FIG. 3, to various individuals, corporations, or other facilities on a fixed-fee basis, on a per-operation basis or on any other payment plan mutually convenient to the service provider and the service recipient.

Object Finding Using a Classifier

Figure 4A:
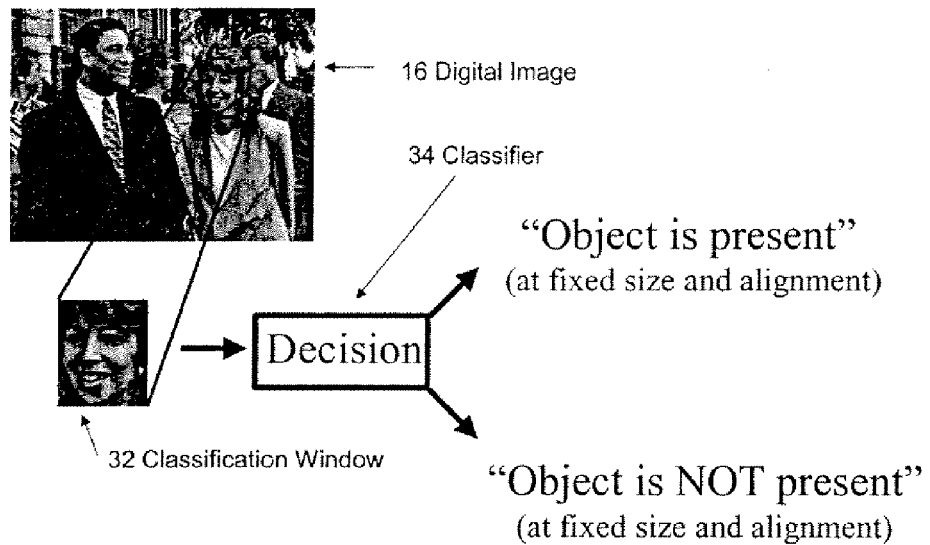
FIGS. 4A and 4B illustrate the classification decision process involving a fixed object size, orientation, and alignment according to one embodiment of the present disclosure.
Figure 4B:
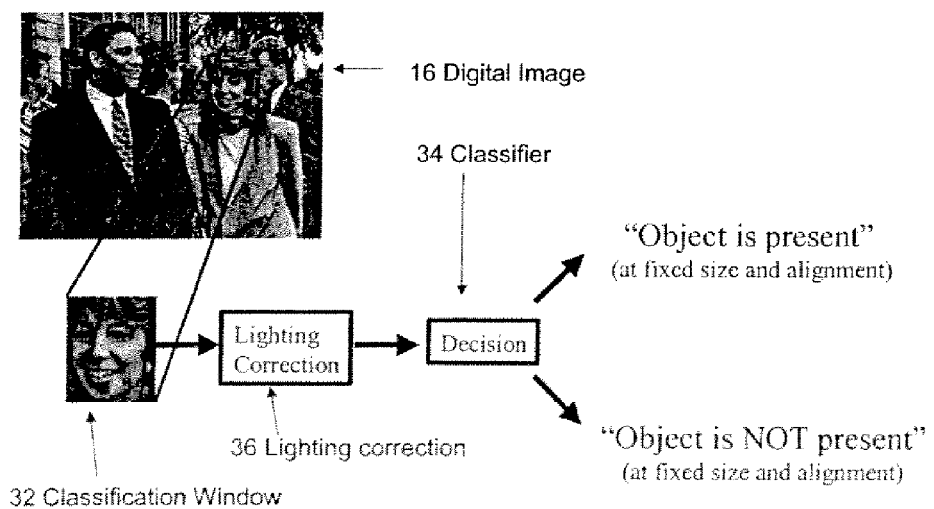

A primary component of the object finder 18 is a classifier or detector. FIG. 4A illustrates an "overall" classifier (or detector) 34 according to one embodiment of the present disclosure. It is discussed hereinbelow that this "overall" classifier 34 is constructed of a sequence of classifiers, where each such classifier in the sequence is referred to hereinbelow interchangeably as a "sub-classifier" or simply a "classifier". Thus, although the same term "classifier" is used below to refer to the "overall" classifier 34 and one of its constituent parts (or a "sub-classifier"), it is observed that which "classifier" is referred to at any given point in discussion will be evident from the context of discussion. The input to the classifier 34 is a fixed-size window 32 sampled from an input image 16. The classifier 34 operates on the fixed size image input 32 and makes a decision whether the object is present in the input window 32. The decision can be a binary one in the sense that the output of the classifier 34 represents only two values—either the object is present or the object is not present, or a probabilistic one indicating a probability from 0 to 1 (or over another scale) indicating the probability that the object is present. In one embodiment, the classifier only identifies the object's presence when it occurs at a pre-specified range of size and alignment within the window. It is noted that lighting correction (discussed in detail later hereinbelow) may be necessary to compensate for differences in lighting. In one embodiment, a lighting correction process 36 precedes evaluation by the classifier 34 as illustrated in FIG. 4B.

Figure 1A:
FIGS. 1A-1C illustrate difference challenges in object detection.
Figure 1B:
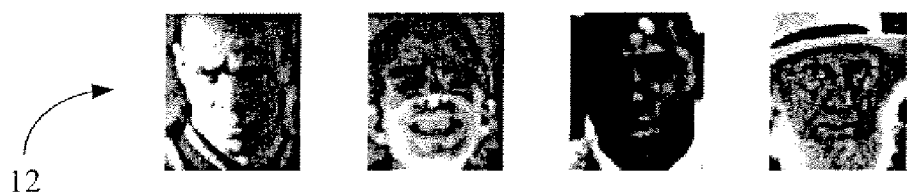
Figure 1C:

As noted hereinbefore, a challenge in object detection is the amount of variation in visual appearance, e.g., faces vary from person to person, with varying facial expression, lighting, position and size within the classification window, etc., as shown in FIGS. 1A-1C. The classifier 34 in FIGS. 4A-4B may use statistical modeling to account for this variation.

In one embodiment, two statistical distributions are part of each classifier—the statistics of the appearance of the given object in the image window 32, $P(\text{image-window}|\omega_1)$ where $\omega_1$=object, and the statistics of the visual appearance of the rest of the visual world, which are identified by the "non-object" class, $P(\text{image-window}|\omega_2)$, where $\omega_2$=non-object. The specification of these distributions will be described hereinbelow under the "Classifier Design" section. The classifier 34 may combine these two conditional probability distributions in a likelihood ratio test. Thus, the classifier 34 (or the "overall" classifier) may compute the classification decision by retrieving the probabilities associated with the given input image window 32, $P(\text{image-window}|\omega_1)$ and $P(\text{image-window}|\omega_2)$, and using the log likelihood ratio test given in equation (1) below:

$$H(\text{image\_window}) = \log\frac{P(\text{image\_window}|\omega_1)}{P(\text{image\_window}|\omega_2)} > \lambda \quad (1)$$

$$\text{where, } \left(\lambda = \log\frac{P(\omega_2)}{P(\omega_1)}\right)$$

If the log likelihood ratio (the left side in equation (1)) is greater than the right side ($\lambda$), the classifier 34 may decide that the object is present. Here, "$\lambda$" represents the logarithm of the ratio of prior probabilities (determined off-line as discussed later hereinbelow). Often, prior probabilities are difficult to determine, therefore, by writing the decision rule this way (i.e., as in the equation-1, all information concerning the prior probabilities may be combined into one term "$\lambda$".

The term "$\lambda$" can be viewed as a threshold controlling the sensitivity of a classifier (e.g., the classifier 34). There are two types of errors a classifier can make. It can miss the object (a false negative) or it can mistake something else for the object (a false positive) (such as a cloud pattern for a human face). These two types of errors are not mutually exclusive. The "$\lambda$" controls the trade-off between these forms of error. Setting "$\lambda$" to a low value makes the classifier more sensitive and reduces the number of false negatives, but increases the number of false positives. Conversely, increasing the value of "λ" reduces the number of false positives, but increases the number of false negatives. Therefore, depending on the needs of a given application, a designer can choose "λ" empirically to achieve a desirable compromise between the rates of false positives and false negatives.

It is noted that the log likelihood ratio test given in equation-1 is equivalent to Bayes decision rule (i.e., the maximum a posteriori (MAP) decision rule) and will be optimal if the representations for P(image-window|object) and P(image-window|non-object) are accurate. The functional forms that may be chosen to approximate these distributions are discussed later hereinbelow under the "Classifier Design" section.

Figure 8A:
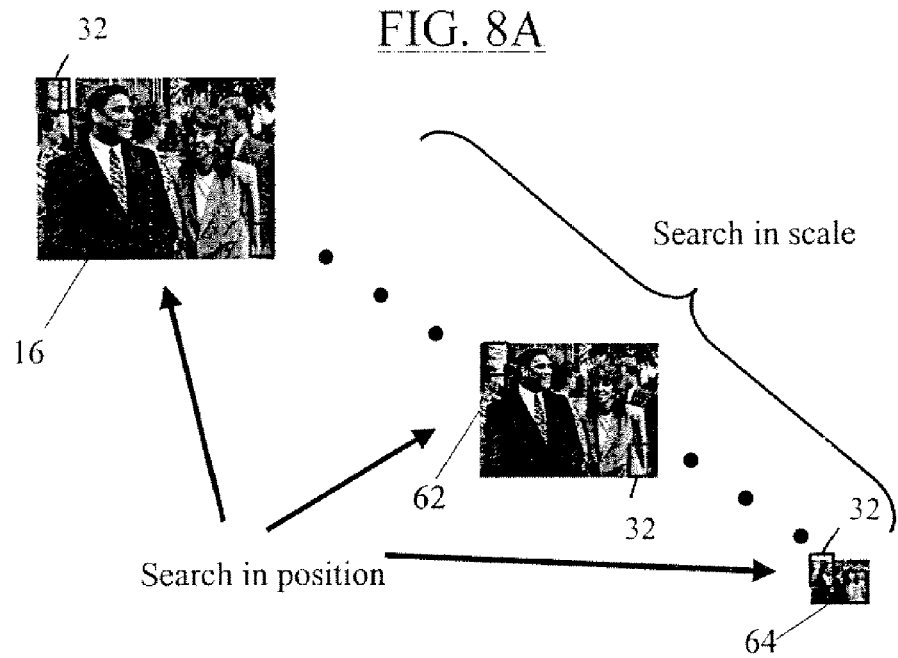
FIG. 8A depicts the general object detection approach used by the object finder program according to one embodiment of the present disclosure involving an exhaustive search over position and scale.

FIG. 8A depicts the general object detection approach used by the object detector program 18 according to one embodiment of the present disclosure. The object detector must apply the classifier 34 repeatedly to original image 16 at regularly spaced (and, usually overlapping) positions of the rectangular image window 32 as shown in FIG. 8A. The process makes it possible for the object detector 18 to detect instances of the object at any position within an image. Then, to be able to detect the object at any size, the object detector program 18 may iteratively resize the input image and re-apply the classifier in the same fashion to each resized image 62 and 64, as illustrated in FIG. 8A. The illustrations in FIG. 8A show an exhaustive left-to-right, row-by-row scanning of the input image (and two of its scaled versions 62, 64) using the rectangular window 32. It is noted that the size of the rectangular image window 32 may remain fixed throughout the whole detection process. The size of the image window 32 may be empirically selected based on a number of factors including, for example, object shape, desired accuracy or resolution, resulting computational complexity, efficiency of program execution, etc. In one embodiment, the size of the rectangular window is 32×24 pixels.

Figure 6:
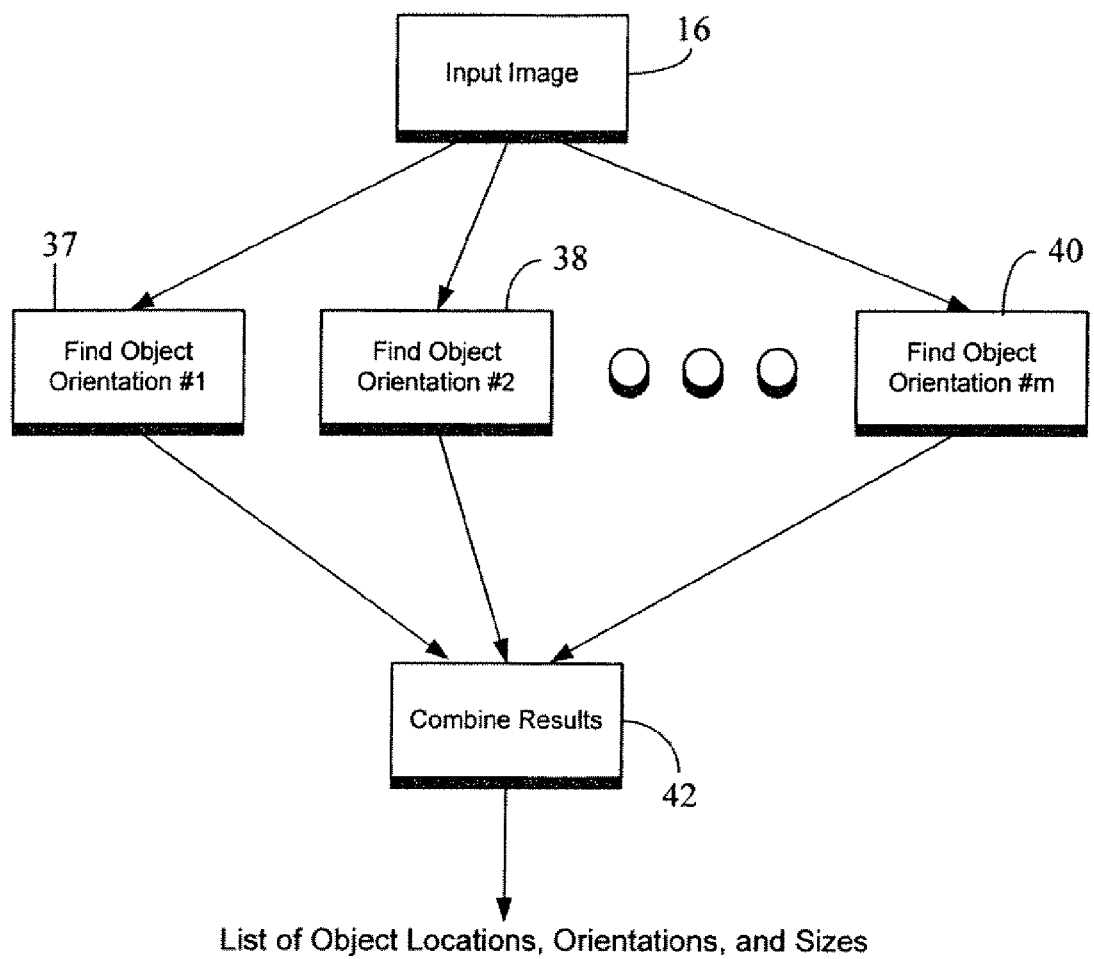
FIG. 6 shows an exemplary view-based classification approach utilized by the object finder program according to the present disclosure to detect object locations and orientations.

A classifier may be specialized not only in object size and alignment, but also object orientation. In one embodiment shown in FIG. 5, the object detector 18 uses a view-based approach with multiple classifiers that are each specialized to a specific orientation of the object as described and illustrated with respect to FIG. 6. Thus, a predetermined number of view-based classifiers may be applied in parallel to the input image 16 to find corresponding object orientations. In the embodiment illustrated in FIG. 6, there are "m" view-based classifiers (three of which 37, 38, and 40 are shown in FIG. 6). Each of the view-based classifiers is designed to detect one orientation of a particular object (e.g., a human face). Blocks 37, 38, and 40 represent view-based classifiers designed to detect object orientations 1, 2, . . . , m. The results of the application of the view-based classifiers are then combined at block 42. The combined output indicates specific 3D objects (e.g., human faces) present in the input 2D image.

It is noted that although the following discussion illustrates application of the object detector program 18 to detect human faces and cars in photographs or other images, that discussion is for illustrative purpose only. It can be easily evident to one of ordinary skill in the art that the object detector program 18 of the present disclosure may be trained or modified to detect different other objects (e.g., shopping carts, faces of cats, helicopters, etc.) as well.

FIG. 5 is a real-life illustration, of the object classification approach outlined in FIG. 6. As noted hereinbefore, each view-based classifier (e.g., the classifiers 37, 38, and 40 in FIG. 6) is specialized to detect a specific orientation of a given object—i.e., the object (e.g., a human face, or a car) that the view-based classifier is trained to detect. As illustrated in FIG. 5, for example, one classifier may be specialized to detect right profile views of faces as shown by the object marker 52 (generated by the classifier upon detecting the corresponding object orientation) in the picture slide 44. The picture slide 44 may thus represent the result obtained at block 37 in FIG. 6. Similarly, a different view-based classifier may be specialized to detect frontal views as illustrated by the marked-up version of the picture slide 46 in FIG. 5 (corresponding, for example, to block 38 in FIG. 5). Finally, another classifier may be configured to detect left profile views of human faces as illustrated by the marked-up version of the picture slide 48 in FIG. 5 (corresponding, for example, to block 40 in FIG. 5). Each picture slide shows object markers 52 placed at appropriate orientations of human faces detected by corresponding classifiers. These view-based classifiers are applied to the input image 16 in parallel and their results are then combined as shown by the final picture slide 50 in FIG. 5 (corresponding, for example, to the block 42 in FIG. 6). If there are multiple detections at the same or adjacent locations, the object detector 18 may choose the strongest detection. For example, in FIG. 5, picture slides 46 and 48 represent multiple detections (frontal face detection and left-hand side view detection) for the female face illustrated therein. In that event, the final combined output (in slide 50) may represent the strongest detection—i.e., the frontal face detection in slide 46. The object detector 18 may thus find orientations and locations of multiple objects (e.g., several human faces) in an image.

FIG. 7 shows an example of different orientations for human faces and cars that the object detector program 18 may be configured to model. The number of orientations to model for each object (e.g., a human face or a car) may be empirically determined. In the embodiment illustrated in FIG. 7, two view-based classifiers—frontal (54A) and right profile (54B)—are used to detect front and right profiles of human faces. To detect left-profile faces (as, for example, illustrated in the picture slide 48 in FIG. 5), the right profile classifier 54B may be applied to a mirror-reversed, input image. For cars, eight classifiers—one frontal classifier 56A and seven right-side classifiers 56B-56H—may be used as shown in FIG. 7. Again, the left side views (of cars) may be detected by running the seven right-side classifiers (56B-56H) on mirror-reversed images. It is noted that the numerals 54A-54B and 56A-56H are used hereinbelow to represent corresponding view-based classifiers for ease of description.

Searching for the Object Using a Classifier

As mentioned hereinbefore, the detector 18 has to scan this classifier 34 across the image in position and scale in order to find instances of an object as shown in FIG. 8A. This process applied directly, however, can consume a great amount of computational time. In one embodiment, several computational techniques and heuristic strategies, described hereinbelow, are employed to reduce the amount of computation.

It is efficient to do as little computation as possible each time the detector 18 evaluates a classifier 34 at a candidate window 32 position. In particular, a partial evaluation of the classifier (equation (3) below) may be sufficient to accurately decide that a candidate belongs to the non-object class. According to one embodiment of the present disclosure, for each scaled version of the input image, (for example, versions 62 and 64 in FIG. 8A), the detector 18 may be applied in a cascade of sequential stages of partial evaluation, where each stage performs a partial evaluation of the classifier. Each of these stages of evaluation can be considered a sub-classifier.

Each such sub-classifier (in equation (2) below) forms a representation of the log-likelihood ratio given hereinbefore by equation (1):

$$h_i(\text{image\_window}) = \log \frac{P_i(\text{image\_window}|\omega_1)}{P_i(\text{image\_window}|\omega_2)} \quad (2)$$

It is noted that the functional forms chosen to approximate the distributions in equation (2) are discussed hereinbelow under the "Classifier Design" section. Together, the sum of the sub-classifiers from all of the stages of a classifier may constitute the "overall" classifier as given by equation (1) and also represented below in equation (3).

$$H(\text{image\_window}) = \sum_{i=1}^{n} h_i(\text{image\_window}) \quad (3)$$

Figure 9:
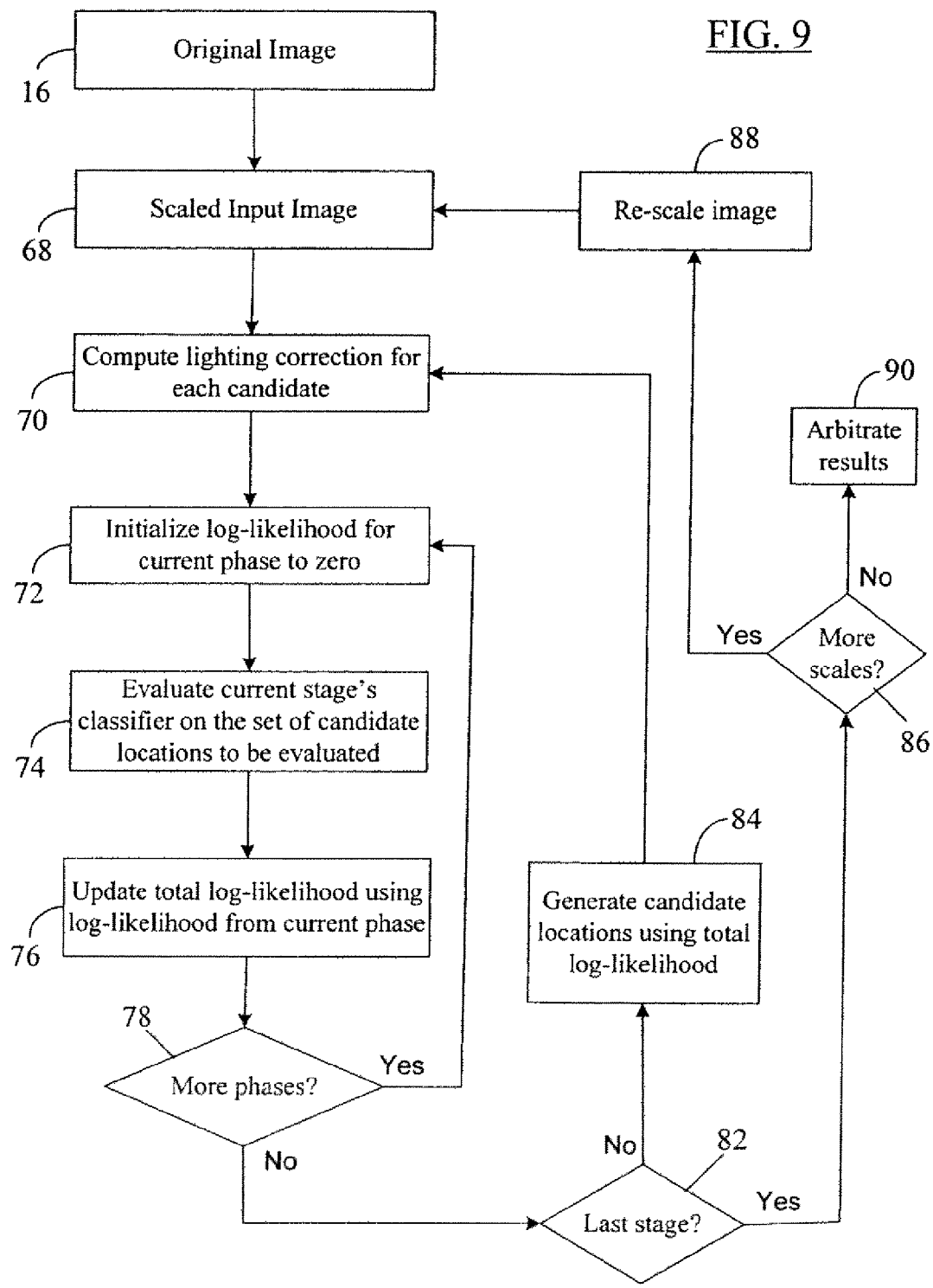
FIG. 9 depicts one embodiment of the object detection process according to the present disclosure.

Turning to FIG. 9 (discussed later hereinbelow), in one embodiment, the set of image window 32 locations to be evaluated by each classifier stage may be determined at block 84. The set of image window 32 locations to be evaluated can initially be a set of all possible image window 32 locations. The criterion for updating the set of image window 32 locations to be evaluated may be the current total log-likelihood ratio corresponding to each location. Locations with a current total-log-likelihood ratio below a predetermined threshold may be dropped from the set of image window 32 locations to be evaluated. Thus the number of candidate locations to be evaluated may be reduced at each successive iteration of this process.

It is noted that a cascade evaluation strategy using equations (2) and (3) can be a many step process, where a partial evaluation of equation (3) can be done incrementally. After evaluating each sub-classifier (e.g., sub-classifier $h_1$) or a group of sub-classifiers (e.g., sub-classifiers $h_1$, $h_2$, and $h_3$), the classifier may compute a partial sum of terms in equation (3). After the computation of the $k^{th}$ sub-classifier, this sum would be given by:

$$H(\text{image-window}) = \sum_{i=1}^{k} h_i(\text{image-window}) \quad (4)$$

After each sub-classifier evaluation is completed, the classifier may apply a threshold, $\lambda_k$, to the partial sum in equation (4) and remove additional candidates (i.e. parts of the image being searched) from further consideration as shown and discussed hereinbelow. Thus, the cascade evaluation strategy focuses on sub-classifier-by-sub-classifier analysis and builds on earlier computations to generate the final result.

The threshold for the log-likelihood at each stage of classification may be pre-determined by a process of evaluating the current stages of the classifier on the cross-validation images (block 165 in FIG. 17B discussed later hereinbelow). Block 165 may set this threshold to match a specified performance metric such as, for example, correct detection of 95% of the pre-labeled instances of the object (e.g., a human face, or a car, etc.).

Figure 8B:
FIG. 8B illustrates the positional step size used in a search over position.
Figure 8C:
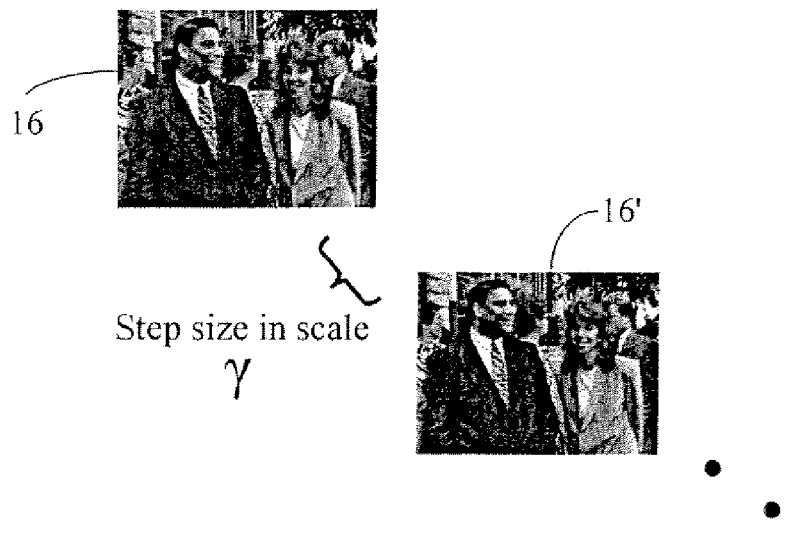
FIG. 8C illustrates the step size in scale used in a search over scale.
Figure 8D:
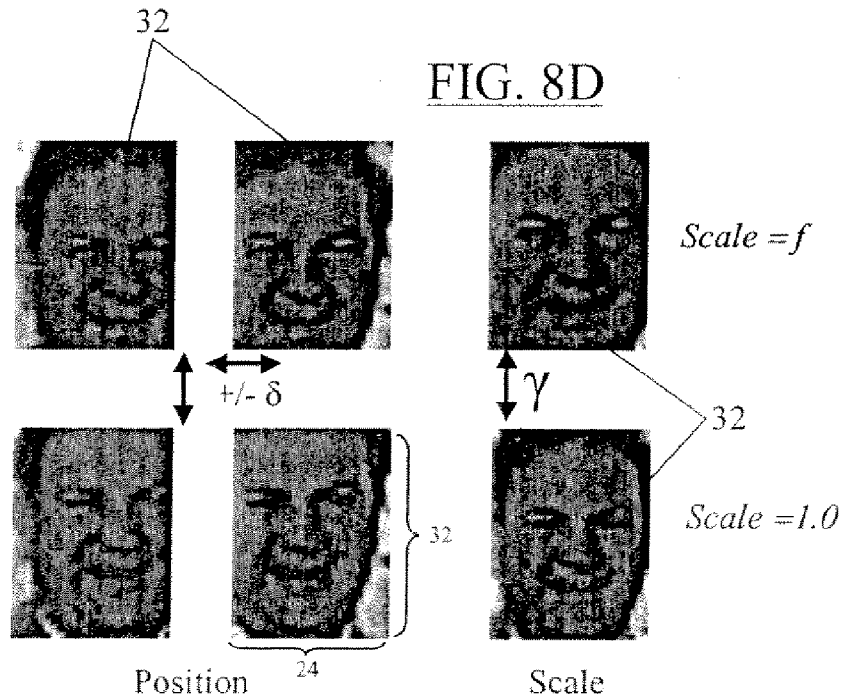
FIG. 8D illustrates the positional and scale invariance that a classifier must tolerate given a positional step size and a scale step size.

As described earlier with respect to FIG. 8A, the object detector 18 may apply the classifier 34 repeatedly to original image 16 at regularly spaced (and, usually overlapping) positions of this rectangular image window 32 and iteratively re-apply the classifier in the same fashion to each resized image 62 and 64. The step size, δ, for moving this window in position (FIG. 8B) and the step size, γ, for scaling the window in size (FIG. 8C) may influence the speed of this process. The original image 16 and its scaled version 16' (obtained by scaling the original image 16 by the step size "γ") are illustrated in FIG. 8C. Bigger step sizes (γ, δ) may reduce the amount of times the classifier must be evaluated and reduce overall computation time. However, a trade-off is that the classifier 34 (FIGS. 4A, 4B) must be able to accurately classify the presence of the object over a greater range of variation in the size and position of the object as illustrated in FIG. 8D, where variations in object position (step size "δ") and scale (step size "γ") are illustrated for a given object image window 32 of 24×32 pixels.

According to one embodiment of the present disclosure, the early stages of evaluation differ from the later stages in the positional spacing ("δ" in FIG. 8B) of the evaluation sites. Early stages may use a coarse spacing, for example, 4 pixels in both the horizontal and vertical dimensions, between evaluation sites. Whereas, the later stages may use a finer spacing, e.g., spacing of 2 pixels, and the last stages may use a spacing of 1 pixel. This evaluation strategy could be thought of as a "coarse-to-fine" strategy whereby the early stages evaluate the image at coarse resolution and the later stages evaluate it at a finer resolution. In this strategy, the early stages can quickly remove much of the image from consideration and do so quickly by evaluating the image at a coarse spacing. The later stages can then evaluate the remaining sites by using a more discriminative classifier where it does not represent as much invariance in object position (see, for example, the finer evaluation illustrated in FIG. 8D).

In one embodiment, an evaluation strategy may use a multi-resolution representation of the input image based on a wavelet transform to achieve a coarse-to-fine search method. In this embodiment, the input variables are wavelet coefficients, generated by applying 5/3 or 4/4 symmetric filter banks to the input pixels. In one embodiment, the coefficients of a symmetric 4/4 filter bank are (1.0, 3.0, 3.0, 3.0) for the low-pass filter and (−1.0, −3.0, 3.0, 1.0) for the high pass filter. In another embodiment, the coefficients of 5/3 filter bank are (−1.0, 2.0, 6.0, 2.0, −1.0) for the low pass filter and (2.0, −4.0, 2.0) for the high-pass filter. Filter-bank implementation for any filter-pair is discussed in G. Strang and T. Nguyen, "Wavelets and Filter Banks", Wellesley-Cambridge Press, 1997, the disclosure of which is incorporated herein by reference.

FIG. 10 shows an exemplary set of subbands 60A-60D and 62A-62C produced by a wavelet transform using a 2 (two) level decomposition of an input image. The wavelet transform organizes the input image into subbands that are localized in orientation and frequency. For the embodiment illustrated in FIG. 10, a 4/4 filter-bank (not shown) may produce 7 (seven) subbands—four subbands 60A-60D at level-2 and three subbands 62A-62C at level-1. Within each subband, each wavelet transform coefficient 66 (FIG. 11) is spatially localized. It is noted that in terms of orientation, the term "LH" in FIG. 10 denotes low-pass filtering in the horizontal direction and high-pass filtering in the vertical direction, i.e., representation of horizontal features, such as, for example, human lips, eyelids, etc. Similarly, the term "HL" may denote high-pass filtering in the horizontal direction and low-pass filtering in the vertical direction, i.e., representation of vertical features, such as, for example, a human nose. Thus, vertical subbands (LH) may be considered as representing horizontal features of an object, whereas the horizontal subbands (HL) may be considered as representing vertical features.

Finally, the terms "HH" may denote high-pass filtering in both horizontal and vertical directions, and "LL" may denote low-pass filtering in both horizontal and vertical directions.

FIG. 11 depicts an input window 32 and its two level wavelet transform representation 64 generated by a symmetric 4/4 filter bank (not shown). Seven subbands (similar to those shown in FIG. 10) are visible on the wavelet decomposition 64. The wavelet transform coefficients 66 are also shown in FIG. 11. The coefficients 66, as discussed above, are spatially localized within appropriate subbands. It is noted that each level in a wavelet transform 64 represents a lower octave of frequencies. Thus, a coefficient in level-2 (i.e., subbands 60A-60D in FIG. 10) describes 4 (four) times the area of a coefficient in level-1 (i.e., subbands 62A-62C in FIG. 10). In other words, the wavelet representation 64 shows a gradation of details (of the input image) with level-2 coefficients representing coarse details and level-1 coefficients representing finer details.

In one embodiment a wavelet transform is generated by a polyphase filter bank (not shown) or other suitable computational method (e.g., "lifting") applied to the input image 16 and each scaled version of the input image (e.g., versions 62 and 64 shown in FIG. 8A), as described in the Strang and Nguyen article mentioned above.

Figure 12A:
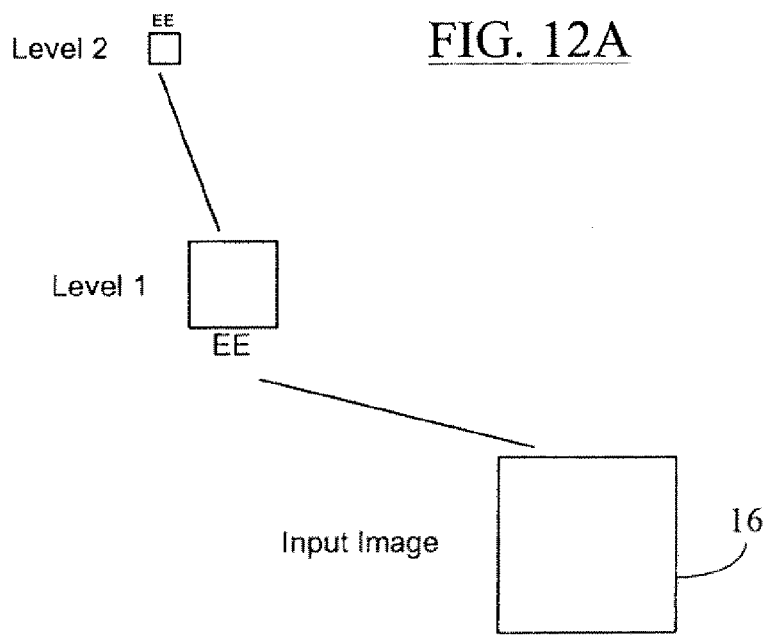
FIGS. 12A through 12C illustrate a wavelet decomposition, a partially overcomplete wavelet decomposition, and a fully overcomplete wavelet decomposition, respectively, for a two level wavelet transform.

In one embodiment, each wavelet transform may consist of two (2) or more levels (see, for example. FIG. 10 for a two level representation). The wavelet transform representation may be generated by the process shown in FIG. 12A. In this process, an input image 16 (or its scaled version) is first transformed to a level-1 transform. The LL subband of level-1 is then expanded to generate the level-2. If a third level or more levels are desired, each level is generated from the LL subband of the level that preceded it. This embodiment of FIG. 12A is referred to hereinbelow as a "critically sampled" wavelet transform.

Figure 12B:
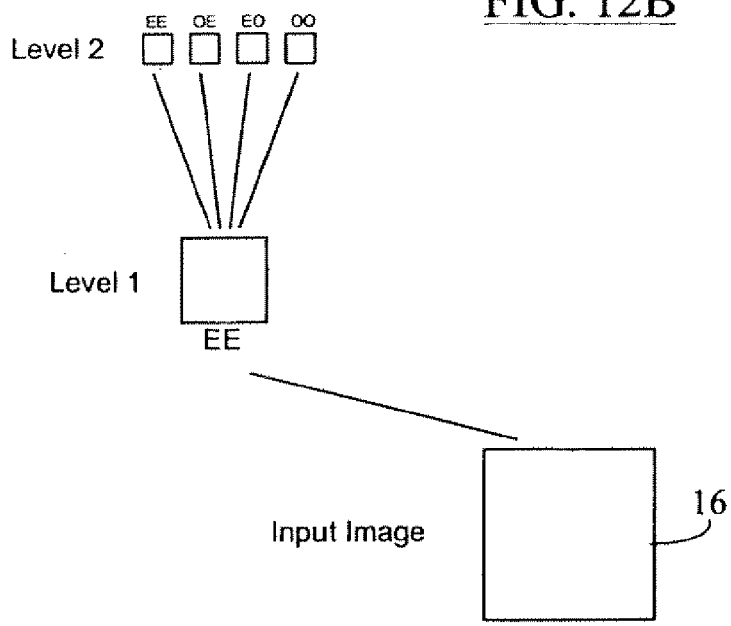
Figure 12C:
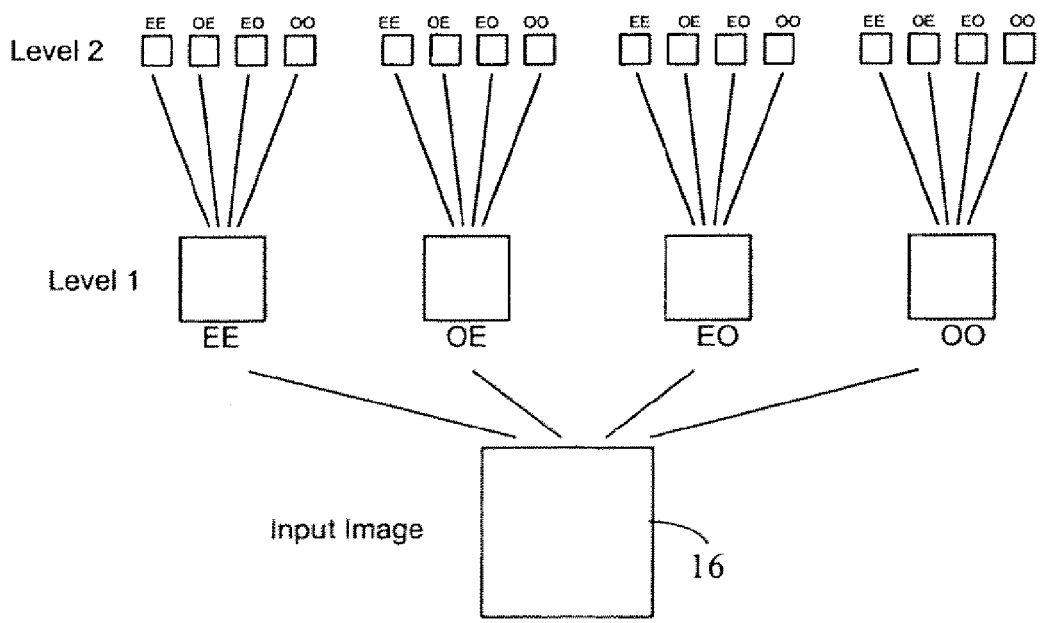

A fully overcomplete wavelet transform is a redundant version of the ordinary (critically sampled) wavelet transform. In the overcomplete wavelet transform of a 2D input, four (4) redundant "phases" are generated at each stage in a process illustrated in FIG. 12C as compared with one phase in the critically sampled case of FIG. 12A. Each phase—the even-even (EE) phase, the even-odd (EO) phase, the odd-even (OE) phase, and the odd-odd (OO) phase—corresponds to a positional shift of the input. For example, the odd-odd phase of level-1 corresponds to the wavelet transform of the input image shifted by one pixel in both the horizontal and vertical directions. If this transform in FIG. 12C is thought of as a tree, any branch (or path) starting at the input image 16 and terminating in level-2 could be thought of as a redundant wavelet transform. For example, the combination of level-1 OO and the level-2 OO (generated from level-1 OO) would be one redundant wavelet transform corresponding to the critically sampled wavelet transform of the input shifted by 3 pixels in both directions. In the representation of FIG. 12C there are 16 such redundant transforms (at level-2).

A critically-sampled two level wavelet transform (FIG. 12A) is shift-invariant only in shifts that are multiples of "4". A fully overcomplete wavelet transform (FIG. 12C) is shift invariant for shifts that are a multiple of "1". An intermediate representation that may be referred to as a "partially overcomplete" wavelet transform of the scaled input image computes a representation that is shift-invariant in multiples of "2". In particular, this representation computes the EE phase (critically sampled and not overcomplete generation of level-1) at level-1 and then generates an overcomplete representation of level-2 from the level-1 EE phase producing level-2 EE, level-2 EO, level-2 OE, and level-2 OO phases as shown in FIG. 12B.

A partially overcomplete (FIG. 12B) and a critically sampled (FIG. 12A) transforms are contained within a fully overcomplete transform (FIG. 12C). In FIG. 12C, the critically sampled transform is given by the left most branch consisting of level-1 EE and level-2 EE phases. The partially overcomplete transform has 4 redundant phases corresponding to the 4 left most branches given by (level-1 EE, level-2 EE), (level-1 EE, level-2 OE), (level-1 EE, level-2 EO), (level-1 EE, level-2 OO).

In order to effectively use a classifier with a built-in shift invariance of 1 pixel ($\delta=0.5$ in FIG. 8B), the classifier should preferably be evaluated with respect to fully overcomplete wavelet transform during detection. This amount of shift invariance corresponds to evaluation sites that are spaced by increments of 1 pixels apart in both the horizontal and vertical directions. Likewise, a classifier with a shift-invariance of 2 pixels should preferably be evaluated with respect to a partially overcomplete or fully complete wavelet transform. This amount of shift-invariance corresponds to spacing the evaluation sites 2 pixels apart. A classifier with shift-invariance of 4 pixels can be evaluated with respect to critically-sampled, partially overcomplete, or fully overcomplete transform. Each phase of a partially or fully overcomplete transform is evaluated separately as if it were a separate image. Referring in this context to FIG. 9, the set of windows to be evaluated for all phases is determined at block 74 (by, for example, a process of comparing partial evaluation of equation-3 to a threshold $\lambda_k$ as discussed hereinbefore) and then the input windows are evaluated for each of these phases sequentially (block 84). For example, for the partially overcomplete expansion, block 84 in FIG. 9 is repeated for the 4 phases, whereas for the fully overcomplete transform, block 84 in FIG. 9 is repeated for 16 phases.

In one embodiment with four stages, the first two stages use a critically sampled wavelet transform and a classifier designed with shift invariance of 4 pixels and the last three stages use a partially overcomplete wavelet transform and a classifier designed with a shift-invariance of 2 pixels. This evaluation strategy could be thought of as a "coarse-to-fine" strategy whereby the early stages evaluate the image at coarse resolution and the later stages evaluate it at a finer resolution.

Figure 13A:
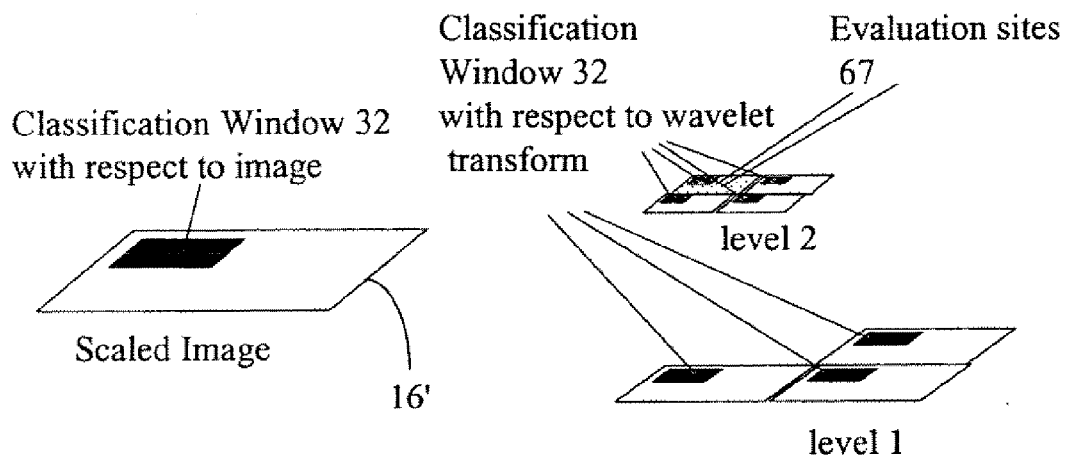
FIGS. 13A and 13B illustrate the positional correspondence between a window sampled directly on the image and the same image window sampled with respect to the wavelet transform of the image according to one embodiment of the present disclosure.

In an alternative embodiment, a $5^{th}$ stage may use a fully overcomplete wavelet transform and a classifier designed with a shift-invariance of 1 giving a more pronounced progression from coarse to fine, in this embodiment, the image window 32 may not directly sample the scaled image as implied by FIG. 4A, but rather it may sample wavelet coefficients generated from the input image (e.g., at block 74 in FIG. 9). In the case where some form of overcomplete expansion is used, the window 32 may select coefficients from one wavelet transform derived from the overcomplete (or semi-overcomplete) wavelet transform. The image window 32 may select the coefficients within this transform that spatially correspond to the position of the image window within the image or its scaled version 16' as shown in FIG. 13A. Note that one image window corresponds to a collection of blocks of wavelet coefficients from each wavelet subband. This choosing of coefficients is equivalent to first selecting the window in the original image 16 (or its scaled version 16') and then taking the wavelet transform of the image window.

Figure 13B:
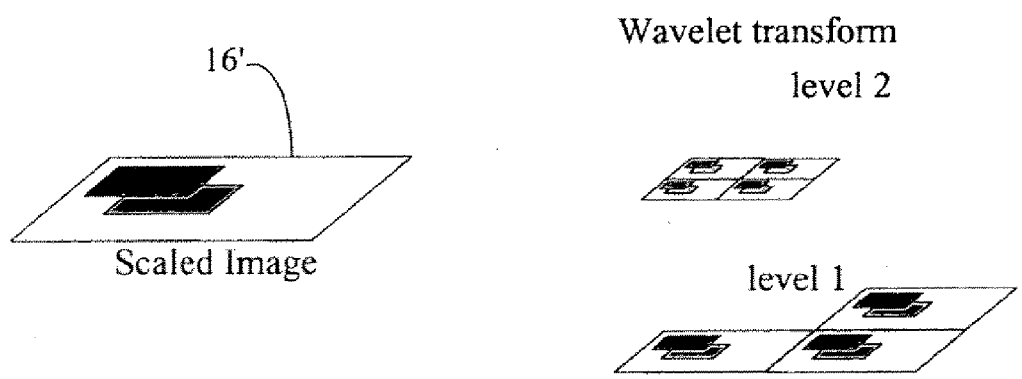
Figure 14A:
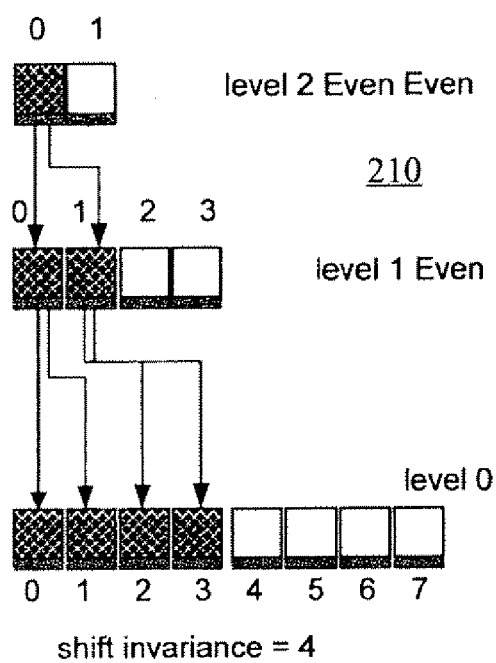
FIGS. 14A through 14E illustrate the process of propagating probability through the wavelet pyramid representation.
Figure 14C:
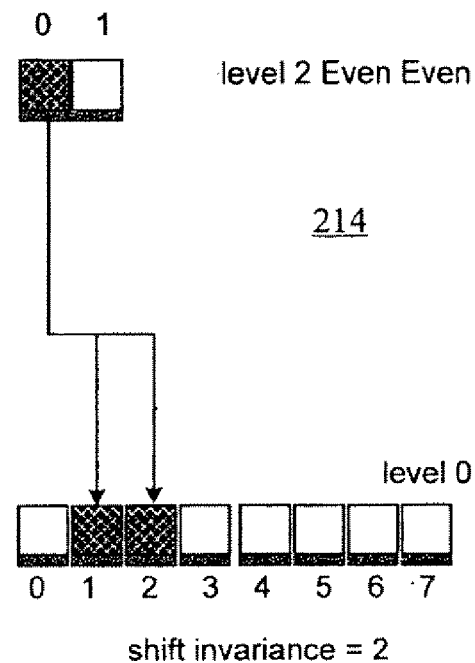
Figure 14B:
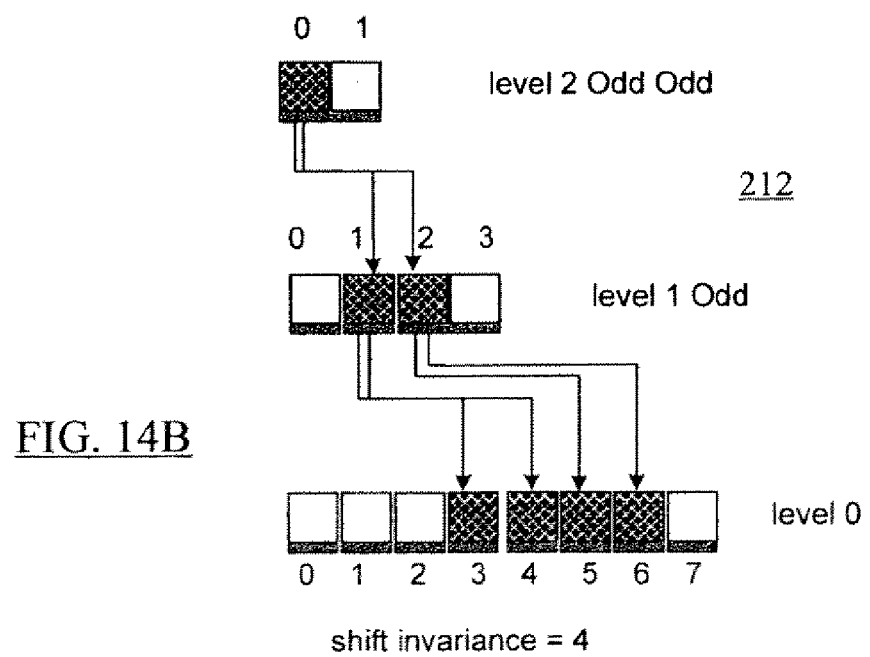
Figure 14D:
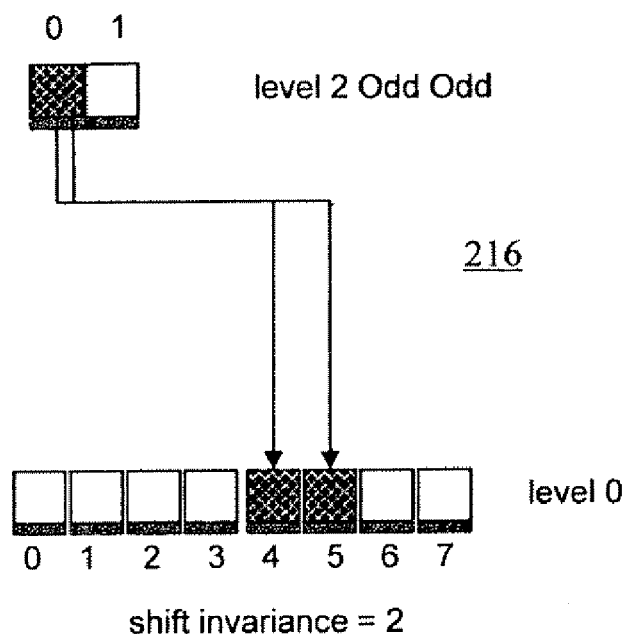
Figure 14E:
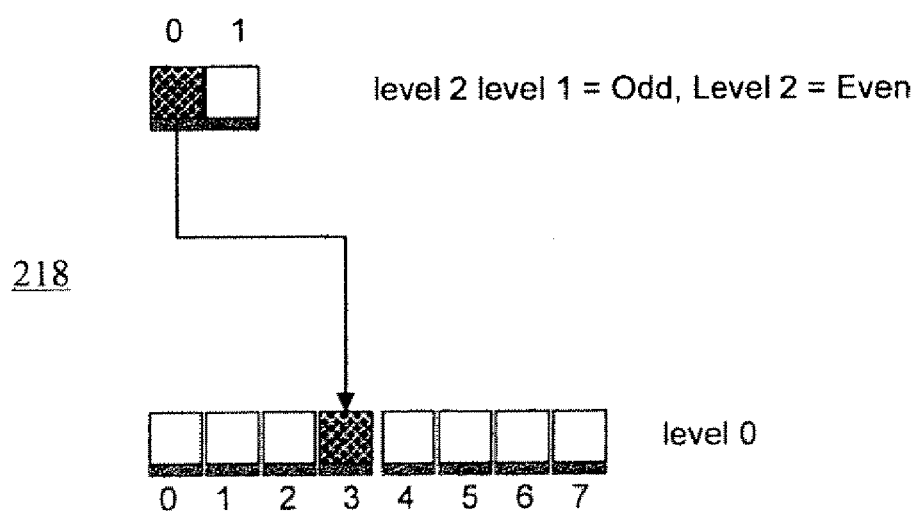

Evaluation sites (e.g., the sites 67 in FIG. 13A) may be specified by the center of the window 32 with respect to the chosen wavelet transform's second level. Each coefficient in the level-2 LL, band (see, e.g., FIG. 10) corresponds to a center of a potential evaluation site as shown in FIG. 13A. The set of all possible evaluation sites for this phase of the wavelet transform corresponds to the set of windows placed at each such wavelet coefficient. It is noted that such image window 32 locations may be partially overlapping as shown in FIG. 13B.

In FIG. 9, at block 74, the object defector program 18 may evaluate a single stage, $h_i$, for each member of a set of image window 32 locations to be evaluated. In one embodiment, the object detector 18 can keep, for each of the set of image window 32 locations to be evaluated, a partial calculation of equation (4) that may be referred to as a total log-likelihood. It is noted that each term of equation (4) may correspond to the log-likelihood generated by the application of a sub-classifier to an image-window location. The partial calculation of equation (4), or total log-likelihood, contains terms resulting from sub-classifiers already applied to the location.

As described hereinbefore, the system assigns log-likelihood to each evaluation site where each site corresponds to a window centered at a coefficient location in level 2 of the wavelet transform. Since evaluation may be repeated over different phases of the wavelet transform (i.e., small positional shifts), these evaluations must be combined (summed) and resolved with respect to a common coordinate frame at a higher resolution. In one embodiment, these log-likelihoods are resolved by re-expressing them in a representation at the resolution of the original image. Block 76 in FIG. 9 denotes propagation of the log-likelihood from level 2 of the wavelet transform to the resolution of the original image. Note that level 2 of the wavelet transform has ¼th the resolution of the original image. Representation of log-likelihood at image resolution allows the combination of results computed at different phases as indicated by the program loop at decision block 78 in FIG. 9. The manner of propagation depends on the amount of shift-invariance (1, 2, or 4) trained into the classifier, i.e., a shift invariance of 4 implies that object's center location falls within a 4×4 region; a shift invariance of 2 implies the location is within a 2×2 region, etc. FIGS. 14A-14E illustrate propagation for different amounts of shift invariance and different phases in one dimension of wavelet transform. For example, shift invariance of 4 leads to a propagation of 4 sites in the original image as shown in the diagrams 210 and 212 in FIGS. 14A and 14B, respectively; shift invariance of 2 leads to propagation of 2 sites as illustrated by diagrams 214 and 216 in FIGS. 14C and 14D, respectively; and shift-invariance of 1 leads to propagation of one site as shown in the diagram 218 in FIG. 14E. Also, observe that differences in phase correspond to positional offsets of the propagation as shown by the difference between FIG. 14A and FIG. 14B, and the difference between FIGS. 14C and 14D.

Block 72 in FIG. 9 initializes the log likelihood for the current phase of the current stage to zero for all candidate object locations for each process iteration at block 78. Instead of evaluating a single stage, the process in FIG. 16 may increment the stage pointer "i" (in $f_i$) to evaluate other stages for each member of the set of image window locations as illustrated by the process loop including blocks 78, 82, and 84 in FIG. 9.

In one embodiment, in the detection process of FIG. 9, the input image 16 is repeatedly reduced in size (blocks 86, 88 in FIG. 9) by a factor "f" given by:

$$f = 2^{\left(\frac{1}{4}\right)}, \text{ where } i = 0, 1, 2, 3 \ldots \quad (5)$$

Thus, for example, for i=2, f=1.41. Hence, the image is reduced by factor "f". In other words, the new scaled image (for i=2) is 0.71 (1/f) in size as compared to the original image (for i=0). Thus, the size (along any dimension, e.g., horizontal) of the image to be evaluated can be expressed by N=(1/f)*S, where N is the size of the input image currently evaluated by the corresponding classifier, and S is the original size of the input image. Extensive object search (as given by blocks 70, 72, 74, and 76 in FIG. 9) is continued for each scale until the scaled input image is smaller than the size of the image window 32.

Figure 18:
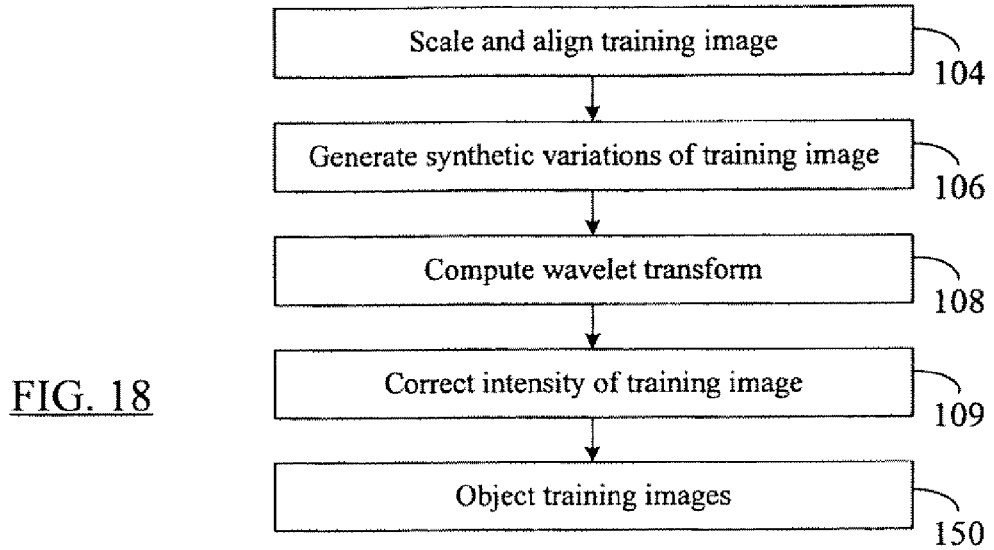
FIG. 18 outlines the major steps involved in preparing object training examples.
Figure 19:
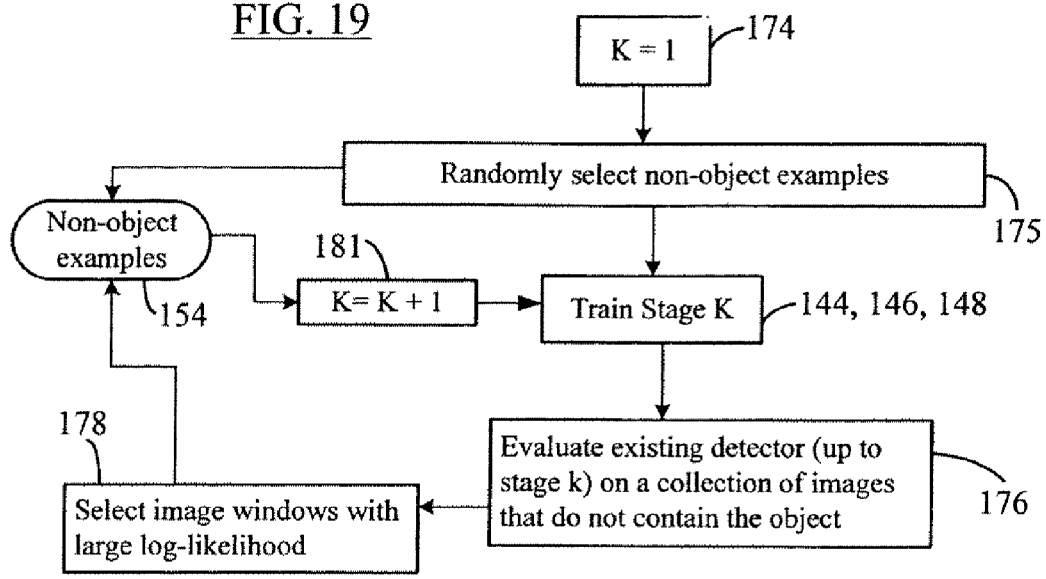
FIG. 19 illustrates a process of training a sequence of classifiers using bootstrapping to actively select training examples according to one embodiment of the present disclosure.

It is noted that although the input image is scaled to many values of "i" (e.g., for i=0 . . . 19), the entire wavelet transform does not always need to be computed in its entirety for each successive scale. In one embodiment, the object detector 18 "re-uses" parts of the transform in the search across scale. FIGS. 18 and 19 illustrate this process.

Figure 15:
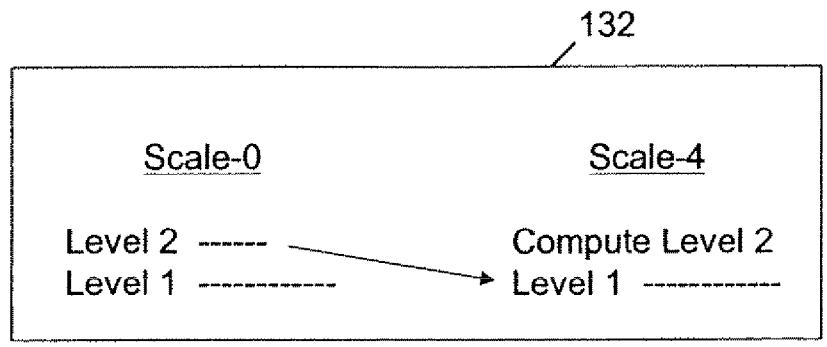
FIG. 15 illustrates an image scaling process and corresponding wavelet transform computation according to one embodiment of the present disclosure.

As shown at block 132 in FIG. 15, the two levels of the transform need to be computed in their entirety for the first four scales (scales 0 through 3) of the input image (corresponding to i=0 . . . 3). Thus, for the first octave of search in scale (corresponding to the first four scales given by equation 5), each level of the transform is recomputed in its entirety at each scaling. However, after these first four scalings (i.e., beginning with the fifth scale (scale-4) corresponding to i=4), the object detector 18 can "reuse" parts of the transform computed at previous scalings as illustrated in FIG. 15. This is done by selecting the transform corresponding to the scaling that differs by one octave (f=2 in equation-5, i.e., four (4) scalings) from the current scaling. Thus, for example, to compute the transform for scale-i (where i≧4 in equation-5), the transform for scale (i-4) may be utilized because the transform for scale-i (i≧4) is related to the transform at scale (i-4) by a shift in levels. For example, the wavelet transform at scale-4 is related to that at scale-0, and the transform at scale-5 is related to that at scale-1, and so on as illustrated in FIG. 15 in case of scales 0 and 4.

Figure 16:
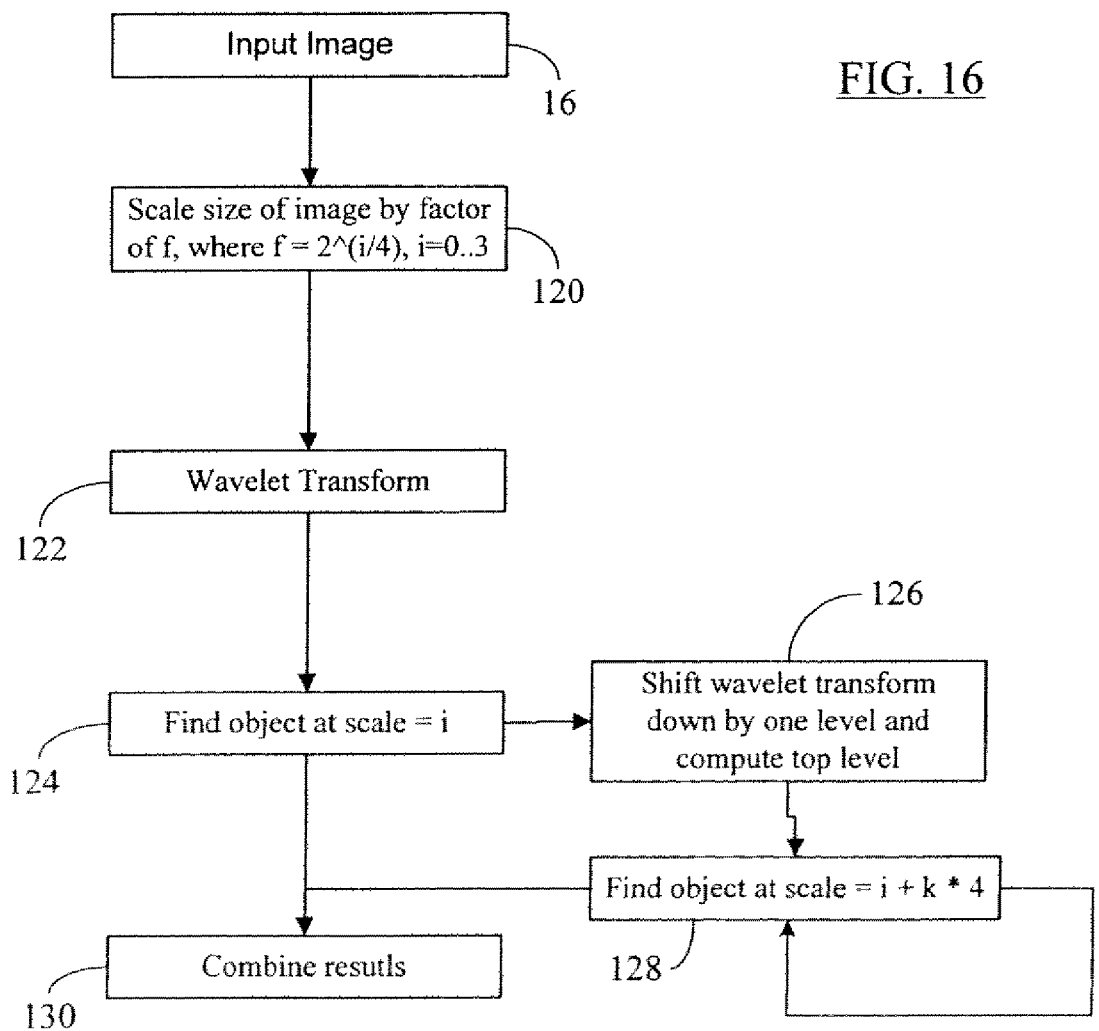
FIG. 16 shows the details of the image scaling process as part of the overall object detection process illustrated in FIG. 9 according to one embodiment of the present disclosure.

In one embodiment, to obtain the transform at scale-i (i≧4), the object detector 18 shifts the transform for scale (i-4) by one level. That is, level-2 at scale (i-4) becomes level-1 at scale-i (for i≧4) as shown in FIG. 15 with reference to scales 0 and 4. Therefore, the object detector 18 needs to compute only the top level (i.e., level-2) for each scale-i (i≧4), rather than computing the entire transform (i.e., levels 1 through 2) for the new scale-i. Blocks 126 and 128 in FIG. 16 illustrate the scaling and partial re-use of the transform discussed hereinabove. As shown by the feed-back arrow at block 128 in FIG. 16, the transform re-use and extensive object search (as given by blocks 120, 122, 124, and 130 in FIG. 16) is continued for each scale until the scaled input image is smaller than the size of the image window 32 as also discussed hereinbefore with reference to FIG. 9. For example, for i=0 . . . 3, the object detector 18 may search the object at scales (i+k*4, where k≧1). For example, for scales 0 through 3, the corresponding scales that may be searched by the object detector 18 include scales 4 through 7 (for k=1 at block 128), 8 through 11 (for k=2 at block 128), 12 through 15 (for k=3 at block 128), 16 through 19 (for k=4 at block 128), and so on until the scaled input image for a given scale is smaller than the image window size. Such an extensive scanning for each image size and image window location improves accuracy of detection by making it possible to find instances of the object over this range in position and size.

Alternatively, if the low-pass filtering effects of the wavelet transform are not desirable, the wavelet transform can be re-computed from scratch for each scaled version of the image.

Typically, when the object detector program 18 encounters the object (e.g., a face), it may not give one single large response (for the left side of equation-1) at one location that is greater than the threshold "λ" (i.e., the right side of equation-1). It may instead give a number of large responses at adjacent locations all corresponding to the same face that all exceed the detection threshold. Furthermore, multiple view-based classifiers may detect the same object at the same location. For example, FIG. 5 shows a case where the same face (the female in the foreground of the photograph) is initially detected by two of the view-based classifiers (the face detectors #2 and #3 in FIG. 5). To resolve that all such multiple "detections" (here, two detections) are caused by the same object, the following approach-which may be called "arbitration" (block 90 in FIG. 9)—may be used. First, the detection value (i.e., the left side of equation-1 or equivalently equation-3) is computed for all viewpoints and at all locations within the image and all its scalings. Then, a list composed of all the locations for which the detection value is greater than the detection threshold is formed. This list is then put in order from the detection of the greatest magnitude (i.e., for which the value of the left side of equation-1 is largest) to that of the smallest magnitude. The first entry in this list is declared a real detection. Then this entry may be compared to all others in the list. If another entry within the ordered list is within a predetermined distance (preferably, the distance may be half the radius of the image window because as the image window size is fixed, its radius is also fixed) of the first entry, it is assumed to correspond to the same object and it is discarded. After the first entry is compared to all other entries, this process repeats for the entry in the remaining list that has the largest magnitude (after the first entry and all entries matching to it have been removed); that is, this second entry is now declared to be another real detection and is compared to all other entries in the remaining list whereby any entries that are close in distance to it are discarded. This process continues until the list is exhausted.

The object detector according to the present disclosure may provide computational advantages over the existing state of the art. In particular, it is observed that although it may take many sub-classifier evaluations to confirm the presence of the object, it can often take only a few evaluations to confirm that an object is not present. It is therefore wasteful to defer a detection decision until all the sub-classifiers have been evaluated. According to one embodiment, the object detector 18 may thus discard non-object candidates after as few sub-classifier evaluations as possible. The coarse-to-fine strategy implemented by the object detector 18, according to one embodiment, involves a sequential evaluation whereby after each sub-classifier evaluation, the object detector makes a decision about whether to conduct further evaluations or to decide that the object is not present. This strategy may be applied to the multi-resolution representation provided by the wavelet transform whereby the sub-classifier evaluations are ordered from low-resolution, computationally quick features to high-resolution, computationally intensive features. By doing so, the object detector may efficiently rule out large regions first and thereby it only has to use the more computationally intensive sub-classifiers on a much smaller number of candidates.

Experiments have shown that the cascade search strategy discussed hereinbefore may reduce computational time by a factor of several hundreds over an exhaustive full evaluation of every possible object location in position and scale.

Classifier Design

Each sub-classifier (equation (2)) can be viewed as a representation of the ratio of the full joint distributions, P(image-window|object) and P(image-window|non-object). It may not be computationally feasible to represent these full joint distributions. The image window 32 may encompass several hundreds or even thousands of pixel variables. In that case, it may not be computationally feasible to represent the joint distribution of such a large number of variables without reducing the complexity of this distribution.

Typically, for some classes of images, e.g., images of faces, it is the case that not all variables are statistically dependent on all other variables. Each variable may have strong direct statistical dependency with a small number of other variables and negligible dependency with the remaining ones. This characteristic of "sparse dependency structure" allows one to represent the probability distributions by only representing the direct dependencies among the variables. Graphical probability models, particularly Bayesian networks, may be a concise representation for capturing only the direct dependencies among a group of variables. Other graphical probability models (such as, for example, Markov Random Fields, Factor Graphs, Chain Graphs, Mixtures of Trees, etc.) in place of Bayesian networks may also be suitably employed by one skilled in the art to construct sub-classifiers as per the methodology discussed in the present disclosure.

In one embodiment, each probability distribution in $h_i$(image_window|ω) is represented by a Bayesian Network. A Bayesian network structure is a directed acyclic graph whose nodes represent random variables as described in more detail in Richard E. Neapolitan, "Learning Bayesian Networks", published by Pearson Prentice Hall (2004), the discussion of which is incorporated herein by reference in its entirety. A Bayesian network may take the following form:

$$P(\text{image\_window}|\omega) = P(x_1, \ldots, x_r|\omega) = P(x_1|pa_{x1})P(x_2|pa_{x2}) \ldots P(x_n|pa_{xn}) \qquad (6)$$

where the image-window 32 consists of the variables (consisting of pixels or coefficients generated by a transformation (e.g., a wavelet transform) on the pixels) $\{x_1 \ldots x_r\}$ and where $pa_{xi}$ denotes the parents of $x_i$ in the graph, which are a subset of the variables. For example, $pa_{x1}$ may be $\{x_5, x_9, x_{12}\}$.

In one embodiment, the classifier 34 can be represented as the ratio of two Bayesian network graphs (one representing P(image_window|ω$_1$) and the other for P(image_window|ω$_2$) from equation (1)) where each graph has the same connectivity. The conditional probability distributions forming each Bayesian Network (the terms on the right hand side in equation (6)) can take many functional forms. For example, they could be Gaussian models, mixture models, kernel-based non-parametric representations, etc. Also, each conditional probability may have to be of the same functional form. As described in more detail hereinafter, in one embodiment, each probability distribution in equation (6) is represented by a table. For example, consider a hypothetical probability distribution $P(x_1|pa_{x1})$, where $pa_{x1} = \{x_3, x_4\}$. Each variable can take on two possible values (0 or 1). Such a table would have eight entries corresponding to each possible combination of values. Each entry would be a probability and all 8 probabilities would sum to 1.0.

A challenge in building a Bayesian network representation is that learning the connectivity of a Bayesian network is known to be NP complete; that is, the only guaranteed optimal solution is to construct classifiers over every possible network connectivity and explicitly compare their performance. Moreover, the number of possible connectivities is super-exponential in the number of variables. Heuristic search may be the only possible means of finding a solution. In one embodiment, the selection of the Bayesian Network connectivity is achieved by the statistical methods as described hereinbelow.

Figure 17A:
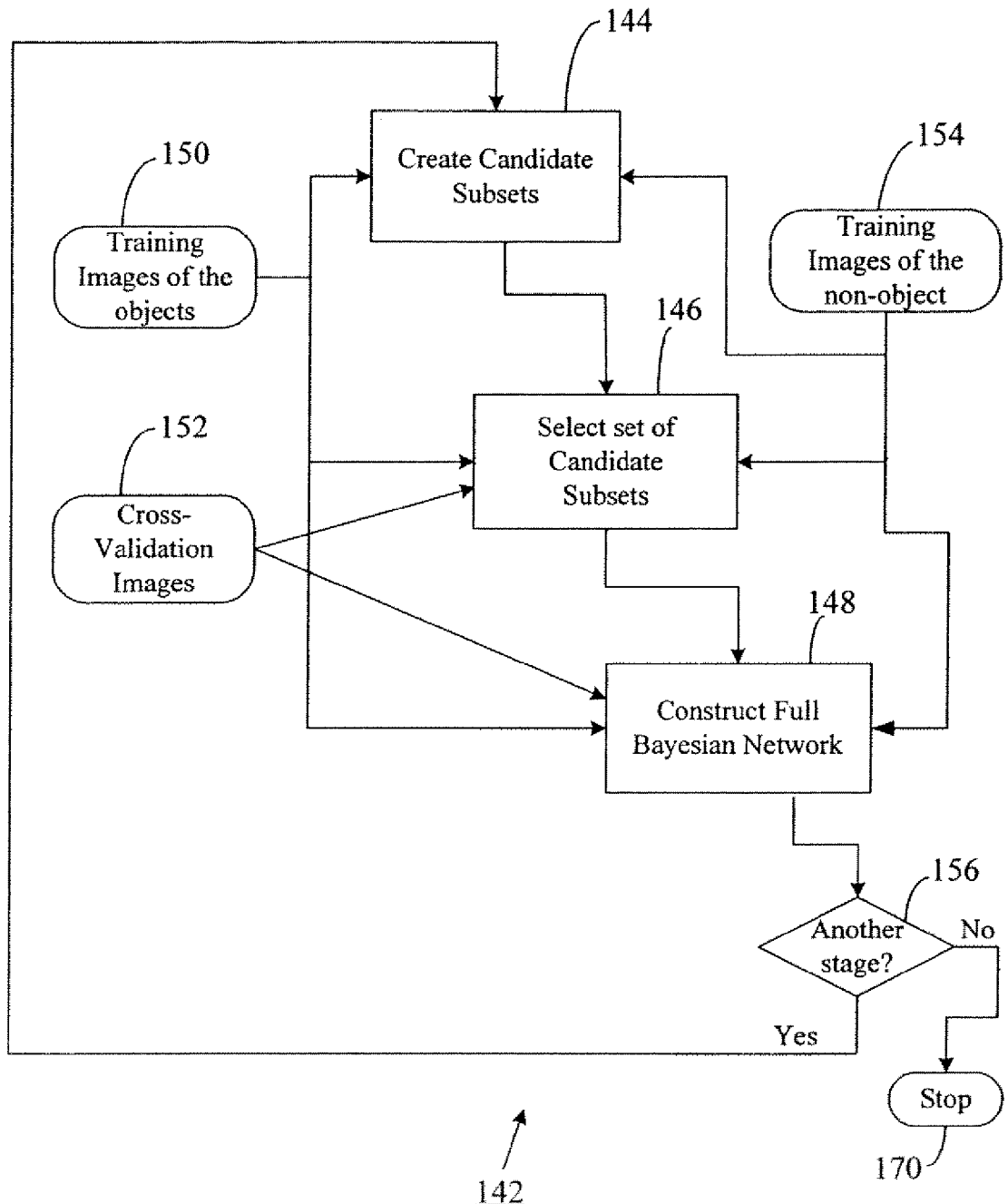
FIGS. 17A and 17B are diagrams of a system for automatically constructing a Bayesian network based classifier system according to one embodiment of the present disclosure.
Figure 17B:
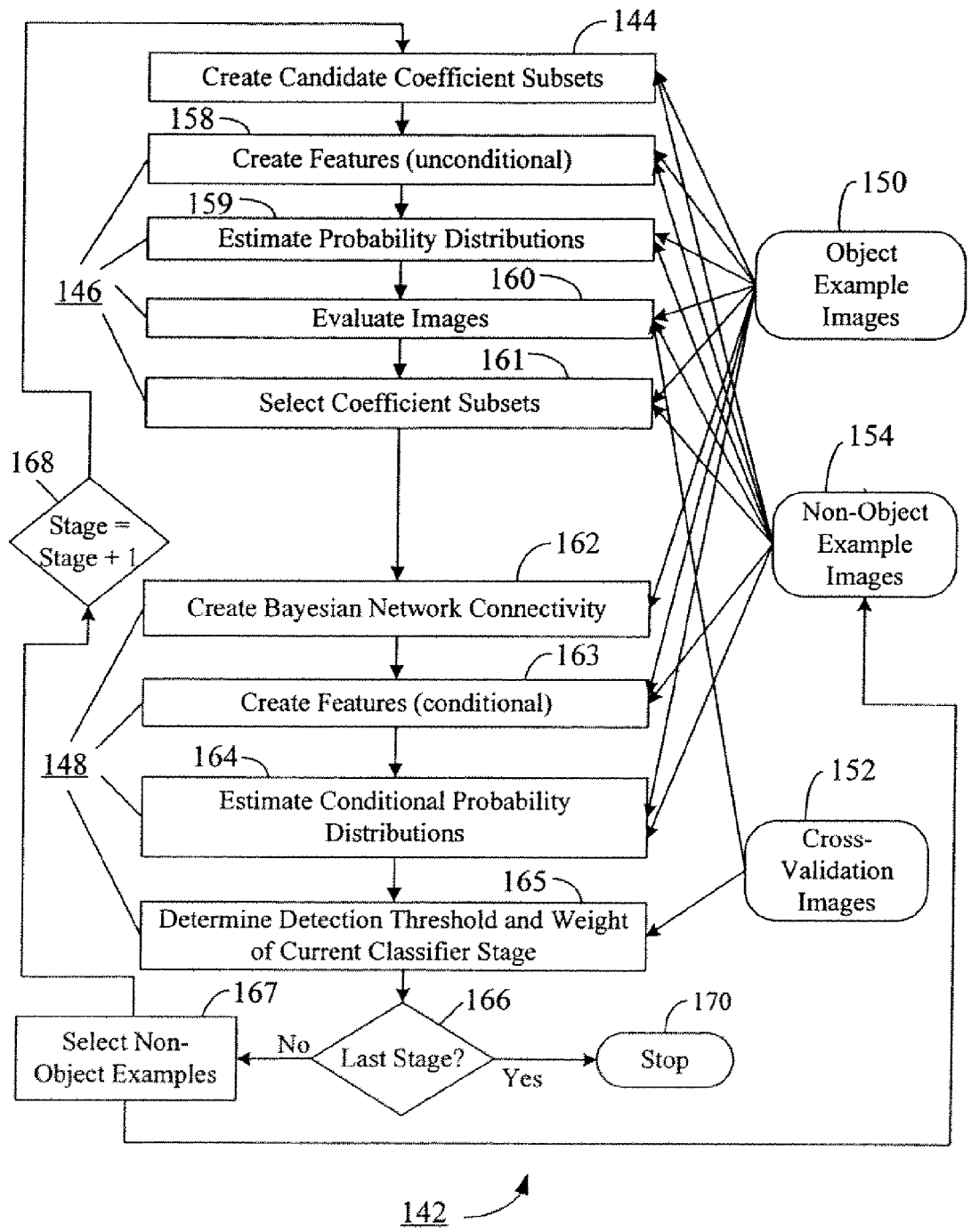

FIG. 17A and FIG. 17B show a block diagram of a system 142 for automatically creating a Bayesian Network-based classifier for one embodiment of the present disclosure. Various blocks in FIG. 17A are illustrated in more detail in FIG. 17B with their corresponding constituent sub-blocks. The system 142 can use statistical methods to choose the Bayesian Network (BN) composing each sub-classifier stage of the object detector program. The system 142 may be implemented using a computing device such as, for example, a personal computer, a laptop computer, a workstation, a mini-computer, a mainframe, a handheld computer, a small computer device, or a supercomputer, depending upon the application requirements.

As illustrated in FIG. 17A, the system 142 may include training images for the object class 150, training images for the non-object class 154, and cross-validation images (testing images in which the locations of the object are labeled) 152. A method to prepare training images of an object is illustrated in FIG. 18 and discussed later hereinbelow. The system modules 144, 146, 148 may be implemented as software code to be executed by a processor (not shown) of the system 142 using any suitable computer language such as, for example, Java, Ada, C or C++ using, for example, conventional or object-oriented techniques. The software code may be stored as a series of instructions or commands on a computer-readable medium, such as a random access memory (RAM), a read only memory (ROM), a magnetic medium such as a hard-drive or a floppy disk, or an optical medium such as a CD-ROM. It is observed that modules 146 and 148 in FIG. 17A are shown in detail in FIG. 17B and discussed later hereinbelow.

The candidate subset creation module 144 may form a set of subsets (not shown), where each subset is chosen to represent a group of input variables that depend upon each other. These subsets may not be mutually exclusive. Thus, a variable can be a member of multiple subsets. The subset creation module 144 may determine the grouping into subsets by optimizing over "local" error in the log likelihood ratio function. This function assumes that every pair of variables is independent from the remaining variables. In particular, the ratio function may organize the variables into a large number of "candidate" subsets such that the "local" error measure is minimized as discussed later hereinbelow in conjunction with equation (11) and discussion of FIG. 20. This organization may restrict the final network to representing dependencies that occur only within subsets. The module 144 computes this error function using labeled object and non-object training images as inputs.

The candidate subset selection module 146 in FIGS. 17A-17B chooses a small set of the candidate subsets created by block 144. The module 146 makes this choice by comparing "restricted Bayesian network" structures formed from combinations of the candidate subsets. For each possible combination of subsets, the restricted network may consist of two layers of nodes. Each node in the second layer corresponds to a subset and consists of the variables from this subset that do not occur in any other subsets. Any variables that co-occur among subsets become nodes in the top layer. Each such variable becomes a separate node and is parent to multiple second layer nodes representing all its subset memberships.

In this embodiment each restricted network may be of the following form:

$$P(X_1, \ldots, X_n) = \frac{P(S_1)P(S_2) \ldots P(S_r)}{[P(X_1)]^{\alpha_1}[P(X_2)]^{\alpha_2} \ldots [P(X_n)]^{\alpha_n}} \quad (7)$$

The variables $X_1$, $X_2$, etc. may be either pixels or transform coefficients. In one embodiment, they are wavelet transform coefficients. The structure in equation-7 assumes that the parents of any node in the second layer are statistically independent where $S_1 \ldots S_r$ are some collection of subsets of the input variables generated by the subset creation module 144. Each $\alpha_k$ corresponds to the number of occurrences of the given variable in the r subsets. For example, if variable $X_k$ occurs in 3 subsets, then $\alpha_k$ would equal 2 (to represent the occurrence of $X_k$ in 2 additional subsets). In general, the denominator in equation (7) could be thought of as a term that corrects for "over-counting"; that is, accounting for the occurrence of a variable in more than one subset.

In the embodiment of FIG. 17A, the subset selection module 146 may search in this space of restricted networks and choose one (of the restricted networks) that minimizes global classification error as measured by the area under the receiver operating characteristic (ROC) curve. The restricted network is estimated using labeled examples of the object (150) and non-object (154). Global classification error is computed with respect both to the training images (150, 154) and independent cross-validation images (152). It is observed here that all sets of images (either at block 150, or 152, or 154) are labeled. By restricting network structure, one can compare candidate networks at little computational cost by using pre-computed estimates and evaluations. In comparison, much less computation can be pre-computed and re-used when comparing full (unrestricted) Bayesian networks. Moreover, the cost of computing a classification error score for even one full Bayesian network can be significant. It may involve estimating conditional probability functions over the entire set of training images. Typically, high dimensional problems, such as image classification, require a large set of training examples, e.g., as many as $10^6$ training images.

The Bayesian Network creation module 148 removes the independence assumption from the chosen restricted network and find a full Bayesian Network that entails all the direct dependence and independence relationships implied by the chosen set of subsets. In one embodiment, this full Bayesian network is constructed using a heuristic search designed to minimize the dimensionality of the resulting conditional probability distributions. The Bayesian Network creation module 148 may estimate the conditional probability distributions forming each Bayesian network from the labeled training images of the object and non-object. The construction of a full BN (given by blocks 144, 146, and 148 in FIG. 17A) may continue for each stage of the classifier 34 as indicated by the process loop at block 156.

The object training images 150 are representative example images of the object (e.g., human faces or cars) that the object detector 18 is built to detect. FIG. 18 describes an embodiment of how these examples are generated. In the embodiment of FIG. 18, for each face viewpoint, about 2,000 original images are used; and for each car viewpoint, between 300 and 500 original images are used. Each of these original training images can be sized, aligned, and rotated to give the best correspondence with a prototype representing the image class (e.g., frontal faces) as indicated at block 104 in FIG. 18. The size of each such training image may be identical, to the size of the classification window 32. For each original training image, approximately 400 synthetic variations of the image are generated (block 106) by altering background scenery and making small changes in aspect ratio, orientation, frequency content, and position using a random number generator. Then, at block 108, the wavelet transform of each such example (including the original image or its synthetic variation) is computed and, in block 109, a lighting correction is applied which will be discussed later hereinbelow. It is noted that increasing the number of original images and synthetic variations may increase the computational time required for the modules in the system 142 of FIGS. 17A-17B, but may also increase the accuracy of the resulting classifier. The number of original training images and the number of synthetic variations of each original image may be determined by the desired accuracy of detection, the availability of suitable training images, and limitations on the amount of time and computer resources that can be devoted to the computations among the modules in the system 142 in FIGS. 17A-17B. In one embodiment the object training images are re-used for each stage of classifier. However, the synthetic variations of these may be different in that different random numbers may be used.

Non-object examples 154 (FIG. 17A) may be taken from images that do not contain the object. For example, in case of the human face object, some non-object examples may include backgrounds in a public place, office architecture, etc. In one embodiment, approximately 600,000 non-object examples are used. The selection of non-object examples is described in more detail hereinafter.

In one embodiment, each classifier stage may use a different set of training examples for the non-object class. It may be desirable to choose "non-object" examples that are most likely to be mistaken for the object to be detected (e.g., a human face or a car) as discussed in B. D. Ripley, *Pattern Recognition and Neural Networks*, Cambridge University Press, 1996. This concept is similar to the way support vector machines work by selecting samples near the decision boundary as discussed in V. N. Vapnik, *The Nature of Statistical Learning Theory*, Sprinter, 1995. The relevant disclosures of both of these publications are incorporated herein by reference in their entireties.

In one embodiment, non-object training examples (154) may be acquired at block 167 in FIG. 17B by a bootstrapping method designed to determine such samples (i.e., non-object samples that are most likely to be mistaken for the object). Bootstrapping requires that the overall classifier is trained as a sequence of classifiers, where each stage is a full classifier (or "sub-classifier") (and the overall classifier is a sum of these classifiers given by equation-3). Bootstrapping works in the following way illustrated in FIG. 19. The first stage (k=1) classifier (blocks 144, 146, and 148 in FIG. 17A) may be trained by estimating P(Image_window|$\omega_2$) using randomly drawn samples from a set of non-object images (block 175, FIG. 19). This classifier is then run over a set of images (for example, 2,500 images) that do not contain the object (block 176, FIG. 19). Block 178 in FIG. 19 selects the image windows (32) within that collection of images which give high log-likelihood (false detections or near false detections). These image windows will then be ones that "resemble" the object in the sense of stage-1 of the classifier. These non-object examples 154 are then used to train stage-2 (k=2) of the classifier. This process (i.e., the process illustrated in FIG. 19) may be repeated (block 181) to choose the non-object examples for the second stage (k=2) of the classifier 34, this time by evaluating the first two stages in combination over a set of images that do not contain the object. This process can be repeated for each successive stage (block 181).

In one embodiment, the wavelet transform of each training example is computed (block 108 in FIG. 18) prior to compiling the set of object training images (block 150 in FIGS. 15 and 17A). The sampling of the wavelet transform depends on the shift-invariance desired as described hereinbefore. For a shift-invariance of 4, the fully overcomplete transform may be computed; for a shift-invariance of 2, the semi-overcomplete transform may be computed; and for a shift-invariance of 1, the critically-sampled transform may be computed. The fully overcomplete transform may effectively give 16 synthetic variations of the original training example where the variations correspond to positional shifts of the input as described hereinabove. Each of these 16 variants may each be treated henceforth as separate training examples and the wavelet coefficients forming each are the variables which may be decomposed into subsets. Similarly, the semi-overcomplete transform gives 4 synthetic variations, and the critically sampled transform gives one synthetic variation.

The cross-validation images 152 (FIG. 17A) are images of realistic scenes that often contain the object. The locations of the object in these scenes are known (usually entered by hand) and used to select coefficient subsets (block 161, FIG. 17B), determine the number of adaboost iterations (block 165, FIG. 17B), determine the detection threshold (block 161, FIG. 17B), and the weight of the stage (block 161, FIG. 17B) as described hereinbelow.

Figure 20:
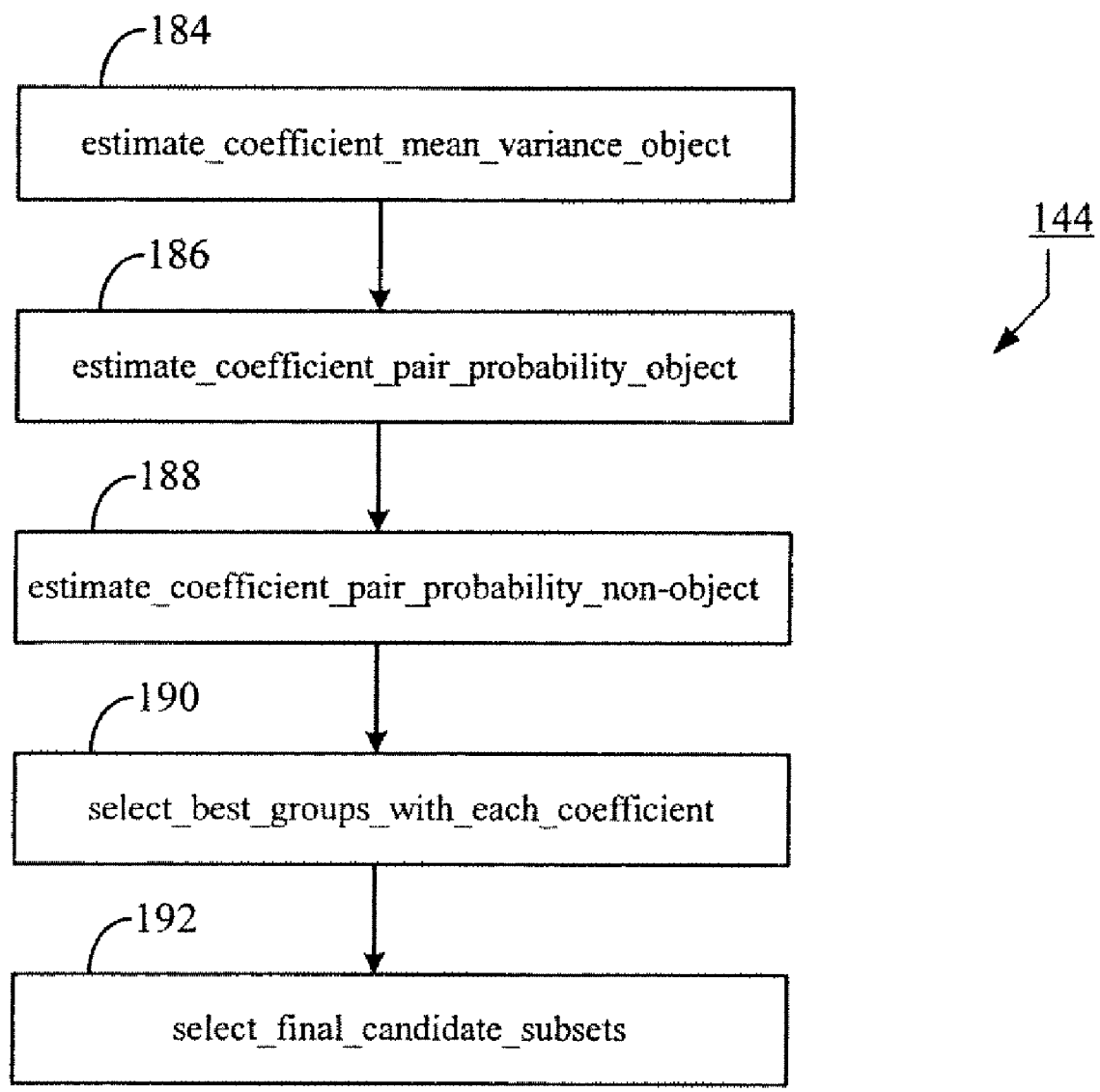
FIG. 20 is a flowchart illustrating the process flow through the candidate coefficient subset creation module according to one embodiment of the present disclosure.

According to one embodiment, the candidate subset creation module 144 (FIG. 17A) may create a set of candidate subsets of input variables. FIG. 20 is a flowchart illustrating a process flow for the candidate coefficient-subset creation module 144 according to one embodiment of the present disclosure. The input variables to the module 144 may be pixels or variables derived from a transformation of the input pixels such as wavelet coefficients as described hereinbelow. The subset creation module 144 may form the subsets by considering two types of modeling error: not modeling the dependency between, two variables or not modeling a variable altogether. The cost of these modeling errors may be evaluated in terms of their impact on the log-likelihood ratio function. Further, in one embodiment, these errors are evaluated only over pairs of input variables, $(X_i, X_j)$ by assuming that each pair, $(X_i, X_j)$, is independent from the remaining input variables. In particular, each error is the difference between the true log-likelihood ratio, i.e., log $(P(X_i, X_j|\omega_1)/P(X_i, X_j|\omega_2))$, and the log-likelihood ratio under the given modeling choice. An exemplary set of three possible cases may be considered with the following costs:

$$C_1(X_i, X_j) = \sum_{x_i \in X_i} \sum_{x_j \in X_j} P(x_i, x_j) \mathrm{abs} \left[ \log \frac{P(x_i, x_j | \omega_1)}{P(x_i, x_j | \omega_2)} - \log \frac{P(x_i | \omega_1) P(x_j | \omega_1)}{P(x_i | \omega_2) P(x_j | \omega_2)} \right] \quad (8)$$

$$C_2(X_i, X_j) = \sum_{x_i \in X_i} \sum_{x_j \in X_j} P(x_i, x_j) \mathrm{abs} \left[ \log \frac{P(x_i, x_j | \omega_1)}{P(x_i, x_j | \omega_2)} - \log \frac{P(x_i | \omega_1)}{P(x_i | \omega_2)} \right] \quad (9)$$

-continued $$C_3(X_i, X_j) = \sum_{x_i \in X_i} \sum_{x_j \in X_j} P(x_i, x_j) \text{abs}\left[\log \frac{P(x_i, x_j \mid \omega_1)}{P(x_i, x_j \mid \omega_2)}\right] \quad (10)$$

where, $C_1$ is the error in modeling the two variables, $X_i$ and $X_j$, as independent; $C_2$ is the error of removing one variable, $X_j$, from the pair; and $C_3$ is the error of removing both variables from the pair. Also, in the foregoing equations 8-10, the "abs[ ]" denotes an operator that gives absolute value of the parameter supplied as its operand. The error measures $C_1$, $C_2$, and $C_3$ may be obtained by empirically estimating the probability distributions, $P(X_i, X_j|\omega_1)$ and $P(X, X_j|\omega_2)$, for every pairings of variables, $X_i$, $X_j$.

In the above embodiment, each of the random variables is assumed to be discrete-valued. Thus, upper case notation is used to denote the random variable and lower case notation is used to denote a particular instantiation of the variable; that is, each sum is over all possible values of the given random variable. Under these approximations, the error associated with a given choice of subsets, $G=\{S_i, \ldots, S_r\}$, can be computed as:

$$E_l(G) = \sum_{\substack{(X_i,X_j),\forall i,j,i \neq j \\ X_i \mid X_j \notin S_k, \forall S_k \\ X_i \in S_k, \exists S_k \\ X_j \in S_k, \exists S_k}} C_1(X_i, X_j) + \quad (11)$$

$$\sum_{\substack{(X_i,X_j),\forall i,j,i \neq j \\ X_j \notin S_k, \forall S_k \\ X_i \in S_k, \exists S_k}} C_2(X_i, X_j) + \sum_{\substack{(X_i,X_j),\forall i,j,i \neq j \\ X_i \notin S_k, \forall S_k \\ X_j \notin S_k, \forall S_k}} C_3(X_i, X_j)$$

where each $S_k$ is a subset chosen from the set of input variables, $X_1 \ldots X_n$. A set of candidate subsets, G, is then sought to minimize this localized error function in equation (11).

To find such a solution, the probability distributions, $P(x_i, x_j|\omega_1)$ and $P(x_i,x_j|\omega_2)$, may preferably be represented over pairs of variables, $(x_i,x_j)$. In one embodiment, the estimate_coefficient_mean_variance_object module (block 184, FIG. 20) estimates the mean and variance of each coefficient, $x_i$, over training examples of the object class, $\omega_1$. The estimate_coefficient_pair_probability_object module (block 186, FIG. 20) and estimate_coefficient_pair_probability_non_object module (block 188, FIG. 20) estimate every pair $P(x_i, x_j|\omega_1)$ and $P(x_i,x_j|\omega_2)$ by quantizing each variable and estimating the probability distributions by using histograms (illustrated, for example, in FIG. 24) collected from the training examples. The estimate_coefficient_pair_probability_object module 186 may use training examples from each object class, $\omega_1$. On the other hand, the estimate_coefficient_pair_probability_non_object module 188 may use training examples from the object class, $\omega_2$. In one embodiment, each variable is quantized to five levels, where the quantization levels are chosen as a function of the mean ($\mu$) and standard deviation ($\sigma$) of the variable with respect to the $\omega_1$ class with thresholds at $\mu-0.7\sigma, \mu-0.15\sigma, \mu+0.15\sigma, \mu+0.7\sigma$. Each joint distribution is represented by a histogram with 25 bins and each distribution of one variable is represented by a histogram of 5 bins. A detailed discussion of histograms is given hereinbelow with reference to FIG. 24.

In one embodiment, the select_best_groups_with_each_coefficient module (block 190, FIG. 20) assigns the variables to n subsets using n greedy searches, where each input variable, $X_i$, is a seed for one search. A description of "greedy search" may be found in Stuart J. Russell, Peter Norvig, "Artificial Intelligence: A Modern Approach" (second edition), Prentice-Hall, 2003, and the relevant portion of this book discussing a "greedy search" is incorporated herein by reference. The greedy searches at block 190 may guarantee that every variable is initially represented in at least one subset and, therefore, there are no errors of the form $C_2$ or $C_3$. Each of these greedy searches may add new variables by choosing the one that has the largest sum of $C_1$ values formed by its pairing with all current members of the subset. Such a selection process may guarantee that the variables within any subset will have strong statistical dependency with each other. This may be a fairly reasonable way to initially optimize the error function of equation (11) because the errors due to removing a variable tend to be greater than those of removing a dependency.

The select_final_candidate_subsets module 192 (FIG. 20) reduces the number of subsets to a smaller collection. The search performed by module 192 sequentially removes subsets until some desirable number, q, are remaining. At each step the search removes the subset that will lead to the smallest increase in modeling error. In particular, it follows from equation (11) that the error in removing a given subset, $S_k$, is:

$$\sum_{\substack{X_i \in S_k, X_j \in S_k \\ X_i \cap X_j \notin S_i, \forall S_i, S_i \neq S_k}} C_1(X_i, X_j) + \quad (12)$$

$$\sum_{\substack{X_i \in S_k, X_j \in S_k \\ X_j \notin S_i, \forall S_i, S_i \neq S_k \\ X_i \in S_i, \forall S_i, S_i \neq S_k}} C_2(X_i, X_j) + \sum_{\substack{X_i \in S_k, X_j \in S_k \\ X_j \notin S_i, \forall S_i, S_i \neq S_k \\ X_i \notin S_i, \forall S_i, S_i \neq S_k}} C_3(X_i, X_j)$$

Figure 21:
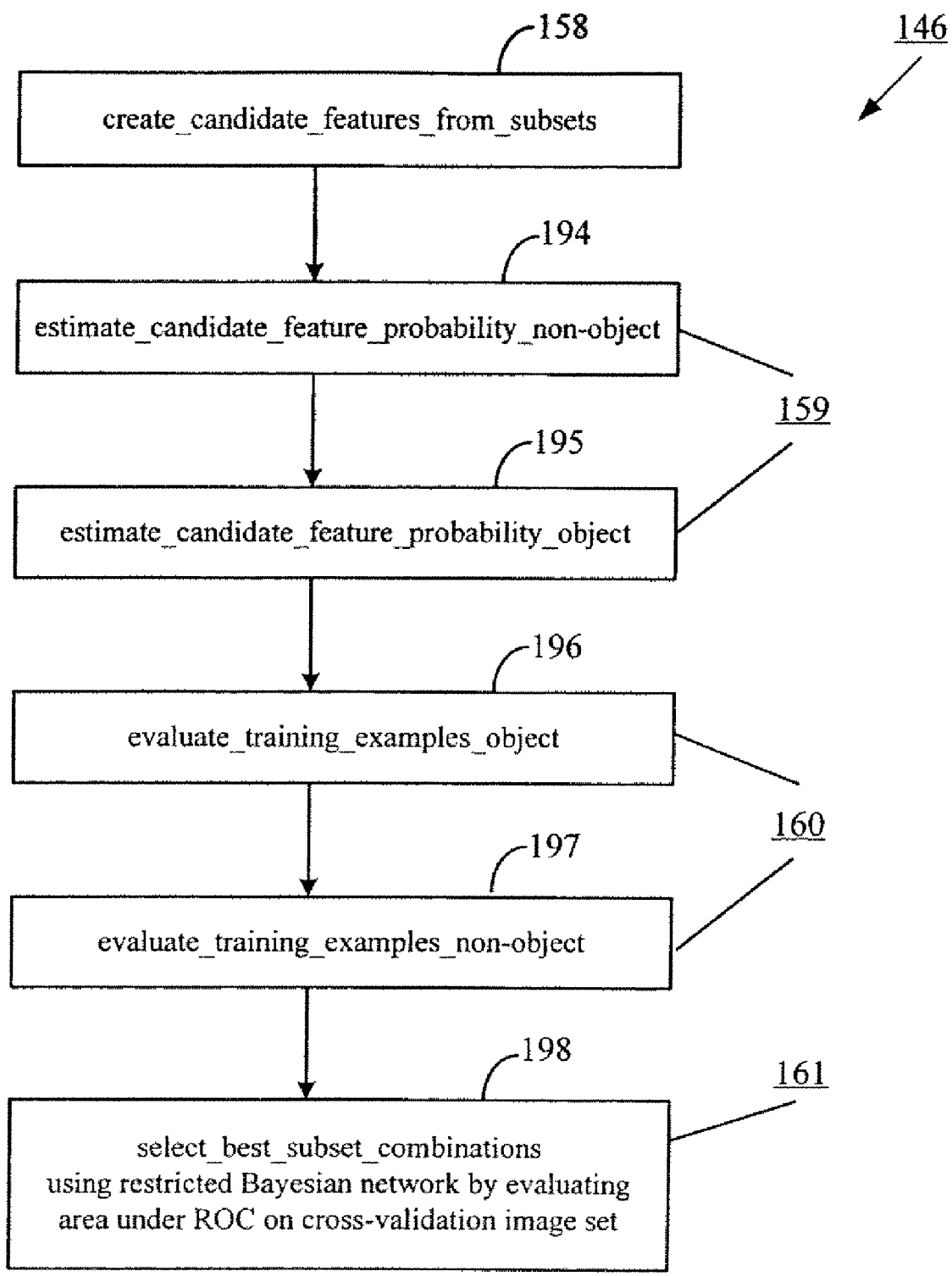
FIG. 21 is a flowchart illustrating the process flow through the candidate coefficient subset selection module according to one embodiment of the present disclosure.

In one embodiment the number of selected candidate subsets, q, was 200. In general, computational cost is linear in the number of candidate subsets and, therefore, does not prohibit consideration of a larger number of subsets, e.g., 1,000. Subset size is a flexible parameter that can be specified manually. Larger subsets have the potential to capture greater dependency. Larger subsets, however lead to greater dimensionality of the conditional probability distributions within the Bayesian network, and, therefore, size must be balanced against practical limits in representational power and limited training data. In one embodiment, multiple subset sizes of 4, 8, and 16 are used where an equal number of subsets of each size are chosen by the process described hereinabove. In another embodiment, a set of candidate subsets are selected (block 146 in FIG. 17A) by comparing the different reduced networks of equation (7) formed by different combinations of these subsets. The overall process for making this selection is shown in FIG. 21, which illustrates a detailed view of the sub-processes or sub-modules (158, and 194-198) that are part of the candidate subset selection module 146 in FIGS. 17A-17B.

To form a restricted Bayesian network, equation (7) requires representation of probability distributions over all the candidate subsets: $P(S_1|\omega_1), \ldots, P(S_q|\omega_1)$ and $P(S_1|\omega_2), \ldots P(S_q|\omega_2)$. It may not be possible to represent these distributions as full joint probability distributions because their dimensionality will be too great. Hence, a reduced representation may be desirable. In one embodiment, the create_candidate_features_from_subsets module 158 (FIGS. 17B and 21) forms a representation of each subset by a function, $f_i(S_i)$, that maps values for each subset $(S_i)$ of variables to a discrete-valued variable. Computational considerations may govern the complexity of the feature functions, $f_i(S_i)$. In early stages of evaluation in which many candidate windows have to be evaluated, the feature functions may be designed to be computationally efficient and restricted to a relatively small range of discrete values (for example, $10^2$ values). In later stages, when there are fewer windows to evaluate, the feature functions may be chosen to more discriminative and spread over a larger set of values (for example, $10^4$). In one embodiment, the early stages use features based on linear projection of the subset's wavelet coefficients and the later stages use features that do not use linear projection. It is noted here that, for the sake of convenience, the term "feature" is used herein interchangeably with the term "feature function."

Each subset of variables can be represented by a linear projection to a smaller number of coefficients. For example, if twelve wavelet coefficients, $w_1, \ldots w_{12}$, form a given subset, they may be projected down to five coefficients, $p_1 \ldots, p_5$, where each $p_k$ is given by:

$$p_k = v_k^T w$$

$$w = (w_1 \ldots, w_{12})^T \tag{13}$$

The linear projection vectors, $v_k$ may be determined by several methods: principal components vectors computed from the object training set, principal components computed over the non-object training set, principal components computed over the combined object and non-object training sets. It is noted that one skilled in the art of statistics and linear algebra would recognize the process of principal component analysis or the Foley-Sammon discriminant vectors (multidimensional extension of Fisher Linear discriminant) between, both classes as discussed in Foley, D. H. and Sammon, J. W., *An Optimal Set of Discriminant Vectors*, IEEE Transactions Computers (1975), vol. C-24, pp. 281-289, the disclosure of which is incorporated herein by reference in its entirety. In one embodiment, the various subbands (see, e.g., FIG. 10) may be multiplied by scalar constants prior to this computation (principal component analysis or the Foley-Sammon discriminate vectors determination) and correspondingly prior to projection on these linear vectors. In one embodiment, all 5/3 filter bank coefficients in all level-1 subbands are multiplied by 0.25 and all coefficients in all level-2 subbands are multiplied by 0.0625. In another embodiment, all 4/4 filter bank coefficients in level-1 are multiplied by 0.0156 and all coefficients in level-2 are multiplied by 0.00024414.

Each subset of projection coefficients can be represented by one discrete value that takes on a finite range of values. The one discrete value may be referred to herein as the "quantized feature value", which is represented herein by the variable, f. This transformation is achieved by quantization of the projection coefficients. Several methods of quantization may be used and their quantization thresholds may be determined by the following procedure.

In one method, referred to herein as "scalar quantization-1", each variable is first separately quantized. The quantization boundaries may be set in terms of the mean ($\mu$) and standard deviation ($\sigma$) of the variable computed over the object training images. For example, a variable could be quantized to 5 values with the following quantization boundaries:

$$d < \mu - \sigma$$

$$\mu - \sigma \leq d < \mu - 0.5\sigma$$

$$\mu - 0.5\sigma \leq d < \mu + 0.5\sigma$$

$$\mu + 0.5\sigma \leq d < \mu + \sigma$$

$$\mu + \sigma \leq d \tag{14}$$

The quantized feature value, f, can then be uniquely computed from this conglomerate of the quantized projection coefficient values. For example if there are three quantized projection values, $e_1$, $e_2$, and $e_3$, and if each of them takes on 5 possible values from 0 to 4, then f takes a value from 0 to 124 given by:

$$f = e_1 + 5e_2 + 5^2 e_3 \tag{15}$$

In another method, referred to herein as "vector quantization #1", the projection coefficients can be quantized by a form of vector quantization. The final quantized feature value, f, is computed from a truncated ordering of the coefficients magnitudes. For example, in one embodiment with 5 projection coefficients, the 3 largest coefficients are placed in order of their magnitude. There are 60 (=5!/2!) possible orderings of these 3 largest values. Each of these projection coefficients may be positive or negative. The "f" combines the ordering of the coefficients with their signs (positive or negative) giving a total of 480 (=60*$2^3$) possible values for "f."

A different method, referred to herein as "vector quantization #2, modifies vector quantization #1 by considering up to 3 values whose magnitude exceeds some pre-specified threshold. In one embodiment, this threshold is chosen as twice the mean of the coefficients corresponding to the top 3 projection vectors (in the case of projection vectors derived from principal components analysis) computed from the object training images. In this method, "f" takes on 571 values given by 480 values (if three coefficients exceed the threshold) plus 80 values (if two coefficients exceed the threshold) plus 10 values (if one coefficient value exceeds the threshold) plus 1 value (if no coefficient values exceed the threshold).

Another method, referred to herein as "vector quantization #3, is a modification of vector quantization #2. The vector quantization #3 method quantizes the coefficient due to the first principal component separately. In one embodiment, it quantizes this coefficient into 5 levels where the thresholds for these levels are given by:

$$d < \mu - \sigma$$

$$\mu - \sigma \leq d < \mu - 0.5\sigma$$

$$\mu - 0.5\sigma \leq d < \mu + 0.5\sigma$$

$$\mu + 0.5\sigma \leq d < \mu + \sigma$$

$$\mu + \sigma \leq d \tag{16}$$

This method then applies the vector quantization scheme #2 by ordering the top 3 of the 4 remaining coefficients, resulting in 249 possible values. In this method, "f" overall then has 1245 possible values corresponding to the product of these 249 values with 5 possible values for the quantized first coefficient.

Another method, referred to herein as "vector quantization #4, is also a modification of vector quantization #2. This method initially applies vector quantization #2. Then it applies a second threshold to the ordered coefficients. In one embodiment, this second threshold is four times the mean of the coefficients corresponding to the top 3 projection vectors (in the case of projection vectors derived from principal components analysis) computed from the object training images. The vector quantization #4 method then counts the number of coefficients that exceed this second threshold. This number can range from 0 to 3. Therefore, in this method, "f" has four times as many possible values as it does for vector quantization #2.

Often it is useful to use an additional measurement—"energy orthogonal to the projection"—given by the energy orthogonal to projection vectors. This energy equals;

$$g = \sum_{i=1}^{N} w_i^2 - \sum_{j=1}^{Q} p_j^2 \qquad (17)$$

Where N is the number of wavelet coefficients in a subset and Q is the number of projection vectors. Each "$p_j$" is a projection coefficient given by equation-13 and each "$w_i$" is a wavelet coefficient. In one embodiment, the value of "g" in equation (17) can be quantized to 4 levels. The quantization thresholds may be $0.5g_{ave}$, $g_{ave}$, and $2.0\, g_{ave}$, where $g_{ave}$ is the average value of g computed over the object training image set. Combining this measurement with any other quantized measurement increases the total number of quantization bins by a factor of 4.

It may also be useful to use an additional measurement—"energy of the projection"—given by the energy of the projection. This energy equals:

$$h = \sum_{j=1}^{Q} p_j^2 \qquad (18)$$

Where Q is the number of projection vectors. In one embodiment, the variable "h" in equation (18) is quantized to 4 levels. The quantization thresholds are $0.5h_{ave}$, $2.0h_{ave}$, and $4.0h_{ave}$, where $h_{ave}$ is the average value of h computed over the object training image set. Combining this measurement with any other quantized measurement increases the total number of quantization bins by a factor of 4.

Some additional examples of various other quantization methods include the following: (1) A "scalar quantization 1-A" method that combines scalar quantization #1 with the energy of the projection vectors measurement. (2) A "vector quantization 1-A" method that combines vector quantization #1 with the energy of the projection vectors measurement. (3) A "vector quantization 2-A" method that combines vector quantization #2 with the energy of the projection vectors measurement. (4) A "vector quantization 3-A" method that combines vector quantization. #3 with the energy of the projection vectors measurement. (5) A "vector quantization 4-A" method that combines vector quantization #4 with the energy orthogonal of the projection vectors measurement. (6) A "scalar quantization 1-B" method combines scalar quantization #1 with the energy orthogonal to the projection vectors measurement. (7) A "vector quantization 1-B" method that combines vector quantization #1 with the energy orthogonal to the projection vectors measurement. (8) A "vector quantization 2-B" method that combines vector quantization #2 with the energy orthogonal to the projection vectors measurement. (9) A "vector quantization 3-B" method that combines vector quantization #3 with the energy orthogonal to the projection vectors measurement. (10) A "vector quantization 4-B" method that combines vector quantization #4 with the energy orthogonal to the projection vectors measurement.

The following discusses an embodiment that uses various combinations of the quantization methods outlined above. In one embodiment, candidate subsets are represented by a form of vector quantization on each entire subset giving a function $f_i(S_i)$. In one embodiment, these functions, $f_i(S_i)$, are learned from the combined object training examples 150 and non-object training examples 154 using tree-structured vector quantization (TSVQ) over the entire set of training examples. A discussion of TSVQ is provided in Allen Gersho and Robert M. Gray, *Vector Quantization and Signal Compression*, published by Springer (1992), the relevant portion of which is incorporated herein by reference in its entirety.

Figure 22:
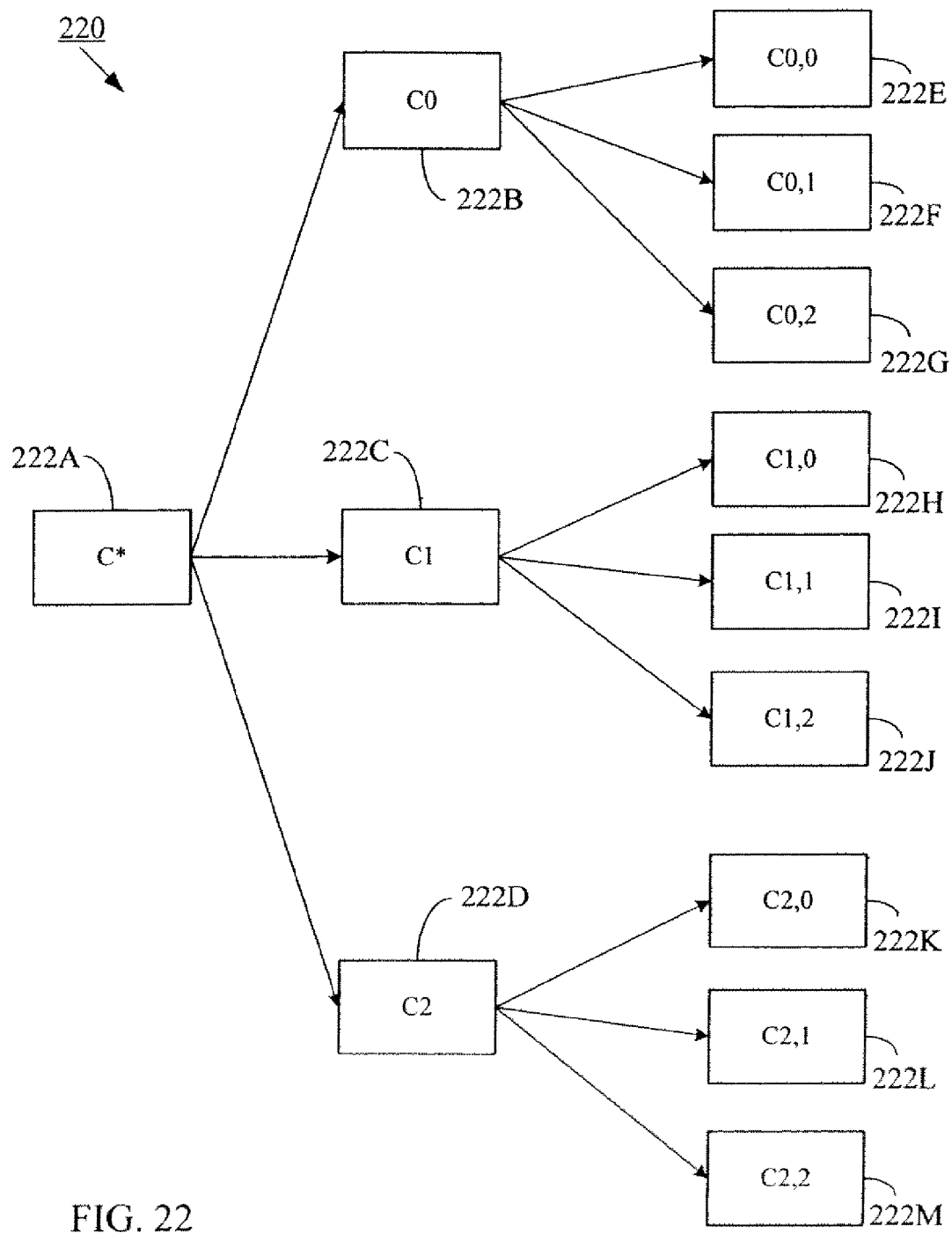
FIG. 22 illustrates a quantization tree generated by a tree-structured vector quantization (TSVQ)

An example tree 220 is shown in FIG. 22, which is adapted from FIG. 9.1 in the Gersho and Gray article mentioned above. Each node, 222A through 222M, in the tree 220 is associated with a "test-vector". Each function $f_i(S_i)$ is computed using such a tree. Starting at the root node C* (222A), the function $f_i(S_i)$ compares the input, $S_i$=s, to each of the test vectors of node's children (e.g., nodes C0, C1, C2, etc.). It then chooses the child node whose test vector is closest to the input vector and the process repeats using its children. Such a process is continually repeated until a node with no children (e.g., a node in the set of nodes 222E through 222M) is encountered. Such a node is called a "terminal node". Each terminal node has a unique code (i.e., a discrete value) giving the value of the function $f_i(S_i)$ for the input, $S_i$=s.

A method forms each quantization tree by repeatedly splitting the training data (the combination of blocks 154 and 150 in FIG. 17B) into clusters. The algorithm may begin by splitting the entire data into "r" clusters using the k-means algorithm over the variables represented by $S_i$. A description of the k-means algorithm can be found in R. Duda, P. Hart, D. Stork, "Pattern Classification," second edition, John Wiley & Sons (2001), and a relevant portion of this book describing the k-means algorithm is incorporated herein by reference. Other suitable clustering methods known in the art may be employed in place of the k-means approach. This split forms the first branches in the tree where each of these clusters becomes a node. The means of these "r" clusters become the "test vectors" for these nodes. The algorithm then recursively splits each resulting cluster until reaching a desired tree depth or some other suitable termination condition. The terminal nodes each may have a unique code. However, the actual codes used may not be important, so long as each terminal node has a unique code. Typically, the codes are integer values from 1 to "n", which are arbitrarily assigned to "n" terminal nodes.

The TSVQ approach may provide savings over ordinary VQ (vector quantization) in the number of comparisons that need to be performed. In ordinary VQ, the amount of computation is O(n) or "order of n"—i.e., the input has to be compared with all the nodes. Whereas, in a tree-structured VQ) (TSVQ), the number of comparisons is a function of the depth of the tree and the branching factor, and leads to a computation cost that are O(log(n)) (order of log(n)) for a balanced tree.

As mentioned earlier, any probability distribution can be represented by many functional forms (e.g., neural network, mixture of Gaussians, kernel-density function, etc.). In one embodiment, described in more detail hereinbelow, the functional form of each probability distribution in equation (7) (restricted Bayesian Network) is represented by a table of values where each entry in the table is indexed by a different value of "f", the quantized feature value described hereinabove. For example, consider a hypothetical probability distribution $P(f_4)$ where $f_4$ takes on 5 possible values (1, 2, 3, 4, 5). Such a table would have five entries corresponding to each of these possible values. Each entry would be a probability and all 5 probabilities would sum to 1.0. Under this representation, the restricted Bayesian network takes the following form:

$$P(X_1, \ldots, X_n) = \frac{P(f_1)P(f_2) \ldots P(f_r)}{[P(X_1)]^{a_1}[P(X_2)]^{a_2} \ldots [P(X_n)]^{a_n}} \quad (19)$$

Figure 23:
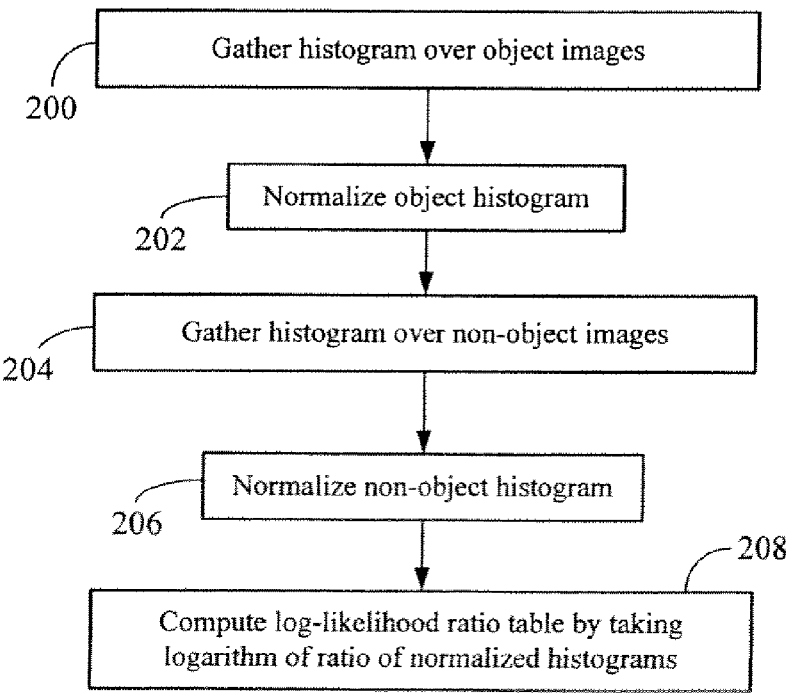
FIG. 23 is a flowchart illustrating the process flow for constructing log-likelihood tables indexed by feature values according to one embodiment of the present disclosure.

In one embodiment, the estimate_candidate_feature_probability_object module 195 and the estimate_candidate_feature_probability_non_object module 194 in FIG. 21 estimate probability tables from the training data. Both of these modules constitute the estimate probability distribution module 159 in FIG. 17B. As illustrated in FIG. 23, this training process may include, gathering histograms over object and non-object training images (blocks 200 and 204, respectively), normalizing the histograms to compute $P(f_n|\omega_1)$ (object) and $P(f_n|\omega_2)$ (non-object) for each subset (blocks 202 and 206, respectively), and forming the log-likelihood ratio: log $[P(f_n|\omega_1)/P(f_n|\omega_2)]$ (block 208). Histogram collection and normalization is discussed below with reference to discussion of FIGS. 24 and 25.

The estimate_candidate_feature_probability_object module 195 and the estimate_candidate_feature_probability_non_object module 194 in FIG. 21 may also estimate marginal probability distributions, $P(X_i|\omega_1)$ and $P(X_i|\omega_1)$ for each input variable $X_1 \ldots X_n$. These distributions may be used to represent the denominator of equation (7). Each of these distributions is estimated as a histogram where each variable is quantized to a pre-determined set of levels. A method, of histogram construction is discussed later hereinbelow. Each variable may be quantized to a pre-determined set of levels. In one embodiment, each variable is quantized to 13 levels given by;

$d < \mu - 3\sigma$ $\mu - 3\sigma \leq d < \mu - 1.9\sigma$ $\mu - 1.9\sigma \leq d < \mu - 1.2\sigma$ $\mu - 1.2\sigma \leq d < \mu - 0.7\sigma$ $\mu - 0.7\sigma \leq d < \mu - 0.35\sigma$ $\mu - 0.35\sigma \leq d < \mu - 0.1\sigma$ $\mu - 0.1\sigma \leq d < \mu + 0.1\sigma$ $\mu + 0.1\sigma \leq d < \mu + 0.35\sigma$ $\mu + 0.35\sigma \leq d < \mu + 0.7\sigma$ $\mu + 0.7\sigma \leq d < \mu + 1.2\sigma$ $\mu + 1.2\sigma \leq d < \mu + 1.9\sigma$ $\mu + 1.9\sigma \leq d < \mu + 3\sigma$ $\mu + 3\sigma \leq d \quad (20)$ FIG. 24 illustrates an exemplary histogram 58. The histogram 58 shown in FIG. 24 is for illustrative purposes only. In actual operation, the set of histograms for the classifier 34 may contain many more histograms with many different values. A histogram counts the frequency of occurrence of values of a given function. Each column in a histogram is called a "bin." The bin is a count of the number of times a specific value of the given function has occurred. Thus, for example, the bin for y=1 or 4 in FIG. 24 shows that the value y=1 or 4 has occurred 20 (twenty) times, whereas the value of y=6 has occurred 15 (fifteen) times, and so on.

In one embodiment, the statistics for the object training images may be gathered in steps 200 and 204 in FIG. 23. As shown in FIG. 25, a discrete value, f, (the quantized feature value) is computed for each training image. In the example of FIG. 25, the quantizer for subset-1, $f_1$, takes the value "567", whereas the quantizer for subset-k, $f_k$, takes the value "350". The term "subsets" as used herein refers to the candidate subsets of coefficients generated by block 144 in FIG. 17B or equivalently block 192 in FIG. 20. It is noted that because of quantization there may be more than one combination of input values producing the same discrete value.

Histograms can be collected by counting the number of occurrences of each quantized value across the set of training images. Then, a table of probabilities (not shown) can be generated for each probability distribution $P(f_k|\omega_1)$ (object) and $P(f_k|\omega_2)$ (non-object) from the corresponding histograms, $H_{k,object}()$ and $H_{k,non-object}()$, associated with feature $f_k$ as shown in FIG. 25. Each probability value in the table (not shown) corresponds to a bin in the respective histogram (not shown). For example, for feature '$f_1$', to compute the probability of feature value "567," the bin count $H_1(\#567)$ is divided by the count of all bins for histogram $H_1$ (i.e., $\Sigma H_1(\#i)$). Other probabilities may be similarly calculated. This process represents the normalization steps in blocks 202 and 206 in FIG. 23. It is noted that although FIG. 25 shows human faces constituting the set of training images 118, the method outlined in FIG. 25 can also be used to collect histograms corresponding to a sub-classifier for training images of any object including, for example, cars, telephones, shopping carts, etc., and also for the "non-object" class.

The evaluate_training_examples_object module 196 and the evaluate_training_examples_non_object module 197 in FIG. 21 evaluate the probability of each labeled example with respect to all subset probability distributions, $P(F_1|\omega_1), \ldots, P(F_q|\omega_1)$ and $P(F_1|\omega_2), \ldots, P(F_q|\omega_2)$, and all probability distributions over the input variables, $P(X_1|\omega_1), \ldots, P(X_n|\omega_1)$ and $P(X_1|\omega_2), \ldots, P(X_n|\omega_2)$. The evaluation may be done by table look-up; that is, for evaluating a given training example, X, against a particular distribution, $P(F_k|\omega_1)$, the example's feature value $f=F_k(X)$ is first computed, by the methods described hereinbefore, and then the probability associated with this value is retrieved by using the value as index into the table representing $P(f=F_k|\omega_1)$. The modules 196 and 197 constitute the module 160 in FIG. 17B. The select_best_subset_combination module 198 in FIG. 21 chooses a classifier in the form of equation (19) by using r of the q candidate subsets. This module 198 form the module 161 in FIG. 17B. A goal of classifier selection is to make the choice that minimizes empirical classification error over a set of labeled examples. In particular, it may be desirable to select the classifier structure that leads to the largest area underneath the receiver operating characteristic (ROC) curve. This measure accounts for the classifier's full operating range over values for the threshold, $\lambda$, in equation (1). It is noted that a description of the ROC curve can be found in R. Duda, P. Hart, D. Stork, "Pattern Classification," second edition, John Wiley & Sons (2001), and a relevant portion, of this book describing the ROC curve is incorporated herein by reference.

In one embodiment, a restricted Bayesian Network in the form of equation (19) is formed for a given combination of candidate subsets through the following process. It is noted that disjoint subsets are treated as statistically independent. For example, the network formed by two disjoint subsets, $S_1$ and $S_2$, becomes two disjoint nodes representing $P(S_1)$ and $P(S_2)$, respectively, with overall probability $P(S_1)P(S_2)$. On the other hand, two intersecting subsets are treated as conditionally independent on the common variables. For example, a Bayesian network composed from $S_3$ and $S_4$ with $$R = S_3 \cap S_4 = \{X_{17}, X_{33}, X_{92}\} \quad (21)$$

has a structure with a third node representing P(R). This node is then parent to two nodes with probabilities $P(S_3|R)$ and $P(S_4|R)$. The overall probability for this network is then:

$$P(S_3, S_4) = P(S_3|R) P(S_4|R) P(R) \quad (22)$$

Under feature representation for each subset, the relationship in equation (22) becomes:

$$P(S_3, S_4) \approx P(F_3|R) P(F_4|R) P(R) = \frac{P(F_3) P(F_4)}{P(R)} \quad (23)$$

where $F_3 = f(S_3)$ and $F_4 = f(S_4)$

To efficiently compute classification error, it may be preferable to make an independence assumption, in representing the parent node, P(R). Doing so, the overall probability may be written in the form of equation:

$$P(S_3, S_4) \approx \frac{P(F_3) P(F_4)}{[P(X_{17})]^{\alpha_{17}} [P(X_{33})]^{\alpha_{33}} [P(X_{92})]^{\alpha_{92}}} \quad (24)$$

where the members of the parent R, are represented as statistically independent. In this reduced parameterization, there are pre-computed distributions for every term, whereas, in the form of equation (23), one may have to estimate P(R) in the very least; that is, one cannot obtain P(R) by marginalizing $P(F_3)$ or $P(F_4)$ since they involve dimensionality reduction on the original variables. It also may not be possible to originally estimate the full distributions, $P(S_3)$ and $P(S_4)$, because $S_3$ and $S_4$ are usually of too high dimension. It is noted that the $\alpha$'s may be computed from the number of occurrences of the variable, $e_i$ (see, e.g., equation-15), over all the chosen subsets. It is noted that $e_i$ greater than "1" indicates some redundancy in representing the variable across these subsets. Therefore, it may be preferable to choose the term in the denominator in equation (24) to correct for this redundancy and choose $\alpha_i = e_i - 1$. Otherwise, the contribution of the variable would be "over-counted."

In the general case, the probability distribution formed over many subsets is;

$$P(X_1, \ldots, X_n) = \frac{P(F_{j(1)}) P(F_{j(2)}) \ldots P(F_{j(r)})}{[P(X_1)]^{\alpha_1} [P(X_2)]^{\alpha_2} \ldots [P(X_n)]^{\alpha_n}} \quad (25)$$

where $j(1) \ldots j(r) \in \{1, \ldots, q\}$

The numerator in equation (25) gives the product of all r chosen subsets and the denominator could be thought of as correction for redundancy among these subsets. Using the parameterization discussed hereinabove, the overall log-likelihood function may be given as:

$$f(X) = \frac{\frac{P(F_{j(1)}|\omega_1) P(F_{j(2)}|\omega_1) \ldots P(F_{j(r)}|\omega_1)}{[P(X_1|\omega_1)]^{\alpha_1} [P(X_2|\omega_1)]^{\alpha_2} \ldots [P(X_n|\omega_1)]^{\alpha_n}}}{\frac{P(F_{j(1)}|\omega_2) P(F_{j(2)}|\omega_2) \ldots P(F_{j(r)}|\omega_2)}{[P(X_1|\omega_2)]^{\alpha_1} [P(X_2|\omega_2)]^{\alpha_2} \ldots [P(X_n|\omega_2)]^{\alpha_n}}} \quad (26)$$

For a given chosen candidate subset combination and a given training example, an appropriate set of pre-computed values of $P(f_k|\omega_1)$, $P(f_k|\omega_2)$, $P(X_1|\omega_1)$, and $P(X_i|\omega_2)$ for that training example are retrieved by table look-up. These values may then be substituted in equation (26) to get the log-likelihood ratio for a given labeled example.

The select_best_candidate_feature_combination or select_best_subset_combinations module 198 in FIG. 21 greedily searches for structure of equation (26) by incrementally combining subsets such that ROC area characteristic is maximized over all training examples. In one embodiment, this greedy search involves the process 230 illustrated in FIG. 26. After evaluating all candidate subsets on the training data (step 232), the first candidate subset (K=1) is chosen at step 234. The area under the ROC curve is calculated for each of the Q sets of sub-classifiers selected in step 236 in FIG. 26. The best M candidate sets of "K" sub-classifiers can then be chosen in step 238, where these are the M candidates that give the largest area under the ROC curve. In step 240, the value of K can be incremented by one. Then, at step 242, candidate combinations of size K can be created by adding another sub-classifier to each of the M candidates of size K−1. The selection of best M combinations with "K" members is again performed at block 241. The process 230 of FIG. 26 can begin again at step 236 for sets of sub-classifiers of size K. The process can be completed when K reaches a predetermined value (e.g., K=20). In one embodiment, the ROC curve of these final M candidate sub-classifiers can be evaluated in step 244 on the cross-validation data (block 152 in FIGS. 17A-17B). The best set of K sub-classifiers can then be chosen according to this criterion.

It is observed that an ROC curve is a plot of the number of objects classified correctly versus number of false positives for a given classifier evaluated on a given set of test images. Each point on the plot (not shown) may represent evaluation for a different value of λ (in equation (1)). The area under the ROC curve is related to the performance of the classifier. Thus, a greater area indicates better performance of the algorithm. Hence, for example, in face detection, a high area means that a high number of faces classified correctly can be achieved with a low number of false positives.

Figure 26:
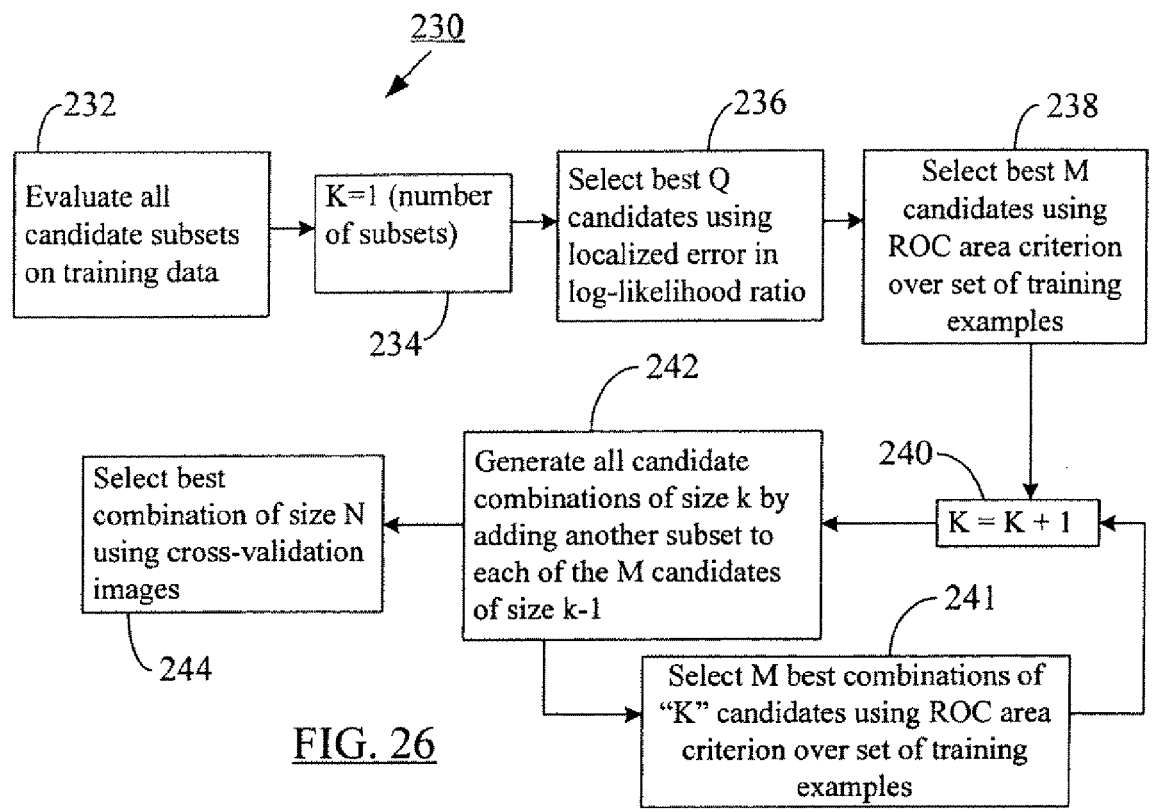
FIG. 26 depicts a process of selecting the final set of candidate coefficient subsets.

The search illustrated in the process 230 of FIG. 26 may be performed multiple times, (e.g., 10 times in one embodiment) to select multiple structures by restricting successive searches from making identical choices to previous searches. The module 198 in FIG. 21 compares the structures determined (using, for example, the process 230 of FIG. 26) by making more costly performance comparisons on cross-validation data (images that are separate from other aspects of training). The module 198 then chooses the structure that performs best on these cross-validation images based on the ROC criterion.

The construct_Bayes_Network module or the construction_full_Bayestan_Network block 148 in FIG. 17A may be configured to derive a final representation for the probability distribution that does not involve making the independence assumption in equation (26) (the independence of a node's parents). The module 148 forms a full Bayesian network given by equation (6) from the independencies and dependencies implied by the subset grouping where if any two subsets contain overlapping variables, the two subsets are represented as conditionally independent given the overlapping variables. The Bayesian Network Connectivity module 162 (which is part of the module 148 in FIG. 17A) in FIG. 17B may derive the graphical structure of the Bayesian network through the following process. The module 162 may identify all groups of variables that act in unison; that is, a group of variables that always co-occur together when they occur in a subset. Each such set of variables will form a node in the final network. For example, consider subsets (X1,X7), (X1,X2,X3), (X1,X2,X4,X5), (X4,X5,X6). In these subsets, only the combination (X4,X5) acts in unison. Hence, the combination (X1,X2) would not form a node because only one of them (X1) occurs in the first group (X1,X7)—i.e., X1 does not always occur in unison with X2 as seen from the first group (X1,X7). Some variables may not act in unison with any other variables. Each such variable may become a separate node. Thus, this example produces the following nodes: $N_1$=(X1), $N_2$=(X2), $N_3$=(X3), $N_4$=(X4,X5), $N_5$=(X6), $N_6$=(X7). The module 162 may then form the network by placing the nodes in some ordering. The ordering may be determined by a process described hereinbelow.

The module 162 may add directed arcs to indicate parent-child relationships within the ordering. A node becomes a parent to another node if it precedes the second node in the ordering and if both nodes occur in a subset; that is, if the variables from these two nodes occur together within at least one subset. There are n! possible orderings of the n subsets each leading to a different network topology. Each of these orderings can produce a network satisfying the dependencies implied by the subsets. However, some of these networks will be more desirable than others in that they minimize the dimensionality of the resulting conditional probability distributions. For example, consider 3 subsets: (X1,X2), (X1,X3), (X1,X4) producing nodes (X1)(X2)(X3)(X4). If (X1) is placed as the last node in the ordering, then the network contains a four dimensional conditional probability distribution; P(X1|X2, X3, X4). On the other hand, if (X1) is the first node, the maximum dimensionality of any conditional probability distribution will be 2. To minimize the dimensionality of a conditional probability distribution at a node, it may be desirable to minimize the number of incoming branches to the node.

The "branch count", i.e., the total number of branches flowing in and out of a node, is pre-determined regardless of the topology. The branches associated with a particular node are determined by which other nodes belong to the same subsets—i.e., the ordering process may take every subset that the node belongs to, and may also take form the total set of other nodes that belong to any of the same subsets. The node must be connected to each of these other nodes by a branch. The ordering of the nodes, however, determines the direction of these connections.

In choosing an ordering, it is desirable to find a network in which the conditional probability distributions are as small as possible. The best possible case is a network with "n" terminal nodes (where "n" is the number of subsets and no subset is proper subset of another subset), where the dimension of any conditional probability distribution along the path to each terminal node is less than or equal to the dimension of the subsets represented by the product of conditional probability distributions along this path. However, depending on the composition of subsets, such as arrangement may not be always possible. In one embodiment, the ordering of nodes in the network may be assigned by the following process. First, the node with the maximum branch count may be identified and assigned as the first node. Other nodes may then be added, one by one, in order of branch count, but considering only those nodes which would become children of nodes already in the network. If a point is reached where none of the unassigned nodes has a parent among the network nodes, then another node with the largest branch count may be added and the process may continue adding nodes in the same fashion.

In order to represent the chosen Bayesian network, it may be desirable to represent the conditional probability distributions at all nodes, $P(N_1|Pa_{N1}\omega_1), \ldots, P(N_q|Pa_{Nq}\omega_1)$ and $P(N_1|Pa_{N1},\omega_2), \ldots, P(N_q|Pa_{Nq}\omega_2)$, where $Pa_{Nk}$ is the set of variables of all the parent nodes of node Nk. It may not be possible represent these distributions as full joint probability distributions since their dimensionality will be too great (q of these distributions will at least match the dimensionality of the original subsets). In one embodiment, each conditional probability distribution is represented by a table (not shown) over discrete valued variables as noted hereinbefore.

There are several approaches to dimensionality reduction in the context of representing a conditional probability distribution. The following discusses two possibilities. In the first approach, the ratio $P(X_1 \times X_2)/P(X_2)$ [where $X_1=N_k$ (the variables at node K) and $X_2=Pa_k$ (the parent variables at node K)] is represented by quantizing the numerator and the denominator separately; that is, monolithic quantization of the space $X_1 \times X_2$ may be used and then a separate independent quantization of $X_2$ may be performed as given below:

$$Z_{1,2}=f_1(X_1 \times X_2) \qquad (27)$$

$$Z_2=f_2(X_2) \qquad (28)$$

Alternatively, in the second approach, $X_1$ and $X_2$ are quantized separately as given below:

$$Z_1=f_1(X_1) \qquad (29)$$

$$Z_2=f_2(X_2) \qquad (30)$$

In the above equations 27-30, "fi( )" denotes the quantized feature value function.

The first approach (equations (27) and (28)) may be more attractive in that it is a direct quantization of the space $Z_{1,2}=f_1(X_1 \times X_2)$ and therefore may be a more efficient representation than that given by the Cartesian product $Z_1 \times Z_2$ in that it can capture joint relationships between these two sets of variables. However, when this representation (in equations (27) and (28)) is rewritten in terms of these quantized variables, it may no longer necessarily be a conditional probability distribution: $P(Z_{1,2})/P(Z_2)$, and one can end up representing something different than one intended. In particular, one can imagine pathological cases such as when the dynamic range of $X_2$ is far larger than that of $X_1$. In such a case, the quantization of the combined space, $Z_{1,2}$, will represent changes in $X_2$ and neglect changes in $X_1$. The numerator $P(Z_{1,2})$ will then be nearly equivalent to $P(Z_2)$ and the overall expression for their ratio will be nearly equal to one ("1") regardless of the input. In contrast, the $2^{nd}$ representation in equations (29) and (30) may maintain the desired conditional relationship.

One embodiment (module 163 in FIG. 17B) combines aspects of both approaches described hereinabove in conjunction with equations (27) through (30). This approach in module 163 quantizes the variables in the numerator and denominator in the ratio $P(X_1 \times X_2)/P(X_2)$ sequentially using Tree-Structured Vector Quantization (TSVQ) (described hereinbefore) through the following process. The first step forms the quantization tree for $X_2$ using TSVQ over the entire set of training examples but only with the values of the $X_2$ variables within each example. This step gives $Z_2=f_2(X_2)$. However, rather than starting from scratch to determine $Z_{1,2}=f_1(X_1 \times X_2)$, the second step expands the tree representing $Z_2=f_2(X_2)$ further by subdividing and clustering each of its (tree's) terminal nodes using only the $X_1$ values of each example. This method may give a "hybrid tree" representation for $Z_{1,2}=f_1(X_1 \times X_2)$, where up to a certain depth, the path through the tree is based on $X_2$ and then for the remainder of the tree, the path is based on $X_1$. By doing so, a representation of $Z_{1,2}=f_1(X_1 \times X_2)$ is obtained that is more efficient and concise than performing the quantization separately for $X_1$ and $X_2$ and taking the Cartesian product of their quantized values, $Z_1 \times Z_2$. For each possible value of $X_2$, the second step forms a sub-tree that reflects quantized values of $X_1$ that occur given this value of $X_2$. Such a quantization method therefore can capture dependencies between $X_1$ and $X_2$. Moreover, because the quantization functions in the numerator and denominator are consistent in their representation of $X_2$, such a representation may preserve the conditional probability relationship.

In the embodiment of FIG. 17B, the block 164 computes the conditional probability distributions, $P(N_1|Pa_{N1},\omega_1), \ldots, P(N_q|Pa_{Nq},\omega_1)$ and $P(N_1|Pa_{N1},\omega_2), \ldots P(N_q|Pa_{Nq},\omega_2)$, of the Bayesian network sub-classifier by a method called Ada-Boost with Confidence Weighted Predictions algorithm discussed in R. E. Shapire, Y. Singer, "Improving Boosting Algorithms Using Confidence-rated Predictions", Machine Learning, 37:3, pp. 297-336, December, 1999 (hereafter, "Shapire & Singer"), the disclosure of which is incorporated herein by reference in its entirety. Here, $Pa_{Nk}$ is the set of variables of all the parent nodes of node k.

The AdaBoost algorithm is a general method for training pattern classifiers. The AdaBoost algorithm minimizes the classification error on the training set and maximizes the margin between the two classes on the training set as discussed in Shapire & Singer. It is rioted here that AdaBoost is a general method that can be applied to any type of classification algorithm. Given any classifier, AdaBoost works by sequentially re-training multiple instances of the classifier, where, for example, each instance corresponds to a different set of values for the look-up fables (not shown) comprising the terms in equation (6); $P(N_1|Pa_{N1},\omega_1), \ldots P(N_q|Pa_{Nq},\omega_1)$ and $P(N_1|Pa_{N1},\omega_2), \ldots P(N_q|Pa_{Nq},\omega_2)$. To perform classification, AdaBoost applies all of such instances of the classifier in combination and computes the weighted sum of their output to make a classification decision. This approach may result in the increased computational cost of applying all the classifiers in the combination. The method described hereinbelow is a process for overcoming this increased computational cost of the AdaBoost approach whereby the combination of classifiers is reduced back into one classifier.

Figure 27:
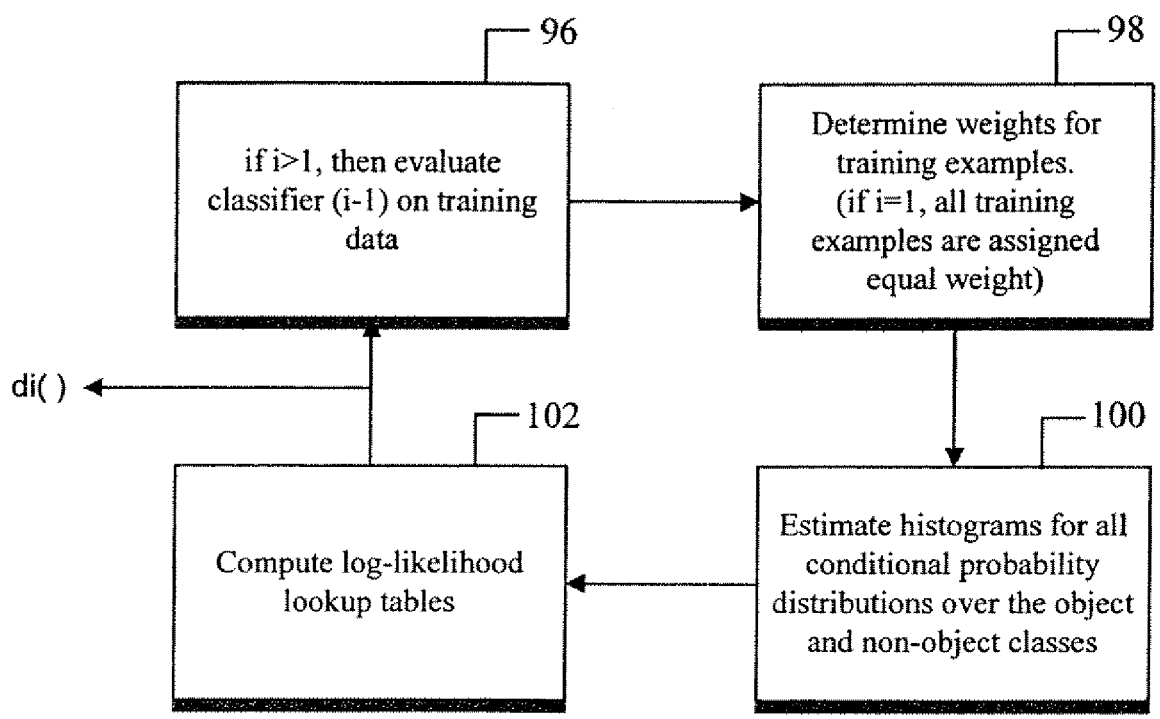
FIG. 27 illustrates how classifiers are estimated using the AdaBoost algorithm according to one embodiment of the present disclosure.

As shown in FIG. 27, the AdaBoost algorithm works in an iterative fashion. First, a classifier is trained at block 98 in FIG. 27 by assigning the same weight to all training examples (e.g., blocks 150 and 154 in FIGS. 17A-17B) at the instance i=1 for that classifier. It is observed here that the training for i=1 may be identical to that discussed hereinbefore in conjunction with block 144 in FIGS. 17A-17B, except that the probability distributions forming the classifier in block 144 in FIGS. 17A-17B are unconditional probability distributions, whereas in the block 98 in FIG. 27 they are conditional probability distributions. For each i>1, the $(i-1)^{th}$ instance is evaluated on the training data (block 96, FIG. 27). Then, the classifier is iteratively retrained where more weight is given to training examples that were incorrectly classified by the classifier trained in the previous iteration (block 98, FIG. 27). This process repeats for p iterations, where "p" represents a predetermined number of iterations. Each iteration produces another instances of the classifier. Currently, there are no rigorous theoretical guidelines on how to choose the value of "p." However, experimentally, a value of as little as "5" can lead to improvement and values as large as "100" can lead to further improvement. In one embodiment, the values for "p" are in the range of 15 to 20. It is shown in Shapire & Singer that through this iteration process the classification error can be decreased.

As illustrated in FIG. 27, to re-train an instance of the classifier at each iteration, the AdaBoost algorithm re-computes the histograms for each conditional probability distribution over the object and non-object training samples (block 100) using the weights determined at block 98. Histograms can be collected by counting the number of occurrences of each quantized feature value, $f_i(S_i)$, across the set of training images. However, instead of incrementing each histogram bin by "1" for each training example, it may be preferable to increment by the weight assigned to the training example. For that purpose, it may be desirable to scale and round the training example weights to integers.

Block 102 in FIG. 27 computes a log-likelihood look-up table (not shown) for each pair of conditional probability distributions $P(N_k|Pa_{Nk},\omega_1)$ and $P(N_k|Pa_{Nk},\omega_2)$ (object and non-object classes, respectively) corresponding to a particular node in the Bayesian network. The overall Bayesian network is then given by equation (6), which when used for both classes (object and non-objet) gives the overall sub-classifier given by equation (2). In the following discussion, let $G(X) = h_i(X)$ from equation (2).

Normally, under AdaBoost, to perform classification, for each input X, one may have to compute the output generated by X for all instances of the classifier G(X) (i.e., $G_i(X)$, for i=1 ... p), and then compute the weighted sum of these values, where the weights are given by $a_i$:

$$\sum_{i=1}^{p} a_i G_i(X) \quad (31)$$

where $$G_i(X) = \sum_{j=1}^{p} \log \frac{P_j(N_j | Pa_j, \omega_1)}{P_j(N_j | Pa_j, \omega_2)} \quad (32)$$

This involves "p" times the amount of computation of just evaluating a single instance of the classifier, where a single instance of the classifier could be trained using uniform weighting for all training examples.

However, in one embodiment, each $G_i(X)$ is represented by equation (2). By substituting for equation (6) in equation (2), the right-hand side of the classifier in equation (31) can be expressed as:

$$\sum_{i=1}^{p} \sum_{j=1}^{n} a_i \log \frac{P_{ij}(N_j | Pa_j, \omega_1)}{P_{ij}(N_j | Pa_j, \omega_2)} \quad (33)$$

The equation (33) can be re-written in a mathematically equivalent form as:

$$\sum_{j=1}^{n} g_j(X) \quad (34)$$

where each $g_j(X)$ represents a single log-likelihood table pre-computed by the sum:

$$g_j(X) = \sum_{i=1}^{p} a_i \log \frac{P_{ij}(N_j | Pa_j, \omega_1)}{P_{ij}(N_j | Pa_j, \omega_2)} \quad (35)$$

The resulting classifier in equation (34) has the same computational cost as the original classifiers in equation (32) or equivalently, equation (2).

In one embodiment p AdaBoost iterations are computed. For each iteration number, 1 ... p, the determine_detection_threshold module 165 in FIG. 17B measures performance of the classifier on the cross-validation test set (block 152 in FIG. 17B). The number of iterations (say "k") that gives the best performance is chosen and the sum in equation (35) is pre-computed up to k rather than p.

In one embodiment, each stage may be "weighted" differently. In particular, equation (4) can be modified such that weights, $c_i$, can be specified for each stage as given below:

$$H = c_1 H_1 + \ldots + c_N H_N \quad (36)$$

or equivalently as a cascade of weights:

$$H = H_N + C_{N-1}(H_{N-1} + C_{N-2}(H_{N-2} \ldots + c_1 H_1) \ldots) \quad (37)$$

In one embodiment, at block 165 in FIG. 17B, the weight $C_{k-1}$ may be chosen in the equation (37) by empirically trying a range of values, e.g., (0.1, 0.25, 1.0, 4.0, 10.0), over the set of cross-validation images and choosing the weight that gives the best accuracy as measured with respect to area under the ROC curve.

In one embodiment, the performance over these p AdaBoost iterations is computed where, for each iteration, performance is evaluated over several different weightings of the current stage with respect to the previous stages. In one embodiment, these weightings are (0.625, 0.25, 0.6, 1.5, 4.0). The trial that gives the best performance is chosen. The chosen trial indicates the AdaBoost iteration and the weighting $\alpha$. The sum in equation (34) is computed up top, and then the sum is weighted by $\alpha$.

In one embodiment, block 165 in FIG. 17B determines the threshold $\lambda_k$ applied to equation (4) to achieve a desired performance by measuring accuracy of classifier up to stage "k" for different settings of $\lambda_k$ on the cross-validation images at block 152 in FIG. 17B.

Lighting Correction

Lighting correction may be necessary to compensate for differences in lighting of various objects (especially when a classifier is to be used for object detection in real life conditions where object lighting may be less then optimal). In one embodiment, a lighting correction process 36 precedes evaluation of the classifier as illustrated in FIG. 4B and by block 70 in FIG. 9. Similarly, in training, lighting correction may be performed on each training example immediately after evaluation of the wavelet transform. Here, the term "evaluation" means "computing the wavelet transform." Such lighting correction is indicated at block 109 in FIG. 18.

Unfortunately, no lighting correction method may be dependable in all situations. Therefore, in one embodiment, the classifier 34 applies multiple methods of compensation, where each method provides its input to a different group of sub-classifiers. Such an approach may be less susceptible to the failures of an individual method of correction.

In one embodiment, a "localized lighting correction" method adjusts the value of each wavelet coefficient as a function of its neighboring coefficients from within its sub-band and from other subbands. Each coefficient in each band may be normalized as follows. Each LL coefficient is normalized by its 3×3 (pixels) neighborhood in the LL band. The normalization process computes the average absolute value of the neighborhood. If this average is less than a pre-specified threshold (described hereinbelow), the coefficient is assigned a value of "1.0". Otherwise, the normalized LL coefficient is computed as the ratio of the original coefficient divided by this neighborhood average. Each coefficient in the LH and HL bands is normalized by the combined average of its 3×3 neighborhoods in the LH and HL bands. If this average is less than a threshold, the normalization process assigns value "0.0" to the normalized coefficient. If the average is greater than the threshold, the normalized coefficient is given by the ratio of the original coefficient divided by this average. Each coefficient in the HH band is normalized by the average of its 3×3 neighborhood in the HH band. If this average is less than a threshold, the normalization process assigns value "0.0" to the normalized coefficient. If the average is greater than the threshold, the normalization process divides the original coefficient by the average to give the normalized coefficient. In one embodiment, these thresholds are "1.0" for all LL bands, "2.5" for LH and HL sub bands, and "1.25" for HH subbands. These thresholds may be selected empirically.

In another embodiment, a "variance normalization" method linearly scales all the wavelet coefficients in the image window or some selected portion of it (described hereinbelow), such that the intensities in the region or a selected portion of it, have a pre-specified variance value. Alternatively, or in addition to the lighting corrections methods mentioned hereinbefore, a "brightest point normalization" method may be used to scale all wavelet coefficients such that the brightest spot in the candidate region or some selected portion of it (described hereinbelow) has a fixed value.

Evaluation of Classifier

Figure 28:
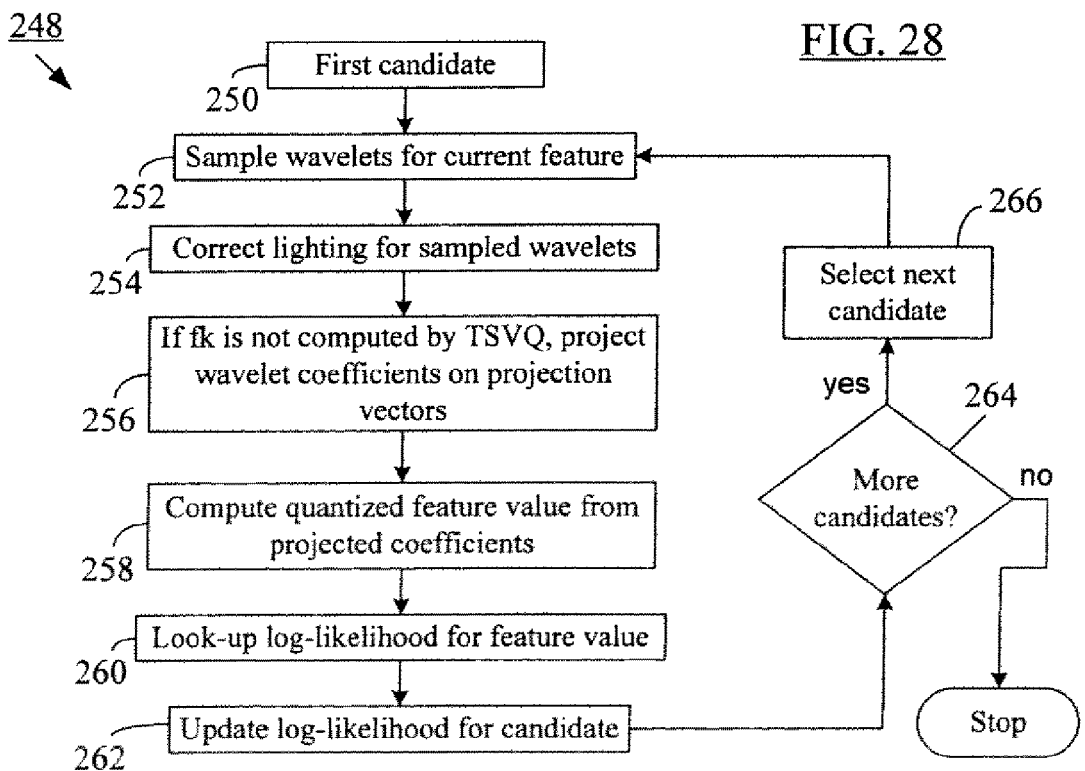
FIG. 28 shows a process for evaluating one feature in one scale in the search across position according to one embodiment of the present disclosure.

FIG. 28 illustrates an exemplary process 248 that explains blocks 70, 72, 74, and 76 from FIG. 9 in more detail evaluating a single feature from a sub-classifier at the specified candidate locations. This process is repeated for all features comprising the sub-classifier as seen from the process loop at block 266 in FIG. 28. At block 250, the image window 32 is placed at a first location in the set of image window locations to be evaluated. At block 252, the wavelet coefficients used by the feature $f_k$ are sampled. It is observed here that, at block 252, the wavelet coefficient are chosen from the corresponding image window 32 within the selected components of the wavelet transform of the image (i.e., the input image 16 or a scaled version of the input image). At block 254 in the process 248, lighting correction is applied to the wavelet coefficients, where the lighting correction was computed at block 70 of FIG. 9. Blocks 256, 258 and 260 in FIG. 28 involve computing feature value $f_k$ (for example, by TSVQ or projecting the wavelet coefficients on the linear projection vectors and computing a quantized feature value from projection coefficients), and retrieving the log-likelihood associated with the quantized value. The operations at blocks 256, 258, and 260 may be identical to their counterparts in the classifier training procedure described hereinbefore. At block 262, the log-likelihood for the candidate within this phase and stage is updated by adding the retrieved log-likelihood value to the corresponding log-likelihood sum for the candidate. The image window 32 can then be shifted to a second location (as shown, for example, in FIG. 13B) and the log-likelihood ratio for the sub-classifier at the second location can be found by the calculation of blocks 252, 254, 256, 258, 260, and 262. This process can be repeated for a third and a fourth location and so on until the sub-classifier has been evaluated at all specified locations as indicated at blocks 264 and 266.

A classifier (e.g., the classifier 34 in FIGS. 4A-4B) designed according to the present disclosure may compute "variance normalization" and "brightest point normalization" over various pre-specified extents of the object. The extent of some object does not necessarily occupy the full extent of the classification window 32. For example, the face training examples shown in FIG. 25 do not occupy the complete area of the window 32. In one embodiment, the average extent of the object may be entered by hand and used for normalization. This extent may be split into two horizontal halves that are normalized separately.

Figure 29:
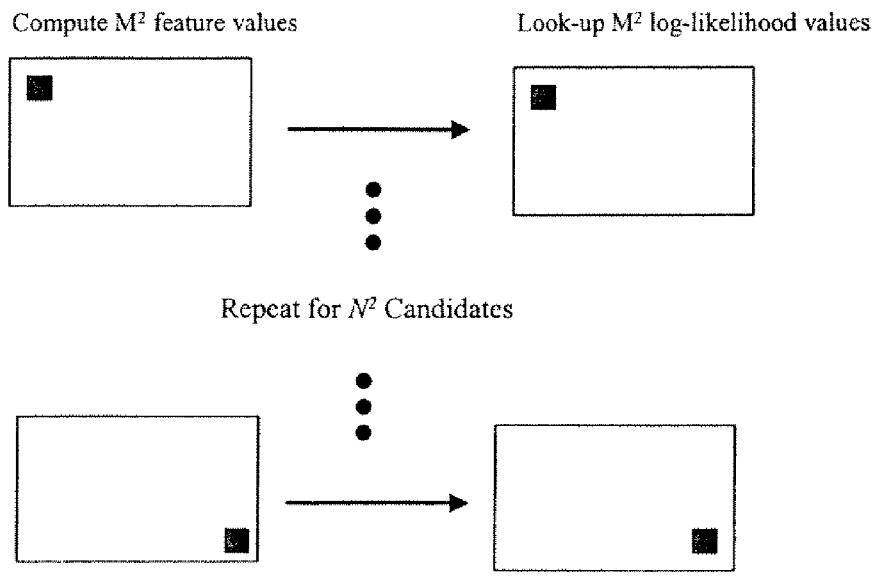
FIG. 29 illustrates an embodiment of a candidate-based evaluation of the search in position.
Figure 30:
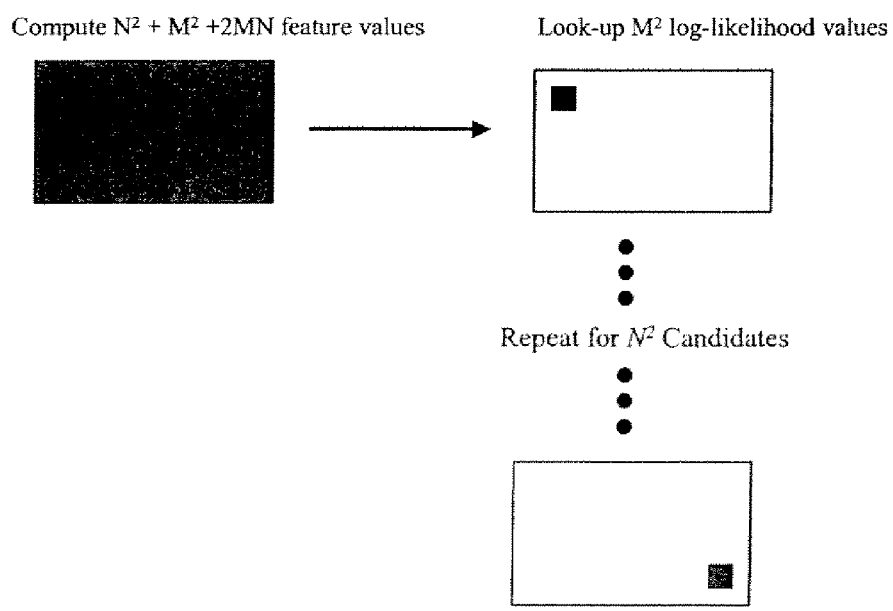
FIG. 30 shows an alternative embodiment of the search in position called a feature-based evaluation.

FIGS. 20-21 illustrate a conceivable orderings of computation. The actual organization of the aforementioned computations may depend on the particular classifier stage. In particular, each stage can be evaluated in a "candidate-wise" manner (FIG. 29) or a "feature-wise" manner (FIG. 30). The "candidate-wise" evaluation performs all feature evaluations separately for each candidate window. This approach involves a total of $N^2 \times M^2$ feature evaluations for $M^2$ sub-classifiers and $N^2$ candidates as shown in FIG. 29. On the other hand, the "feature-wise" evaluation of FIG. 30 attempts to reduce computation cost by sharing feature evaluations among overlapping candidates. This strategy performs approximately $N^2+M^2+2MN$ feature evaluations over the entire scaled image (assuming all candidates are to be evaluated). Each candidate then samples the $M^2$ evaluations that overlap its extent and supplies them to the corresponding $M^2$ sub-classifier log-likelihood look-up tables as illustrated in FIG. 30. Typically, since N is much greater than M, this strategy greatly reduces the amount of computation. The $M^2$ sub-classifiers, however, can differ only in their log-likelihood tables (as a function of position within the candidate), but must all share the same type of feature computation. Whereas, in the candidate-wise evaluation, the $M^2$ sub-classifiers can be completely different.

If features are computed in a "feature-wise" manner, then the lighting correction must also preferably be applied in the feature-wise manner. The "feature-wise" correction assigns the correction at each wavelet coefficient as a function of a localized neighborhood about that point as described by "localized lighting correction" method hereinabove; that is, the correction is independent of the spatial location of the coefficient within the candidate image window 32. Alternatively, the candidate-wise correction considers the whole candidate or a specified portion and can be accomplished by "variance normalization" or "brightest point normalization" methods described hereinabove.

According to one embodiment, the early stages in a classifier may use the "feature-wise" evaluation for both lighting correction and feature evaluation. And, the later stages, in which the remaining candidates are sparser, may use the "candidate-wise" evaluation. One embodiment using four stages uses the feature-wise evaluation for the first three stages and the candidate-wise evaluation for the fourth stage. The first two of the four stages use feature-wise lighting correction using the "localized lighting correction" method described hereinabove. The first stage uses 20 sub-classifiers which share the same feature computation. The second stage uses 24 sub-classifiers that share a feature computation and 42 other sub-classifiers that share another feature computation. The third stage uses the candidate-wise evaluation with 19 sub-classifiers, where 5 sub-classifiers share one feature computation, another 5 share a different feature computation, another 5 share a third feature computation, another 3 share a feature computation, and the last one has a unique feature computation. The fourth stage involves 9 sub-classifiers wherein each sub-classifier has a unique feature computation.

According to one embodiment of the present disclosure, features are designed in ascending order of complexity. In the early stages in the classifier, features use small subsets of wavelet coefficients, small numbers of linear projections, and simple quantization. These feature evaluations are designed to be as quick as possible because they have to be applied to many candidates. In another embodiment, the first two stages in the classifier use subsets of size 3-8 coefficients and use two linear projections with the "scalar quantization 1-B" scheme described hereinabove. In later stages (in which there are fewer candidates), features use larger subset sizes, more linear projections, and more complicated quantization schemes such as Tree-Structured Vector Quantization (TSVQ). In one embodiment, a third stage can contain sub-classifiers that considers between four and twenty input variables, 5 linear projections, the "vector quantization 2-A" scheme (discussed hereinbefore) for 4 feature computations, and the "vector quantization 3-A" scheme (discussed hereinbefore) for one feature. A fourth and possibly a fifth stage may contain features derived by TSVQ.

Object Detection

FIG. 31 depicts various images (133 through 136) of humans with the object markers 52 placed on the human faces detected by the object detector 18 (FIG. 1) according to an embodiment of the present disclosure. FIG. 32, on the other hand, illustrates various images (137, 138) of teapots with the object markers 52 placed on the teapots detected by the object detector 18 according to another embodiment of the present disclosure. Similarly, FIG. 33 shows results of object detection for slop signs using the object detector 18 according to an embodiment of the present disclosure over three images 140-142 of various stop signs.

Face Recognition

A classifier (e.g., the classifier 34 in FIGS. 4A-4B) designed according to the teachings of the present disclosure can be used for making other kinds of determinations besides object detection. For example, it can be used to determine if two observations (e.g., two images) belong to the same category or class of images. It could also be used for face recognition as shown in FIG. 34, i.e., to determine if two photographs are of the same person. Such a classifier (e.g., the classifier 34) may model two probability distributions: the probability distribution over observations that come from the same category (person)—$P(Im_1, Im_2 | Same)$, and the probability distributions over observations that come from different categories (people)—$P(Im_1, Im_2 | different)$. If $Im_1$ (for Image-1 (not shown)) and $Im_2$ (for Image-2 (not shown)) are concatenated as one vector of variables, then the method described hereinbefore in FIGS. 17A-17B applies to constructing representations for these probability distributions. Alternatively, the probability distributions $P(Im_1-Im_2|same)$ and $P(Im_1-Im_2|different)$, modeling probabilities over the difference between the two images, could be constructed by the method described in FIGS. 17A and 17B. For the example of face recognition, $P(Im_1, Im_2 | Same)$ may be trained using image pairs of examples with both members of each pair come from the same face (but each pair could come from a different face). In FIG. 34, image pairs 270a and 270b are examples of such pairs. On the other hand, $P(Im_1, Im_2|different)$ may be trained by pairs of examples where for each pair the members come from different faces. In FIG. 34, image pairs 272a through 272c are examples of such pairs. The (raining images may be constrained to a specific size and the faces to a specific orientation and size within this image, as indicated at block 104 in FIG. 18. Then, to apply the classifier 34 to perform face recognition for two non-training faces (e.g., in real life images), the two (non-training) face images may have to be scaled, aligned, and cropped to the same specifications as those applied at block 104 in FIG. 30 and then evaluated by retrieving the probabilities associated with this input effaces, computing the ratio of the retrieved probabilities, and comparing the ratio to a threshold in the same fashion as when the classifier is applied to an input window for face detection.

The foregoing describes a system and method for detecting presence of a 3D object in a 2D image containing a 2D representation of the 3D object. The object detector according to the present disclosure may improve upon existing techniques for object detection both in accuracy and computational properties. As described herein, a pre-selected number of view-based classifiers may be trained on sample images prior to performing the detection on an unknown image. The object detection program may then operate on the given input image and compute its wavelet transform for the entire input image. The object detection program may then proceed with sampling of the wavelet coefficients at different image window locations on the input image, and apply each classifier involving linear projection of selected subsets of coefficients, quantization of linear projection coefficients and efficient look-up of pre-computed log-likelihood tables to determine object presence. The object detector's coarse-to-fine object detection strategy coupled with exhaustive object search across different positions and scales may result in an efficient and accurate object detection scheme. The object detector may detect a 3D object over a wide range in angular variation (e.g., 180 degrees) through the combination of a small number of classifiers each specialized to a small range within this range of angular variation. Each classifier according to the present disclosure may contain one or more sub-classifiers, wherein each sub-classifier may be based on a ratio of two Bayesian networks.

The object detector may be trained to detect many different types of objects (e.g., airplanes, cat faces, telephones, etc.) besides human faces and cars discussed hereinabove. Some of the applications where the object detector may be used include: commercial image databases (e.g., stock photography) for automatically labeling and indexing of images; an Internet-based image searching and indexing service; finding biological structures in various types of biological images (e.g., MRI, X-rays, microscope images, etc.); finding objects of military interest (e.g., mines, tanks, etc.) in satellite, radar, or visible imagery; finding objects of interest to scientists (e.g., craters, volcanoes, etc.) in astronomical images; as a tool for automatic description of the image content of an image database; to achieve accurate color balancing on human faces and remove "red-eye" from human faces in a digital photo development; for automatic adjustment of focus, contrast, and centering on human faces during digital photography; to automatically point, focus, and center cameras on human faces during video conferencing; enabling automatic zooming on human faces and also face recognition as part of a security and surveillance system; making human-computer interaction more realistic, especially in interactive computer games; and to perform face detection in real-time or near real-time, in robotic toys to perform face detection in real-time or near real-time and to have the toy behave accordingly.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

What is claimed is:

1. A method, comprising:
    receiving, using one or more data processors, a digitized version of a two-dimensional (2D) image containing a 2D representation of a three-dimensional (3D) object;
    obtaining, using the one or more data processors, visual information from said digitized version of said 2D image; and
    classifying, using the one or more data processors, said 2D image based on a ratio of a plurality of graphical probability models using said visual information;
    wherein said classifying includes:
        applying a view-based classifier to said 2D image, wherein said classifier includes a plurality of sub-classifiers;
        computing a sum of log-likelihood ratios for each of said plurality of sub-classifiers, wherein said log-likelihood ratio is a ratio of two graphical probability models;
    wherein a graphical probability model comprises a probability distribution over a set of variables where statistical independence and conditional statistical independence exist among various combinations of the variables, wherein the graphical probability model is a probability distribution representation derived from statistical dependencies among image input variables.

2. The method of claim 1, wherein said obtaining includes:
    computing a wavelet transform of said 2D image, wherein said wavelet transform generates a plurality of transform coefficients, and wherein each transform coefficient represents a portion of said visual information from said 2D image that is localized in space, frequency, and orientation.

3. The method of claim 1, further comprising:
    automatically performing said receiving, said obtaining, and said classifying.

4. The method of claim 1, wherein each of said plurality of graphical probability models is a Bayesian Network (BN).

5. The method of claim 4, wherein said classifying further includes:
    sequentially comparing each of said sum of log-likelihood ratios to a predetermined threshold.

6. The method of claim 5, wherein said sequentially comparing includes:
    terminating said sequential comparing based on an outcome during said comparison and before all sums of log-likelihood ratios are compared to said predetermined threshold.

7. The method of claim 5, further comprising:
    detecting a presence of said 3D object in said 2D image based on a result of said comparison to said predetermined threshold.

8. The method of claim 1, wherein said applying includes:
    scanning said view-based classifier in position and in scale over said 2D image.

9. The method of claim 1, wherein said computing includes:
    computing probabilities composing each of said two graphical probability models based on said visual information; and
    computing said log-likelihood ratio using said probabilities.

10. The method of claim 9, wherein said computing probabilities includes:
    quantizing variables in each conditional probability distribution within each of said two graphical probability models.

11. The method of claim 10, wherein said quantizing includes:
    quantizing said variables using Tree-Structured Vector Quantization (TSVQ).

12. The method of claim 11, wherein quantizing using said TSVQ includes:
  performing a vector quantization over conditioning variables in each said conditional probability distribution during a first stage of said TSVQ; and
  performing said vector quantization over conditioned variables in each said conditional probability distribution during a second stage of said TSVQ.

13. The method of claim 9, wherein said computing probabilities includes:
  estimating each conditional probability distribution within each of said two graphical probability models.

14. The method of claim 8, wherein said applying includes:
  applying said plurality of sub-classifiers in a sequence and in a progression where said sub-classifiers progress from those evaluated in a coarsely-spaced scan in position to those that are evaluated using a finely-spaced scan in position.

15. The method of claim 2, further comprising:
  performing a lighting correction on one or more of said plurality of transform coefficients prior to classifying said 2D image.

16. The method of claim 15, wherein said performing includes one or more of the following:
  adjusting a value of each of said plurality of transform coefficients as a function of other transform coefficients in said wavelet transform;
  linearly scaling an intensity of one or more of said plurality of transform coefficients; and
  scaling the intensity of one or more of said plurality of transform coefficients with reference to a coefficient with the brightest intensity.

17. A method of providing assistance in detecting the presence of a three-dimensional (3D) object in a two-dimensional (2D) image containing a 2D representation of said 3D object, said method comprising:
  receiving, using one or more data processors, a digitized version of said 2D image from a client site and over a communication network;
  determining, using the one or more data processors, a location of said 3D object in said 2D image using a Bayesian network-based classifier, wherein said classifier is configured to analyze said 2D image based on a ratio of a plurality of Bayesian networks;
  wherein said classifier is determined by:
    applying a view-based classifier to said 2D image, wherein said classifier includes a plurality of sub-classifiers;
    computing a sum of log-likelihood ratios for each of said plurality of sub-classifiers, wherein said log-likelihood ratio is a ratio of two graphical probability models;
    wherein a graphical probability model comprises a probability distribution over a set of variables where statistical independence and conditional statistical independence exist among various combinations of the variables, wherein the graphical probability model is a probability distribution representation derived from statistical dependencies among image input variables; and
  sending a notification of said location of said 3D object to said client site over said communication network.

18. The method of claim 17, further comprising:
  determining orientation of said 3D object in said 2D image; and
  sending information about said orientation as part of said notification.

19. The method of claim 17, further comprising charging a fee for sending said notification.

20. The method of claim 17, wherein said communication network is the Internet.

21. A system, comprising:
  a first program module for receiving a digitized version of said 2D (two-dimensional) image from a client computer and over a communication network, wherein said 2D image contains a 2D representation of a 3D (three-dimensional) object;
  a second program module for determining a location of said 3D object in said 2D image using a Bayesian network-based classifier, wherein said classifier is configured to analyze said 2D image based on a ratio of at least two Bayesian networks;
  wherein said classifier is determined by:
    applying a view-based classifier to said 2D image, wherein said classifier includes a plurality of sub-classifiers;
    computing a sum of log-likelihood ratios for each of said plurality of sub-classifiers, wherein said log-likelihood ratio is a ratio of two graphical probability models;
    wherein a graphical probability model comprises a probability distribution over a set of variables where statistical independence and conditional statistical independence exist among various combinations of the variables, wherein the graphical probability model is a probability distribution representation derived from statistical dependencies among image input variables; and
  a third program module for sending a notification of said location of said 3D object to said client computer over said communication network.

22. A system, comprising:
  means for receiving a digitized version of a first two-dimensional (2D) image containing a first 2D representation of a three-dimensional (3D) object;
  means for receiving a digitized version of a second 2D image containing a second 2D representation of said 3D object; and
  means for applying a classifier to said first and said second 2D images to determine whether each of said first and said second 2D representations is of said 3D object, wherein said classifier is based on a ratio of a plurality of Bayesian networks;
  wherein said classifier is determined by:
    applying a view-based classifier to said 2D image, wherein said classifier includes a plurality of sub-classifiers;
    computing a sum of log-likelihood ratios for each of said plurality of sub-classifiers, wherein said log-likelihood ratio is a ratio of two graphical probability models;
    wherein a graphical probability model comprises a probability distribution over a set of variables where statistical independence and conditional statistical independence exist among various combinations of the variables, wherein the graphical probability model is a probability distribution representation derived from statistical dependencies among image input variables.

23. A method, comprising:
  receiving, using one or more data processors, a digitized version of a first two-dimensional (2D) image containing a first 2D representation of a three-dimensional (3D) object;

receiving, using the one or more data processors, a digitized version of a second 2D image containing a second 2D representation of said 3D object; and applying, using the one or more data processors, a classifier to said first and said second 2D images to determine whether each of said first and said second 2D representations is of said 3D object, wherein said classifier is based on a ratio of a plurality of Bayesian networks;

wherein said classifier is determined by:

applying a view-based classifier to said 2D image, wherein said classifier includes a plurality of sub-classifiers;

computing a sum of log-likelihood ratios for each of said plurality of sub-classifiers, wherein said log-likelihood ratio is a ratio of two graphical probability models;

wherein a graphical probability model comprises a probability distribution over a set of variables where statistical independence and conditional statistical independence exist among various combinations of the variables, wherein the graphical probability model is a probability distribution representation derived from statistical dependencies among image input variables.

24. A method for detecting instances of an object in a 2D (two-dimensional) image, the method comprising:

computing, using one or more data processors, a transform of a digitized version of said 2D image containing a 2D representation of said object, wherein said transform generates a plurality of transform coefficients;

applying, using the one or more data processors, a plurality of view-based classifiers to the plurality of transform coefficients, wherein each view-based classifier is configured to detect a specific orientation of said object in said 2D image based on visual information received from corresponding transform coefficients, wherein at least one of said plurality of view-based classifiers includes a plurality of cascaded sub-classifiers, and wherein at least one of said plurality of sub-classifiers is based on a ratio of a plurality of graphical probability models;

wherein a classifier is determined by:

applying a view-based classifier to said 2D image, wherein said classifier includes a plurality of sub-classifiers;

computing a sum of log-likelihood ratios for each of said plurality of sub-classifiers, wherein said log-likelihood ratio is a ratio of two graphical probability models;

wherein a graphical probability model comprises a probability distribution over a set of variables where statistical independence and conditional statistical independence exist among various combinations of the variables, wherein the graphical probability model is a probability distribution representation derived from statistical dependencies among image input variables; and detecting, using the one or more data processors, orientation and location of each instance of said object in said 2D image from a combination of results of the application of said plurality of view-based classifiers.

25. The method of claim 24, wherein said plurality of view-based classifiers are applied in parallel.

26. The method of claim 24, wherein each of said plurality of graphical probability models is a Bayesian network.

27. The method of claim 24, further comprising providing lighting adjustments to said transform coefficients prior to applying said plurality of view-based classifiers.

28. The method of claim 24, wherein applying said plurality of view-based classifiers includes linearly projecting each of a predetermined number of transform coefficients to a smaller number of projection coefficients.

29. The method of claim 24, wherein said applying includes quantizing said plurality of transform coefficients.

30. The method of claim 24, wherein said applying includes applying the plurality of cascaded sub-classifiers in a series of detector stages, wherein each of the detector stages includes at least one sub-classifier.

31. A system, comprising:

means for receiving a digitized version of a two-dimensional (2D) image containing a 2D representation of a three-dimensional (3D) object;

means for obtaining visual information from said digitized version of said 2D image;

and means for classifying said 2D image based on a ratio of at least two graphical probability models using said visual information;

wherein said classifying includes:

applying a view-based classifier to said 2D image, wherein said classifier includes a plurality of sub-classifiers;

computing a sum of log-likelihood ratios for each of said plurality of sub-classifiers, wherein said log-likelihood ratio is a ratio of two graphical probability models;

wherein a graphical probability model comprises a probability distribution over a set of variables where statistical independence and conditional statistical independence exist among various combinations of the variables, wherein the graphical probability model is a probability distribution representation derived from statistical dependencies among image input variables.

32. The system of claim 31, wherein said means for obtaining includes:

means for computing a wavelet transform of said 2D image, wherein said wavelet transform generates a plurality of transform coefficients, and wherein each transform coefficient represents a portion of said visual information from said 2D image that is localized in space, frequency, and orientation.

33. A computer system, which, upon being programmed, is configured to perform the following:

receive, using one or more data processors, a digitized version of a first two-dimensional (2D) image containing a first 2D representation of a three-dimensional (3D) object;

receive, using the one or more data processors, a digitized version of a second 2D image containing a second 2D representation of said 3D object; and apply, using the one or more data processors, a classifier to said first and said second 2D images to determine whether each of said first and said second 2D representations is of said 3D object, wherein said classifier is based on a ratio of a plurality of Bayesian networks;

wherein said classifier is determined by:

applying a view-based classifier to said 2D image, wherein said classifier includes a plurality of sub-classifiers;

computing a sum of log-likelihood ratios for each of said plurality of sub-classifiers, wherein said log-likelihood ratio is a ratio of two graphical probability models;

wherein a graphical probability model comprises a probability distribution over a set of variables where statistical independence and conditional statistical independence exist among various combinations of the variables, wherein the graphical probability model is a probability distribution representation derived from statistical dependencies among image input variables.

34. The system of claim 31, further comprising:
means for detecting a presence of said 3D object in said 2D image based on a result of said comparison to said predetermined threshold.

35. The system of claim 31, further comprising:
means for performing a lighting adjustment on one or more of said plurality of transform coefficients prior to classifying said 2D image.

36. A system, comprising:
means for receiving a digitized version of said 2D (two-dimensional) image from a client computer and over a communication network, wherein said 2D image contains a 2D representation of a 3D (three-dimensional) object;
means for determining a location of said 3D object in said 2D image using a Bayesian network-based classifier, wherein said classifier is configured to analyze said 2D image based on a ratio of a plurality of Bayesian networks;
wherein said classifier is determined by:
applying a view-based classifier to said 2D image, wherein said classifier includes a plurality of sub-classifiers;
computing a sum of log-likelihood ratios for each of said plurality of sub-classifiers, wherein said log-likelihood ratio is a ratio of two graphical probability models;
wherein a graphical probability model comprises a probability distribution over a set of variables where statistical independence and conditional statistical independence exist among various combinations of the variables, wherein the graphical probability model is a probability distribution representation derived from statistical dependencies among image input variables; and
means for sending a notification of said location of said 3D object to said client computer over said communication network.

37. A computer system, which, upon being programmed, is configured to perform the following:
compute, using one or more data processors, a transform of a digitized version of a 2D (two-dimensional) image containing a 2D representation of an object, wherein said transform generates a plurality of transform coefficients;
apply, using the one or more data processors, a plurality of view-based classifiers to the plurality of transform coefficients, wherein each view-based classifier is configured to detect a specific orientation of said object in said 2D image based on visual information received from corresponding transform coefficients, wherein at least one of said plurality of view-based classifiers includes a plurality of cascaded sub-classifiers, and wherein at least one of said plurality of sub-classifiers is based on a ratio of a plurality of graphical probability models;
wherein a classifier is determined by:
applying a view-based classifier to said 2D image, wherein said classifier includes a plurality of sub-classifiers;
computing a sum of log-likelihood ratios for each of said plurality of sub-classifiers, wherein said log-likelihood ratio is a ratio of two graphical probability models;
wherein a graphical probability model comprises a probability distribution over a set of variables where statistical independence and conditional statistical independence exist among various combinations of the variables, wherein the graphical probability model is a probability distribution representation derived from statistical dependencies among image input variables; and
detect orientation and location of each instance of said object in said 2D image from a combination of results of the application of said plurality of view-based classifiers.

38. The computer system of claim 37, which, upon being programmed, is further configured to perform the following:
establish a communication link with a client computer over a communication network;
receive said digitized version of said 2D image from the client computer over said communication network;
perform said detection of said orientation and location of each instance of said object in said 2D image received from the client computer; and
send a notification of the orientation and location of each said instance of said object to the client computer over the communication network.

39. The computer system of claim 37, which, upon being programmed, is further configured to provide lighting adjustments to the transform coefficients prior to applying the plurality of view-based classifiers.

40. The computer system of claim 37, which, upon being programmed, is further configured to apply said plurality of view-based classifiers in parallel.

41. A system, comprising:
a first program module for receiving a digitized version of a two-dimensional (20) image containing a 2D representation of a three-dimensional (3D) object;
a second program module for obtaining visual information from said digitized version of said 2D image; and
a third program module for classifying said 2D image based on a ratio of a plurality of Bayesian networks using said visual information
wherein said classifying includes:
applying a view-based classifier to said 2D image, wherein said classifier includes a plurality of sub-classifiers;
computing a sum of log-likelihood ratios for each of said plurality of sub-classifiers, wherein said log-likelihood ratio is a ratio of two graphical probability models;
wherein a graphical probability model comprises a probability distribution over a set of variables where statistical independence and conditional statistical independence exist among various combinations of the variables, wherein the graphical probability model is a probability distribution representation derived from statistical dependencies among image input variables.

42. The system of claim 41, wherein said second program module includes:
a fourth program module for computing a wavelet transform of said 20 image, wherein said wavelet transform generates a plurality of transform coefficients, and wherein each transform coefficient represents a portion of said visual information from said 2D image that is localized in space, frequency, and orientation.

43. A computer readable medium having stored thereon program instructions, which, when executed by a processor, cause said processor to perform the following:

receive a digitized version of a first two-dimensional (2D) image containing a first 2D representation of a three-dimensional (3D) object;
receive a digitized version of a second 2D image containing a second 2D representation of said 3D object; and
apply a classifier to said first and said second 2D images to determine whether each of said first and said second 2D representations is of said 3D object, wherein said classifier is based on a ratio of a plurality of Bayesian networks;
wherein said classifier is determined by:
applying a view-based classifier to said 2D image, wherein said classifier includes a plurality of sub-classifiers;
computing a sum of log-likelihood ratios for each of said plurality of sub-classifiers, wherein said log-likelihood ratio is a ratio of two graphical probability models;
wherein a graphical probability model comprises a probability distribution over a set of variables where statistical independence and conditional statistical independence exist among various combinations of the variables, wherein the graphical probability model is a probability distribution representation derived from statistical dependencies among image input variables.

44. The system of claim 41, further comprising:
a seventh program module for detecting a presence of said 3D object in said 2D image based on a result of said comparison to said predetermined threshold.

45. The system of claim 41, further comprising:
a fourth program module for performing a lighting adjustment on one or more of said plurality of transform coefficients prior to classifying said 2D image.

46. A computer readable data storage medium having stored thereon program instructions, which, when executed by a processor, cause said processor to:
receive a digitized version of a two-dimensional (2D) image containing a 2D representation of a three-dimensional (3D) object;
obtain visual information from said digitized version of said 2D image; and
classify said 2D image based on a ratio of a plurality of Bayesian networks using said visual information;
wherein said classifying includes:
applying a view-based classifier to said 2D image, wherein said classifier includes a plurality of sub-classifiers;
computing a sum of log-likelihood ratios for each of said plurality of sub-classifiers, wherein said log-likelihood ratio is a ratio of two graphical probability models;
wherein a graphical probability model comprises a probability distribution over a set of variables where statistical independence and conditional statistical independence exist among various combinations of the variables, wherein the graphical probability model is a probability distribution representation derived from statistical dependencies among image input variables.

47. A system for detecting instances of an object in a 2D (two-dimensional) image, the system comprising:
means for computing a transform of a digitized version of said 2D image containing a 2D representation of said object, wherein said transform generates a plurality of transform coefficients;
means for applying a plurality of view-based classifiers to the plurality of transform coefficients, wherein each view-based classifier is configured to detect a specific orientation of said object in said 2D image based on visual information received from corresponding transform coefficients, wherein at least one of said plurality of view-based classifiers includes a plurality of cascaded sub-classifiers, and wherein at least one of said plurality of sub-classifiers is based on a ratio of a plurality of graphical probability models;
wherein a classifier is determined by:
applying a view-based classifier to said 2D image, wherein said classifier includes a plurality of sub-classifiers;
computing a sum of log-likelihood ratios for each of said plurality of sub-classifiers, wherein said log-likelihood ratio is a ratio of two graphical probability models;
wherein a graphical probability model comprises a probability distribution over a set of variables where statistical independence and conditional statistical independence exist among various combinations of the variables, wherein the graphical probability model is a probability distribution representation derived from statistical dependencies among image input variables; and
means for detecting orientation and location of each instance of said object in said 2D image from a combination of results of the application of said plurality of view-based classifiers.

48. The system of claim 47, wherein each of said plurality of graphical probability models is a Bayesian network.

49. The system of claim 47, further comprising means for providing lighting adjustments to said transform coefficients prior to applying said plurality of view-based classifiers.

50. A computer readable data storage medium having stored thereon program instructions, which, when executed by a processor, cause said processor to perform the following:
compute a transform of a digitized version of a 2D (two-dimensional) image containing a 2D representation of an object, wherein said transform generates a plurality of transform coefficients;
apply a plurality of view-based classifiers to the plurality of transform coefficients, wherein each view-based classifier is configured to detect a specific orientation of said object in said 2D image based on visual information received from corresponding transform coefficients, wherein at least one of said plurality of view-based classifiers includes a plurality of cascaded sub-classifiers, and wherein at least one of said plurality of sub-classifiers is based on a ratio of a plurality of graphical probability models;
wherein a classifier is determined by:
applying a view-based classifier to said 2D image, wherein said classifier includes a plurality of sub-classifiers;
computing a sum of log-likelihood ratios for each of said plurality of sub-classifiers, wherein said log-likelihood ratio is a ratio of two graphical probability models;
wherein a graphical probability model comprises a probability distribution over a set of variables where statistical independence and conditional statistical independence exist among various combinations of the variables, wherein the graphical probability model is a probability distribution representation derived from statistical dependencies among image input variables; and
detect orientation and location of each instance of said object in said 2D image from a combination of results of the application of said plurality of view-based classifiers.

51. The data storage medium of claim 50, wherein each of said plurality of graphical probability models is a Bayesian network.

52. The data storage medium of claim 50, wherein said program instructions, upon execution, cause said processor to further perform the following:
provide lighting adjustments to said transform coefficients prior to applying said plurality of view-based classifiers.

53. A system for detecting instances of an object in a 2D (two-dimensional) image, the system comprising:
 a first program module for computing a transform of a digitized version of said 2D image containing a 2D representation of said object, wherein said transform generates a plurality of transform coefficients;
 a second program module for applying a plurality of view-based classifiers to the plurality of transform coefficients, wherein each view-based classifier is configured to detect a specific orientation of said object in said 2D image based on visual information received from corresponding transform coefficients, wherein at least one of said plurality of view-based classifiers includes a plurality of cascaded sub-classifiers, and wherein at least one of said plurality of sub-classifiers is based on a ratio of a plurality of graphical probability models;
 wherein a classifier is determined by:
  applying a view-based classifier to said 2D image, wherein said classifier includes a plurality of sub-classifiers;
  computing a sum of log-likelihood ratios for each of said plurality of sub-classifiers, wherein said log-likelihood ratio is a ratio of two graphical probability models;
 wherein a graphical probability model comprises a probability distribution over a set of variables where statistical independence and conditional statistical independence exist among various combinations of the variables, wherein the graphical probability model is a probability distribution representation derived from statistical dependencies among image input variables; and
 a third program module for detecting orientation and location of each instance of said object in said 2D image from a combination of results of the application of said plurality of view-based classifiers.

\* \* \* \* \*